United States Patent
Kito et al.

(10) Patent No.: US 8,041,959 B2
(45) Date of Patent: Oct. 18, 2011

(54) COMPUTER SYSTEM, STORAGE SYSTEM AND MANAGEMENT COMPUTER FOR BACKING UP AND RESTORE ENCRYPTION KEY FOR STORAGE SYSTEM INCORPORATING THEREIN A STORED DATA ENCRYPTION FUNCTION

(75) Inventors: Daisuke Kito, Machida (JP); Kenji Fujii, Yokohama (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 855 days.

(21) Appl. No.: 12/025,189

(22) Filed: Feb. 4, 2008

(65) Prior Publication Data
US 2010/0031058 A1 Feb. 4, 2010

(30) Foreign Application Priority Data
Oct. 12, 2007 (JP) .................................. 2007-266665

(51) Int. Cl.
*G06F 21/00* (2006.01)
(52) U.S. Cl. ........ 713/193; 380/277; 713/167; 707/635; 707/652
(58) Field of Classification Search .................. 713/167, 713/193; 380/277; 707/635, 652
See application file for complete search history.

(56) References Cited

U.S. PATENT DOCUMENTS

| | | | | |
|---|---|---|---|---|
| 7,213,158 B2 * | 5/2007 | Bantz et al. | ................... | 713/193 |
| 2007/0168598 A1 | 7/2007 | Yamamoto et al. | | |
| 2007/0180239 A1 | 8/2007 | Fujibayashi et al. | | |
| 2009/0178110 A1 * | 7/2009 | Higuchi | ........................... | 726/1 |

FOREIGN PATENT DOCUMENTS

| | | |
|---|---|---|
| JP | 2005-11277 | 1/2005 |
| JP | 2007-28502 | 2/2007 |
| JP | 2007-148762 | 6/2007 |

* cited by examiner

*Primary Examiner* — Pramila Parthasarathy
*Assistant Examiner* — Ali Shayanfar
(74) *Attorney, Agent, or Firm* — Antonelli, Terry, Stout & Kraus, LLP.

(57) ABSTRACT

To protect data from corruption due to restoration of an encryption key to a wrong storage system, there is provided a computer system including a first storage system and a second storage system, wherein: the first storage system, upon receiving a request to write first data to a first area in the first storage system, encrypts the first data by using a first key and writes the first data in the first area, and, upon receiving a request to write second data to a third area, encrypts the second data by using a second key and transmits a request to write the encrypted second data in a second area in the second storage system; and the computer system holds the first key, an identifier of the first storage system associated with the first key, the second key, and an identifier of the second storage system associated with the second key.

17 Claims, 30 Drawing Sheets

LU MANAGEMENT INFORMATION 201

| PORT (WWN) | LU NUMBER | CAPACITY | COMPUTER ALLOWED TO ACCESS (WWN) | VIRTUAL LU/ REAL LU | ENCRYPTION ON/OFF | KEY ID |
|---|---|---|---|---|---|---|
| CLA-1 (FF:00:00:00 : 00:00:00:FF) | 1 | 100GB | 10:00:00:00:00:00:70 | REAL | OFF | |
| | 2 | 100GB | 10:00:00:00:00:00:70 | REAL | ON | 1 |
| | 3 | 100GB | 20:00:00:00:00:00:A1:7A | VIRTUAL | ON | 2 |
| ... | ... | ... | ... | ... | ... | ... |

FIG. 3

VIRTUAL LU MAPPING INFORMATION 202

| PORT (WWN) | LU NUMBER | VIRTUAL DESTINATION STORAGE APPARATUS MODEL/PRODUCTION NUMBER | PORT (WWN) | LU NUMBER IN VIRTUAL DESTINATION STORAGE APPARATUS |
|---|---|---|---|---|
| CLA-1 (FF:00:00:00: 00:00:00:FF) | 3 | D600-100 | A-1 (00:00:00:00: AA:AA:AA:AA) | 1 |
| | 4 | D600-100 | A-1 (00:00:00:00: AA:AA:AA:AA) | 2 |
| | 10 | D700-110 | AA-1 (00:00:00:00: BB:BB:BB:BB) | 1 |
| ... | ... | ... | ... | ... |

FIG. 4

STORAGE APPARATUS MODEL/PRODUCTION
NUMBER MANAGEMENT INFORMATION 203

| OWN STORAGE APPARATUS MODEL/ PRODUCTION NUMBER /501 | ADDRESS /502 | MODE /503 | VIRTUAL DESTINATION STORAGE APPARATUS MODEL/PRODUCTION NUMBER /504 |
|---|---|---|---|
| A500-10011 | 10.1.1.1 | NORMAL | D600-100 |
| | | | D700-110 |
| | | | ⋮ |

FIG. 5

ENCRYPTION KEY MANAGEMENT INFORMATION 204

| KEY ID 601 | KEY DATA 602 | KEY LENGTH 603 | ALGORITHM 604 | KEY APPLIED APPARATUS 605 | VIRTUAL DESTINATION STORAGE APPARATUS MODEL /PRODUCTION NUMBER 606 | KEY APPLIED LU 607 |
|---|---|---|---|---|---|---|
| 1 | O35tuobdg5j6ki·· | 256 | AES-ECB | OWN | | LU2 |
| 2 | l0cc-ai0-ci0ags··· | 256 | AES-ECB | VIRTUAL DESTINATION | D600-100 | LU1 |
| 3 | 052pgrmkg3jp9·· | 128 | AES-ECB | VIRTUAL DESTINATION | D600-100 | LU2 |
| 4 | 0jfwi0fwj9ew09·· | 128 | AES-ECB | VIRTUAL DESTINATION | D600-100 | LU3 |
| 5 | 65p54m13lp5kl·· | 128 | AES-CBC | VIRTUAL DESTINATION | D700-110 | APPARATUS |
| ... | ... | ... | ... | ... | ... | ... |

FIG. 6

ADMINISTRATOR AUTHENTICATION INFORMATION 243

| USER ID (701) | PASSWORD (702) | ROLE (703) |
|---|---|---|
| aaa | Abiec··· | SECURITY ADMINISTRATOR |
| bbb | 39ivjpa··· | STORAGE ADMINISTRATOR |
| 10001 | dpfapo··· | ACCOUNT ADMINISTRATOR |
| ... | ... | ... |

*FIG. 7*

ENCRYPTION KEY/ENCRYPTION SETTING INFORMATION BACKUP INFORMATION 241

DUPLICATE INFORMATION OF FIGS. 3 AND 4 _801_ +

BACKUP INFORMATION OF KEY MANAGEMENT INFORMATION OF FIG. 6 _810_

| BACKUP SOURCE APPARATUS MODEL/ PRODUCTION NUMBER | KEY ID | KEY DATA | KEY LENGTH | ALGORITHM | KEY APPLIED APPARATUS | VIRTUAL DESTINATION STORAGE APPARATUS MODEL/PRODUCTION NUMBER | KEY APPLIED LU |
|---|---|---|---|---|---|---|---|
| A500-10011 | 1 | O35tuobdg5j6ki·· | 256 | AES-ECB | OWN | D600-100 | LU2 |
|  | 2 | l0cc-ai0-ci0ags··· | 256 | AES-ECB | VIRTUAL DESTINATION | D600-100 | LU1 |
|  | 3 | 052pgrmkg3jp9·· | 128 | AES-ECB | VIRTUAL DESTINATION | D600-100 | LU2 |
|  | 4 | 0jfwi0fwj9ew09··· | 128 | AES-ECB | VIRTUAL DESTINATION | D700-110 | LU3 |
|  | 5 | 65p54m13lp5kl·· | 128 | AES-CBC | VIRTUAL DESTINATION |  | APPARATUS |
|  | ... | ... | ... | ... | ... | ... | ... |

ENCRYPTION KEY/ENCRYPTION SETTING INFORMATION BACKUP
INFORMATION INTEGRATED MANAGEMENT INFORMATION 2101

| ⁓2201 | ⁓2202 | ⁓2203 |
|---|---|---|
| ENCRYPTION KEY/ENCRYPTION SETTING INFORMATION TRANSMISSION SOURCE STORAGE APPARATUS | ENCRYPTION KEY/ENCRYPTION SETTING INFORMATION BACKUP INFORMATION | ADMINISTRATOR ALLOWED TO ACCESS |
| 10.1.1.1 | A500-1 key_bkup | ABC |
| Controller 2 | A500-2 key_bkup | ABC |
| 10.1.1.10 | A600-10 key_bkup | DDD |
| Controller D1 | D500-1 key_bkup | aiu7, DDD |
| ... | ... | ... |

*FIG. 22*

ADMINISTRATOR AUTHENTICATION INFORMATION 2102

| ⁓2301 | ⁓2302 | ⁓2303 |
|---|---|---|
| USER ID | PASSWORD | ROLE |
| ABC | Abiec··· | INSTRUCTION TO TRANSMIT ENCRYPTION KEY/ENCRYPTION SETTING INFORMATION BACKUP INFORMATION |
| DDD | dpfapo··· | ACCOUNT MANAGEMENT OF MANAGEMENT SERVER |
| ... | ... | ... |

*FIG. 23*

ENCRYPTION MANAGEMENT SERVER INFORMATION 2121

| ⁓2401 |
|---|
| ENCRYPTION MANAGEMENT SERVER |
| 190.1.1.1 |
| 190.10.1.1 |
| ... |

*FIG. 24*

ENCRYPTION KEY/ENCRYPTION SETTING INFORMATION BACKUP
INFORMATION INTEGRATED MANAGEMENT INFORMATION 2101

| ENCRYPTION KEY/ENCRYPTION SETTING INFORMATION TRANSMISSION SOURCE STORAGE APPARATUS 2201 | ENCRYPTION KEY/ENCRYPTION SETTING INFORMATION BACKUP INFORMATION 2202 | STORAGE APPARATUS ALLOWED TO ACCESS 2701 |
|---|---|---|
| 10.1.1.1 | A500-1 key_bkup | 10.1.1.1 |
| Controller 2 | A500-2 key_bkup | Controller 2<br>10.1.1.1 |
| 10.1.1.10 | A600-10 key_bkup | 10.1.1.10 |
| Controller D1 | D500-1 key_bkup | Controller D1 |
| ... | ... | ... |

FIG. 27

ADMINISTRATOR AUTHENTICATION INFORMATION 2102

| USER ID 2301 | PASSWORD 2302 | ROLE 2303 |
|---|---|---|
| ABC | Abiec··· | REGISTRATION OF STORAGE APPARATUS ALLOWED TO ACCESS MANAGEMENT SERVER |
| DDD | dpfapo··· | ACCOUNT MANAGEMENT OF MANAGEMENT SERVER |
| ... | ... | ... |

FIG. 28

COMPUTER SYSTEM, STORAGE SYSTEM AND MANAGEMENT COMPUTER FOR BACKING UP AND RESTORE ENCRYPTION KEY FOR STORAGE SYSTEM INCORPORATING THEREIN A STORED DATA ENCRYPTION FUNCTION

CLAIM OF PRIORITY

The present application claims priority from Japanese application JP2007-266665 filed on Oct. 12, 2007, the content of which is hereby incorporated by reference into this application.

BACKGROUND

A technology disclosed herein relates to a computer system including a storage apparatus for storing data to be used by a computer. In particular, a technology disclosed herein relates to a technology applicable to a storage apparatus having a function of encrypting data to be stored in a storage medium and decrypting data read from the storage medium, for performing backup and restoration of an encryption key to be used for the encryption and the decryption of data.

In recent years, along with a proliferation of a storage area network (SAN), in which a storage apparatus, a computer, and a management computer are coupled to one another via a dedicated line such as Fibre Channel, a computer system has been increased in size, and there has been developed a technology of efficiently managing ever-increasing enormous amount of data in the computer system described above.

For example, JP 2005-11277 A discloses a storage virtualization technology. According to this technology, a first storage apparatus is coupled to at least one second storage apparatus, and a storage area in the second storage apparatus is provided, as a storage area of the first storage apparatus, to a computer.

According to the technology disclosed in JP 2005-11277 A, the storage area of the second storage apparatus is managed by the first storage apparatus in a unified manner, to thereby reduce a management cost of the computer system.

Also, along with an increase of information leaks due to disk theft or the like in recent years, there is a growing interest in storing and managing data with ensured security. For example, JP 2007-28502 A discloses a storage apparatus which includes an encryption function for encrypting a storage area, and is capable of encrypting data to be read from or written to the storage area.

According to the technology disclosed in JP 2007-28502 A, even in a case where a disk is stolen or the like, data leakage can be prevented.

In the storage apparatus having an encryption function as described above, the management of the encryption key is important. For example, a loss of the encryption key due to a failure in the storage apparatus or an operational error of a user makes it impossible for the storage apparatus to decrypt data in an encrypted storage area. In order to deal with this situation, the encryption keys may be backed up outside or inside of the storage apparatus, and in a case where the encryption key is lost, the encryption keys thus backed up may be restored to the storage apparatus.

However, in restoring encryption keys, the following things need to be taken into consideration. Of the backed-up encryption keys, when an incorrect encryption key is restored to the storage apparatus to read or write data, the data is corrupted. For this reason, it is important to prevent an improper restoration of an encryption key, that is, to verify whether or not a right encryption key is actually restored to the storage apparatus.

JP 2007-148762 A discloses a conventional technology related to the above-mentioned verification. According to JP 2007-148762 A, data in an external storage medium such as a USB memory is allowed to be used when a connection destination of the storage medium is an authorized computer, while the data is not allowed to be used when the connection destination is an unauthorized computer.

According to the technology disclosed in JP 2007-148762 A for determining whether data is allowed to be used or not based on a use destination of the data, for example, in the case of restoring an encryption key in a storage apparatus having an encryption function, the restoration of the encryption key is permitted when the encryption key is of the own apparatus and the restoration is rejected when the encryption key is of any other storage apparatus than the own apparatus, to thereby determine whether or not to restore the encryption key.

SUMMARY

According to JP 2007-148762 A, in a case where an administrator has registered an incorrect use destination of the data, it is not possible to prevent the improper restoration of an encryption key. Accordingly, it is necessary to provide a storage apparatus side, to which an encryption key is restored, with a mechanism for preventing the improper restoration of an encryption key.

Further, according to a storage apparatus having a virtualization function, there arise following problems. In this case, there is taken, as an example, a computer system having a hierarchical structure, in which a first storage apparatus virtualizes a storage area of a second storage apparatus. The first storage apparatus has an encryption key for each storage apparatus or each storage area, and encrypts the storage area of the own apparatus by using an encryption key for the own apparatus. Further, the first storage apparatus encrypts a storage area of the second storage apparatus by using an encryption key for the second storage apparatus. When a storage area is encrypted, data stored (and to be stored) in the storage area is encrypted.

In this example, when the first storage apparatus fails, a connection destination of the second storage apparatus may be switched from the first storage apparatus to a third storage apparatus, and the third storage apparatus may decrypt data in an encrypted storage area of the second storage apparatus. In this case, it is necessary to restore an encryption key that has been used in the first storage apparatus, to the third storage apparatus. However, in a case where the third storage apparatus already has an own encryption key (that is, an encryption key to be used for a storage area of the third storage apparatus) set thereto, when the encryption key backed up from the first storage apparatus is restored to the third storage apparatus, the own encryption key of the third storage apparatus is overwritten with the encryption key of the first storage apparatus (that is, an encryption key to be used for a storage area in the first storage apparatus). As a result, data which has been read from the storage area of the third storage apparatus is decrypted by the encryption key that has been used in the first storage apparatus, with the result that the data thus decrypted is corrupted.

In order to protect data from the above-mentioned corruption, it may be prohibited to restore any other encryption key than the encryption key backed up in the own storage apparatus. In this case, however, in the computer system having the hierarchical structure as described above, when the first storage apparatus fails, it is not possible to decrypt data in an encrypted storage area of the virtualized second storage apparatus.

In view of the above-mentioned problems, this invention has been made, and it is therefore an object of this invention to provide a computer system having the hierarchical function as described above, which is capable of correctly restoring, in a case where the first storage apparatus has failed, an encryption key that has been backed up, to thereby decrypt data in an encrypted storage area of the second storage apparatus without corrupting the data.

According to a representative invention disclosed in this application, there is provided a computer system comprising: a plurality of computers; a plurality of storage systems; and a network coupled to at least one of the plurality of computers and the plurality of storage systems, wherein: the plurality of computers include a first computer and a second computer; the plurality of computers each comprise a first interface coupled to the network, a first processor coupled to the first interface, and a first memory coupled to the first processor; the plurality of storage systems include a first storage system and a second storage system; the plurality of storage systems each comprise a second interface coupled to the network, a second processor coupled to the second interface, and a second memory coupled to the second processor; the first storage system comprises a first storage area for storing data written by the second computer; the second storage system comprises a second storage area for storing data written by the second computer; the first storage system is configured to: encrypt, when a request to write first data in the first storage area is received from the second computer, the first data by using a first encryption key held by the first storage system, and write the encrypted first data in the first storage area; and encrypt, when a request to write second data in a third storage area is received from the second computer, the second data by using a second encryption key held by the first storage system, and transmit, to the second storage system, a request to write the encrypted second data in the second storage area; the computer system holds backup information including encryption keys and identifiers of the plurality of storage systems associated with the encryption keys; and the backup information includes at least the first encryption key, an identifier of the first storage system associated with the first encryption key, the second encryption key, and an identifier of the second storage system associated with the second encryption key.

According to an embodiment of this invention, even when a storage apparatus having a virtualization function fails, it is possible to correctly restore an encryption key to another storage apparatus having a virtualization function. As a result, it is possible to decrypt data in an encrypted storage area without corrupting the data.

BRIEF DESCRIPTION OF THE DRAWINGS

FIG. 3 is an explanatory diagram illustrating an example of LU management information according to the first embodiment of this invention.

FIG. 4 is an explanatory diagram illustrating an example of virtual LU mapping information according to the first embodiment of this invention.

FIG. 5 is an explanatory diagram illustrating an example of storage apparatus model/production number management information according to the first embodiment of this invention.

FIG. 6 is an explanatory diagram illustrating an example of encryption key management information according to the first embodiment of this invention.

FIG. 7 is an explanatory diagram illustrating an example of administrator authentication information according to the first embodiment of this invention.

FIG. 8 is an explanatory diagram illustrating an example of encryption key/encryption setting information backup information according to the first embodiment of this invention.

FIG. 22 is an explanatory diagram illustrating an example of encryption key/encryption setting information backup information integrated management information according to the third embodiment of this invention.

FIG. 23 is an explanatory diagram illustrating an example of administrator authentication information according to the third embodiment of this invention.

FIG. 24 is an explanatory diagram illustrating an example of encryption management server information according to the third embodiment of this invention.

FIG. 27 is an explanatory diagram illustrating a first modification example of the encryption key/encryption setting information backup information integrated management information according to the third embodiment of this invention.

FIG. 28 is an explanatory diagram illustrating a first modification example of the administrator authentication information according to the third embodiment of this invention.

DETAILED DESCRIPTION OF THE PREFERRED EMBODIMENTS

Hereinbelow, first, second, and third embodiments of this invention will be described. The embodiments to be described below are merely examples, and this invention is not limited thereto.

The first embodiment will be described with reference to FIGS. 1 to 17.

(System Configuration)

Figure 1:
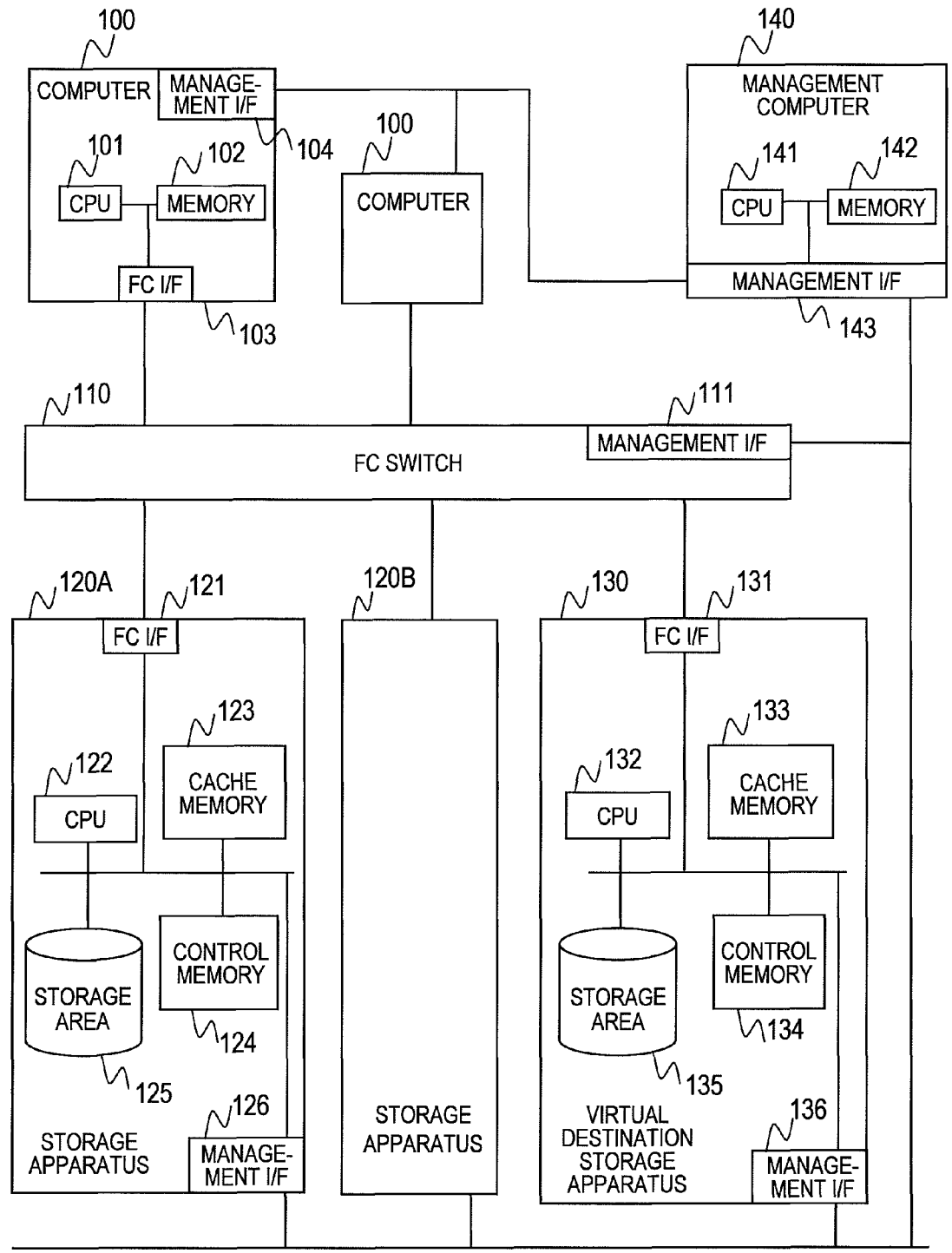
FIG. 1 is a block diagram illustrating a hardware configuration of a computer system according to a first embodiment of this invention.

FIG. 1 is a block diagram illustrating a hardware configuration of a computer system according to the first embodiment of this invention.

The computer system includes at least one computer 100, a fibre channel switch (hereinafter, referred to as FC switch) 110, storage apparatuses 120A and 120B (hereinafter, also collectively referred to as storage apparatus 120), at least one virtual destination storage apparatus 130, and a management computer 140.

The computer 100, the storage apparatus 120, and the virtual destination storage apparatus 130 are each coupled, through FC interfaces (hereinafter, each referred to as FC I/F) 103, 121, and 131, respectively, to the FC switch 110. The FC switch 110, the storage apparatus 120, and the virtual destination storage apparatus 130 are each coupled, through management I/Fs 111, 126, and 136, respectively, to the management computer 140 via an IP network, and managed by the management computer 140.

The computer 100 includes a CPU 101 and a memory 102 coupled to the CPU 101. The memory 102 stores programs to be executed by the CPU 101 and data to be read and written by the storage apparatus 120. The computer 100 further includes at least one FC I/F 103 coupled to the FC switch 110, and at least one management I/F 104 coupled to the management computer 140 via the IP network. Each FC I/F 103 and each management I/F 104 are coupled to the CPU 101.

The storage apparatus 120 includes at least one FC I/F 121 coupled to the FC switch 110, at least one CPU 122, at least one cache memory 123, at least one control memory 124, at least one storage area 125, and at least one management I/F 126. Those units are coupled to one another through, for example, an internal bus.

The FC I/F 121 includes at least one port, which is not shown, coupled to the FC switch 110.

The CPU 122 of the storage apparatus 120 receives a data read/write request from the computer 100 through the FC I/F 121, and reads or writes the requested data in the storage area 125. The storage area 125 is a logical device managed by the CPU 122 in association with a physical device such as a disk drive of the storage apparatus 120. The computer 100 recognizes the storage area 125, and requests the storage apparatus 120 to read or write data in the storage area 125.

The storage apparatus 120 can virtualize a storage area 135 of each virtual destination storage apparatus 130 as the storage area 125 of the own storage apparatus 120.

In a case where the storage area 135 is not virtualized as the storage area 125 by the storage apparatus 120, the storage area 125 is associated with a physical storage area (for example, a storage area of a hard disk drive, which is not shown) in the storage apparatus 120. In this case, upon receiving a data read/write request from the computer 100 with respect to the storage area 125, the storage apparatus 120 executes data write or data read with respect to a physical storage area that is associated with the storage area 125 in the storage apparatus 120, and returns the result of the data write or data read as a response to the computer 100.

On the other hand, in the case where the storage area 135 is virtualized as the storage area 125 by the storage apparatus 120, the storage area 125 is associated with the storage area 135 of the virtual destination storage apparatus 130, instead of being associated with the physical storage area in the storage apparatus 120. In this case, upon receiving a data read/write request from the computer 100 with respect to the storage area 125, the storage apparatus 120 converts the received request into a data read/write request with respect to the storage area 135, and transmits the request thus converted, to the virtual destination storage apparatus 130.

According to the request received from the storage apparatus 120, the virtual destination storage apparatus 130 executes data read or data write with respect to the physical storage area in the virtual destination storage apparatus 130, the physical storage area being associated with the storage area 135, and returns the result of the data read or data write as a response to the storage apparatus 120. Upon receiving the response from the virtual destination storage apparatus 130, the storage apparatus 120 converts the response into a response from the storage apparatus 120, and transmits the response thus converted to the computer 100.

In the case where the storage area 135 is virtualized by the storage apparatus 120 as described above, the storage area 135 is also referred to as a virtual destination storage area (or virtual destination LU). On the other hand, the storage area 125 virtualizing the storage area 135 is also referred to as a virtual storage area (or virtual LU). Meanwhile, when the storage area 125 is associated with the physical storage area in the storage apparatus 120, the storage area 125 is also referred to as a real storage area (or real LU).

The example of FIG. 1 includes only one storage area 125 and only one storage area 135. However, the storage apparatus 120 and the virtual destination storage apparatus 130 each may include a plurality of the storage areas 125 and a plurality of the storage areas 135, respectively. In this case, for example, at least one of the plurality of storage areas 125 may be the real storage area 125, and the rest of the storage areas 125 may be the virtual storage areas 125 virtualizing the storage areas 135.

Also, the CPU 122 of the storage apparatus 120 receives an operation management manipulation request with respect to the storage apparatus 120, from the management computer 140 through the management I/F 126, and executes the requested management manipulation. The CPU 122 transmits the result of the management manipulation, configuration information on the storage apparatus 120, or the like, to the management computer 140.

The cache memory 123 stores data received from the computer 100 and data frequently read from the storage area 125.

The control memory 124 stores configuration information of the storage area 125, attributes of the storage area 125 (for example, information as to whether the storage area 125 is encrypted or in plain text), and information on an encryption key or the like. Hereinafter, a state where the storage area 125 or the like is encrypted is also referred to as "encryption On", and a state where the storage area 125 or the like is not encrypted (that is, plain text data is stored) is also referred to as "encryption Off."

The storage apparatus 120 has a data encryption/decryption function. In other words, the storage apparatus 120, upon receiving a data write request with respect to the encrypted storage area, can encrypt the requested data and writes the data in the storage area. Then, when the storage apparatus 120 receives a data read request with respect to the encrypted storage area, from the computer 100, the storage apparatus 120 reads the requested data, decrypts the data thus read, and returns the decrypted data as a response to the computer 100.

The virtual destination storage apparatus 130 includes at least one FC I/F 131 coupled to the FC switch 110, at least one CPU 132, at least one cache memory 133, at least one control memory 134, at least one storage area 135, and at least one management I/F 136. Those units are coupled to one another through, for example, an internal bus.

The CPU 132 of the storage apparatus 130 receives a data read/write request from the computer 100 or from the storage apparatus 120 through the FC I/F 131, and reads or writes the requested data in the storage area 135. Also, the CPU 132 receives an operation management manipulation request with respect to the virtual destination storage apparatus 130, from the management computer 140 through the management I/F 136, and executes the requested management manipulation.

The virtual destination storage apparatus 130 is not limited to the one illustrated in FIG. 1, and may include, for example, a storage apparatus different in function, performance, or configuration, such as a storage apparatus which has a data encryption/decryption function and a storage apparatus which does not have a data encryption/decryption function.

The management computer 140 includes a CPU 141, a memory 142, and a management I/F 143. The management I/F 143 is coupled to the computer 100 and the FC switch 110 via the IP network.

The management computer 140, when activated, loads programs for managing storage apparatuses and computers, into the memory 142. The programs are stored in a non-volatile medium, such as a hard disk drive which is not shown, in the management computer 140. The CPU 141 executes the programs thus loaded, to thereby obtain configuration information on the storage apparatus 120 and on the virtual destination storage apparatus 130, detect a failure occurring in the storage apparatuses, and monitor the performance of the storage apparatuses. The management computer 140 enables an administrator to perform operation management of the computer system as a whole.

It should be noted that the above-mentioned programs may be stored in any other storage medium (such as a CD-ROM or a floppy disk) than the hard disk drive. The above-mentioned programs may be loaded from the storage medium into the management computer 140 to be executed, or may be loaded from further another storage medium via a network.

(Software Configuration)

Next, software configurations of the storage apparatus 120, the virtual destination storage apparatus 130, and the management computer 140 according to this embodiment will be described.

Figure 2:
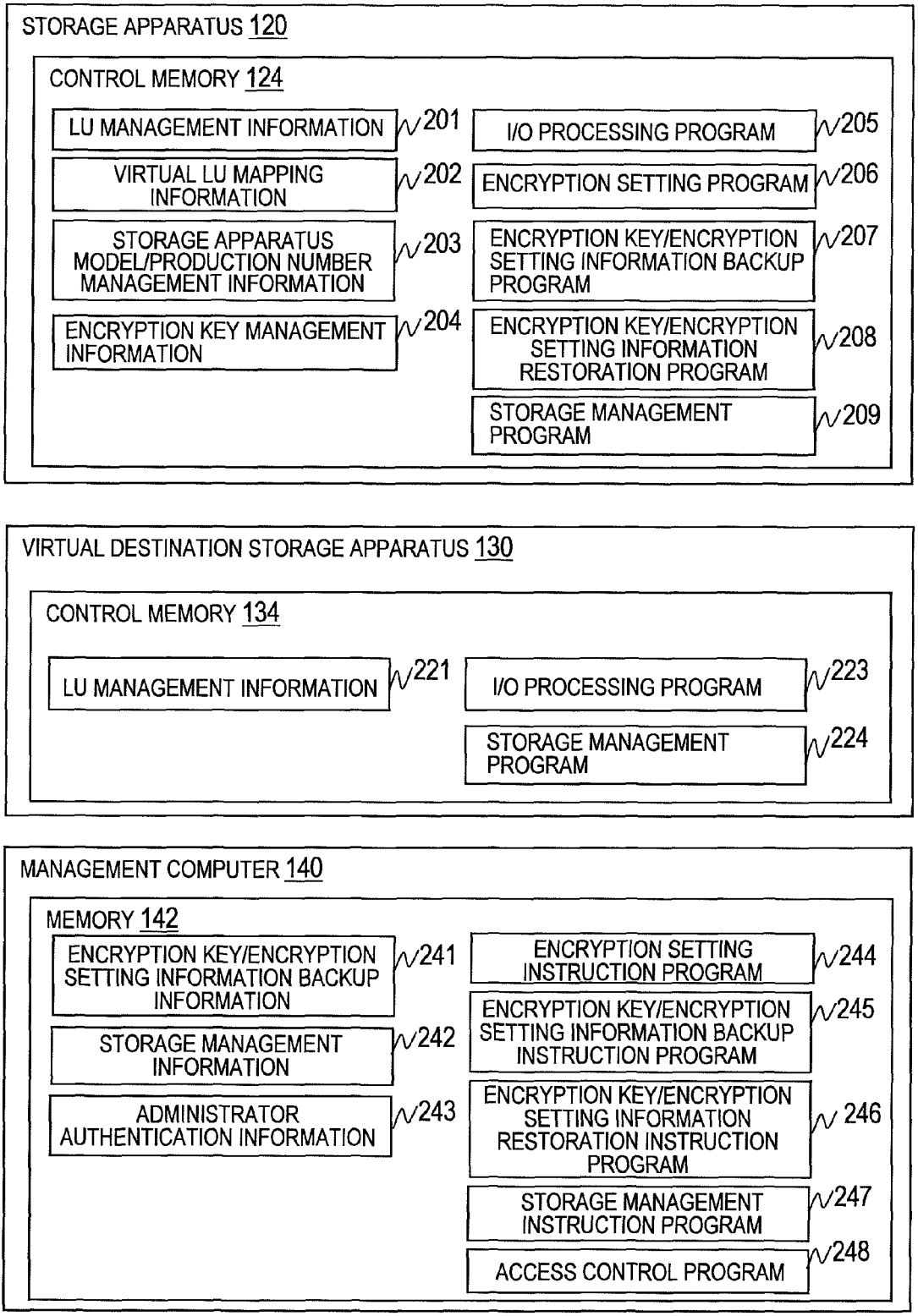
FIG. 2 is an explanatory diagram illustrating examples of software configurations in the computer system according to the first embodiment of this invention.

FIG. 2 is an explanatory diagram illustrating examples of the software configurations in the computer system according to the first embodiment of this invention.

The control memory 124 of the storage apparatus 120 stores configuration information for performing configuration management on the storage apparatus 120, encryption key management information, and program information including a program for data read/write and a program for making encryption settings. The configuration information includes an identifier and a capacity of the storage area 125. First, the configuration information will be described. After that, the encryption key management program and the program information will be described.

The control memory 124 stores, as the configuration information, storage area (hereinafter, also referred to as LU: Logical Unit) management information 201, virtual LU mapping information 202, storage apparatus model/production number management information 203, and encryption key management information 204.

First, the LU management information 201 will be described.

FIG. 3 is an explanatory diagram illustrating an example of the LU management information 201 according to the first embodiment of this invention.

The LU management information 201 includes seven data items including items 301 to 307.

The item 301 stores a port number of each storage apparatus 120. The port number has a uniquely-identifiable value, and is allocated to each port, which is not shown, provided to the FC I/F 121 of each storage apparatus 120. The storage apparatus 120 can define an LU for each port. The computer 100 accesses the LU through the port thus defined. Each storage apparatus 120 may include a plurality of the ports.

The item 302 stores an LU number for identifying the storage area (LU) 125 or 135. The LU number can be defined for each port. The computer 100 designates an access destination by using the port number and the LU number.

The item 303 stores a capacity of each LU.

The item 304 stores identification information for identifying each computer 100 that is allowed to access each LU. The item 304 stores, for example, a value such as a world wide name (WWN) allocated to a port of each computer 100 that is allowed to access the LU.

The item 305 stores information indicating whether each LU is an LU that uses the physical device in the storage apparatus 120 (that is, a real LU) or an LU that is created by virtualizing an LU in the virtual destination storage apparatus 130 (that is, a virtual LU).

The item 306 stores information indicating encryption On/Off of each LU. When a certain LU is encrypted, "On" is stored in the item 306 of each entry corresponding to the LU. When the LU is not encrypted, "Off" is stored in the item 306.

The item 307 stores a key ID corresponding to each LU. The key ID is for identifying, when encrypting a certain LU, an encryption key to be used for the encryption, and has a value for uniquely identifying each encryption key in each storage apparatus 120. When the LU is not encrypted, no value is defined in the item 307.

The key ID is synonymous with a key ID 601 which will be described later. Detailed information on an encryption key can be obtained based on the key ID.

Next, the virtual LU mapping information 202 will be described.

FIG. 4 is an explanatory diagram illustrating an example of the virtual LU mapping information 202 according to the first embodiment of this invention.

The virtual LU mapping information 202 includes five data items including items 401 to 405.

The item 401 stores a port number of each storage apparatus 120.

The item 402 stores an LU number of each virtual LU defined in each port of each storage apparatus 120.

The item 403 stores a virtual destination storage apparatus model/production number for uniquely identifying each virtual destination storage apparatus 130.

The item 404 stores a port number of each virtual destination storage apparatus 130 which is associated with each virtual LU in each storage apparatus 120. The storage apparatus 120 designates the port number and the LU number of an LU virtualized by the storage apparatus 120, to thereby access the LU in the virtual destination storage apparatus 130.

The item 405 stores an LU number in the virtual destination storage apparatus for identifying each LU in the virtual destination storage apparatus 130, which has been virtualized by each storage apparatus 120. The LU number corresponds to an LU number defined in the virtual destination storage apparatus 130.

Next, the storage apparatus model/production number management information 203 will be described.

FIG. 5 is an explanatory diagram illustrating an example of the storage apparatus model/production number management information 203 according to the first embodiment of this invention.

The storage apparatus model/production number management information 203 includes four data items including items 501 to 504.

The item 501 stores an apparatus model/production number of each storage apparatus 120.

The item 502 stores an IP address or a host name for identifying each storage apparatus 120, which is set to the management I/F 126 of each storage apparatus 120.

The item 503 stores information indicating an operation mode of each storage apparatus 120. Under normal conditions, a normal mode is set to the item 503. When a system option mode, which will be described later, is set, "system option mode" is set to the item 503.

The item 504 stores an apparatus model/production number of each virtual destination storage apparatus 130 which includes an LU virtualized by each storage apparatus 120. When the computer system includes at least one storage apparatus 120 and at least one virtual destination storage apparatus 130, each one of the storage apparatuses 120 and the virtual destination storage apparatuses 130 can be uniquely identified by the apparatus model/production number.

The storage apparatus 120 manages the above-mentioned three kinds of information as the configuration information, and uses the information for performing configuration management on the storage apparatus 120. Further, the configuration information may include any other information than the above, such as information indicating a status of each LU (copy status or the like).

Next, the encryption key management information 204 of the storage apparatus 120 will be described.

FIG. 6 is an explanatory diagram illustrating an example of the encryption key management information 204 according to the first embodiment of this invention.

The encryption key management information 204 includes seven data items including items 601 to 607.

The item 601 stores a key ID which is used for identifying each encryption key in each storage apparatus 120.

The item 602 stores data on each encryption key (that is, a data string used as an encryption key).

The item 603 stores a value indicating a length of each encryption key.

The item 604 stores algorithmic information indicating which encryption algorithm or mode is used by each encryption key. For example, when data is encrypted in ECB mode of AES, "AES-ECB" is stored in the item 604.

The item 605 stores information indicating an application destination apparatus to which each encryption key is applied. For example, when the encryption key is used for encrypting a real LU in a storage apparatus 120, a value indicating that the encryption key is for an own apparatus ("own" in the example of FIG. 6) is stored in the item 605 corresponding to the encryption key. On the other hand, the encryption key is used for encrypting a virtual destination LU in a virtual destination storage apparatus 130, a value indicating that the encryption key is for a virtual destination storage apparatus ("virtual destination" in the example of FIG. 6) is stored in the item 605 corresponding to the encryption key.

The item 606 stores an apparatus model/production number of each virtual destination storage apparatus 130.

The item 607 stores information indicating an application range of the encryption key. For example, a certain encryption key is used for encrypting all the LUs 135 which are set to "encryption On" in a certain storage apparatus 120 or a certain virtual destination storage apparatus 130, "apparatus" is stored in the item 607 of an entry corresponding to the encryption key and the storage apparatus. On the other hand, when a certain encryption key is used for encrypting one LU, the LU number of the LU to which the encryption key is applied is stored in the item 607 corresponding to the encryption key.

In this embodiment, a description is given mainly of a case where an encryption key to be used for the LUs 125 in the storage apparatus 120 is different from an encryption key to be used for the LUs 135 in the virtual destination storage apparatus 130. The reason for using different encryption keys for different storage apparatuses is as follows. When the same encryption key is used for all the storage apparatuses, in a case where the encryption key has leaked out from one of the storage apparatuses, the encryption keys for the other storage apparatuses are also made to be known, which is not preferable in terms of security. However, this invention is not limited to the above-mentioned embodiment, and this embodiment can also be applied to a case where the same encryption key is used for all storage apparatuses.

Next, program information of the storage apparatus 120 will be described. As illustrated in FIG. 2, the program information of the storage apparatus 120 includes five programs including: an I/O processing program 205; an encryption setting program 206; an encryption key/encryption setting information backup program 207; an encryption key/encryption setting information restoration program 208; and a storage management program 209. Those programs are executed by the CPU 122. Accordingly, in the following description, the processes to be executed by those programs are actually executed by the CPU 122.

The I/O processing program 205 is executed in response to an instruction from the computer 100. On the other hand, the other four programs are executed in response to an instruction from an administrator using the management computer 140.

Upon receiving a data read/write request from the computer 100, the I/O processing program 205 reads or writes data with respect to a storage area of the storage apparatus 120 or of the virtual destination storage apparatus 130.

The encryption setting program 206 makes encryption settings in a storage area of the storage apparatus 120 or of the virtual destination storage apparatus 130. For example, when the encryption setting of a storage area is set to be On, an encryption key is set for the storage area. After that, by using the encryption key, the I/O processing program encrypts data from the computer 100 and writes the encrypted data in the storage area, and decrypts data read from the storage area.

The encryption key/encryption setting information backup program 207 backs up an encryption key and configuration information (specifically, information held as the LU management information 201, the virtual LU mapping information 202, and the encryption key management information 204) held by the storage apparatus 120, to the management computer 140. In the following description, the information is also referred to as encryption key/encryption setting information.

The encryption key/encryption setting information restoration program 208 determines whether it is possible or not to restore a backup file received from the management computer 140, to the storage apparatus 120, and permits or prohibits the restoration.

The storage management program 209 executes other functions provided to the storage apparatus 120, including a function of setting a path between the storage apparatus 120 and the computer 100, and a function of copying the storage area. Described above is the software configuration of the storage apparatus 120.

Next, the software configuration of the virtual destination storage apparatus 130 will be described.

The control memory 134 of the virtual destination storage apparatus 130 stores LU management information 221, which is similar to the LU management information 201 of the storage apparatus 120. The LU management information 221 manages information on the LU number, the capacity, and an accessible computer in the virtual storage apparatus 130.

Further, the control memory 134 stores, as program information, an I/O processing program 223 and a storage management program 224. Those programs are executed by the CPU 132. Accordingly, in the following description, the processes to be executed by those programs are actually executed by the CPU 132.

The I/O processing program 223 processes a data read/write request from the computer 100 or from the storage apparatus 120. According to an instruction received from the management computer 140, the storage management program 224 executes a function in the virtual destination storage apparatus 130, such as a function of setting a path between the virtual destination storage apparatus 130 and the computer 100. The software configuration of the virtual destination storage apparatus 130 may be the same as the software configuration of the storage apparatus 120.

Next, the software configuration of the management computer 140 will be described. The memory 142 of the management computer 140 stores encryption key/encryption setting information backup information 241, storage management information 242, and administrator authentication information 243.

The encryption key/encryption setting information backup information 241 includes information related to an encryption key and encryption settings backed up from the storage apparatus 120.

The storage management information 242 includes information for managing the storage apparatus 120 and the virtual destination storage apparatus 130. In general, the management computer 140 manages the storage apparatus 120 or the like based on the storage management information 242. The storage management information 242 is updated according to the update in configuration information in the storage apparatus 120 or in the virtual destination storage apparatus 130. As a result, the configuration information is synchronized between the management computer 140 and the storage apparatus 120 or the like.

The administrator authentication information 243 includes information to be used for authenticating an administrator using the management computer 140.

Next, the administrator authentication information 243 will be described.

FIG. 7 is an explanatory diagram illustrating an example of the administrator authentication information 243 according to the first embodiment of this invention.

The administrator authentication information 243 includes three data items including items 701 to 703.

The item 701 stores a user ID for uniquely identifying each administrator.

The item 702 stores a password of each administrator.

The item 703 stores role information for controlling an operation to be performed by each administrator using the management computer 140. For example, an administrator having a role of account administrator is allowed to create and delete account information in the management computer 140. An administrator having a role of security administrator is allowed to make encryption settings in the storage apparatus 120, to manage the encryption key/encryption setting information backup information 241 stored in the management computer 140. For example, only an administrator having a role of security administrator is allowed to give an instruction to backup and restore the encryption key/encryption setting information, which will be described later.

Next, the program information of the management computer 140 will be described. The program information of the management computer 140 includes five programs including: an encryption setting instruction program 244; an encryption key/encryption setting information backup instruction program 245; an encryption key/encryption setting information restoration instruction program 246; a storage management instruction program 247; and an access control program 248. Those programs are executed by the CPU 141. Accordingly, in the following description, the processes to be executed by those programs are actually executed by the CPU 141.

The encryption setting instruction program 244 instructs the storage apparatus 120 to make encryption settings including the encryption of the storage area.

The encryption key/encryption setting information backup instruction program 245 instructs the storage apparatus 120 to backup an encryption key and encryption setting information.

The encryption key/encryption setting information restoration instruction program 246 transmits the encryption key/encryption setting information backup information 241 stored in the management computer 140 to the storage apparatus 120, and instructs the storage apparatus 120 to restore the encryption key/encryption setting information.

The storage management instruction program 247 instructs the storage apparatus 120 and the virtual destination storage apparatus 130 to execute any other function than the encryption setting function, such as a function of setting a path between the computer 100 and the storage apparatuses 120 and 130.

The access control program 248 authenticates an administrator using the management computer 140, based on the administrator authentication information 243, and permits or prohibits the execution of the management operation requested by the administrator.

Described above are the software configurations of the storage apparatus 120, the virtual destination storage apparatus 130, and the management computer 140 according to this embodiment.

In the following, a detailed description will be given of a series of processes to be performed from the backup to the restoration of the encryption key/encryption setting information according to this embodiment based on the above-mentioned software configurations. The series of processes includes five processes described below. The first process is to generate an encryption key and make encryption settings of the storage area in the storage apparatus 120. The second process is to instruct the storage apparatus 120, by the management computer 140, to back up the encryption key/encryption setting information. The third process is to backup, by the storage apparatus 120 which has received the instruction, the encryption key/encryption setting information to the management computer 140. The fourth process is to send, by the management computer 140, the backed-up information to a restoration destination storage apparatus to instruct the restoration. The fifth process is to determine, by the storage apparatus which has received the restoration instruction, whether it is possible or not to restore the backed-up information and to restore the information. Hereinbelow, those processes will be described in detail (Encryption Setting Process Performed by Storage Apparatus)

Figure 9:
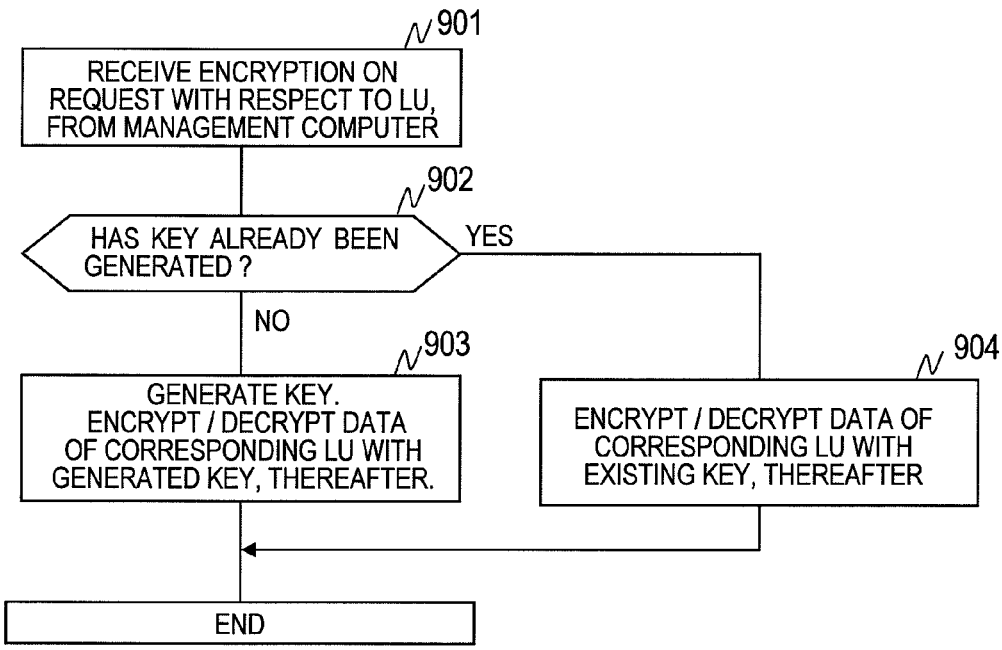
FIG. 9 is a flowchart illustrating an example of an encryption setting process to be performed by an encryption setting program of a storage apparatus according to the first embodiment of this invention.

FIG. 9 is a flowchart illustrating an example of the encryption setting process to be performed by the encryption setting program 206 of the storage apparatus 120 according to the first embodiment of this invention.

The encryption setting program 206 of the storage apparatus 120 receives, from the management computer 140, an encryption request with respect to a storage area of the storage apparatus 120 or the virtual destination storage apparatus 130 (Step 901).

Next, the encryption setting program 206 determines whether an encryption key to be applied to the storage area has already been generated or not (Step 902). For example, the encryption setting program 206 refers to the information included in the item 307 of an entry corresponding to the storage area designated by the encryption request, and judges that, in a case where a key ID is not stored, the encryption key is yet to be generated.

In the case where the encryption key is yet to be generated, the encryption setting program 206 generates a new encryption key, and adds the new encryption key thus created, to the encryption key management information 204. After that, the encryption setting program 206 encrypts or decrypts data stored in the designated storage area, by using the new encryption key thus generated (Step 903).

In the case where the encryption key has already been generated, the encryption setting program 206 encrypts or decrypts data stored in the designated storage area 125, by using the encryption key that has already been generated (Step 904). The procedure for performing the encryption or the decryption is similar to that in Step 903. According to this flowchart, an encryption key is set for each storage area, but an encryption key may be set for each storage apparatus. For example, there may be adopted a flowchart for setting two keys including a key to be used for encrypting the storage area 125 of the storage apparatus 120 and a key to be used for encrypting the storage area 135 of the virtual destination storage apparatus 130.

As shown in Step 903 and Step 904, after an encryption key is set to the storage area 125, the I/O processing program 205 of the storage apparatus 120, upon receiving a data write request with respect to the storage area 125, encrypts the data by using the set encryption key and writes the encrypted data in the storage area 125. Upon receiving a data read request to read data from the storage area 125, the I/O processing program 205 reads the requested data and decrypts the read data by the set encryption key, and transmits the decrypted data to the transmission source of the request.

In a case where the storage area 125 is a virtual storage area virtualizing the storage area 135, the I/O processing program 205, which has received a data write request, encrypts data and transmits a request to write the encrypted data, to the virtual destination storage apparatus 130. The virtual destination storage apparatus 130 stores the received data in the virtual destination storage area 135. The I/O program 205, which has received a data read request, reads the encrypted data from the virtual destination storage area 135 of the virtual destination storage apparatus 130 and decrypts the read data, and transmits the decrypted data to the transmission source of the request.

In a case where a physical disk drive (such as an HDD) corresponding to the storage area 125 or the storage area 135 is illegally taken outside and coupled to another storage apparatus which is not shown, the other storage apparatus cannot use the data stored in the HDD because the storage apparatus does not have an encryption key necessary for decrypting the data stored in the HDD. In this manner, it is possible to prevent data from being illegally taken out.

However, due to a failure which has occurred in the storage apparatus 120, there may be a case where an encryption key or encryption setting information held by the storage apparatus 120 is lost. The failure in this case refers to a hardware failure, volatilization of a memory storing the encryption key or the encryption setting information, a software failure, or an operational error made by a user. In this case, even the storage apparatus 120 cannot use data stored in the storage area 125. In the case where the storage area 135 in the virtual destination storage area 130 is virtualized by the storage apparatus 120, the storage apparatus 120 cannot use the data stored in the storage area 135 despite that no failure is occurring in the virtual destination storage apparatus 130.

In order to allow the storage apparatus 120 to use the data stored in the storage area 125 or 135 even in the above-mentioned cases, the encryption key and the encryption setting information are backed up by the management computer 140, according to this embodiment. In the case where a failure has occurred in the storage apparatus 120, the encryption key and the encryption setting information thus baked up are restored to an appropriate one of the storage apparatuses 120. Hereinbelow, a description will be given of the backup and the restoration described above.

(Backup Instruction Process Performed by Management Computer)

Figure 10:
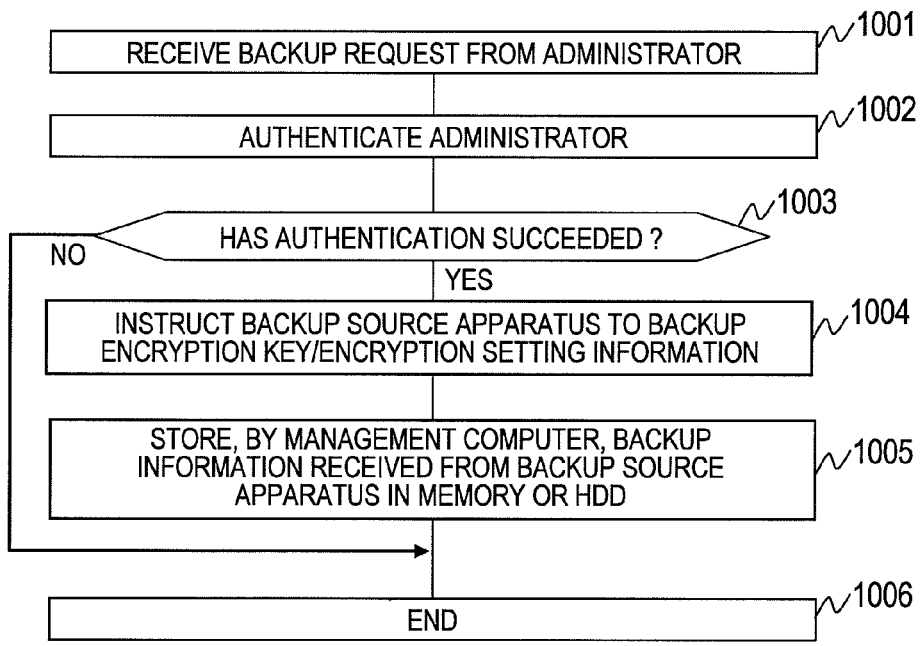
FIG. 10 is a flowchart illustrating an example of an encryption key/encryption setting information backup process performed by an encryption key/encryption setting information backup instruction program of a management computer according to the first embodiment of this invention.

FIG. 10 is a flowchart illustrating an example of an encryption key/encryption setting information backup process performed by the encryption key/encryption setting information backup instruction program 245 of the management computer 140 according to the first embodiment of this invention.

The encryption key/encryption setting information backup instruction program 245 of the management computer 140, upon receiving an encryption key/encryption setting information backup request from an administrator (Step 1001), authenticates the administrator based on the administrator authentication information 243 (Step 1002, Step 1003). Specifically, the encryption key/encryption setting information backup instruction program 245 judges that the authentication of the administrator has succeeded, in a case where a user ID and a password received from the administrator each have been registered in the item 701 and the item 702, respectively, of any one of the entries included in the administrator authentication information 243 and "security administrator" is set to the item 703 of the entry.

In the case where the authentication of the administrator has failed, the process is ended.

On the other hand, the authentication of the administrator has succeeded, the administrator instructs, from the management computer 140, the storage apparatus 120 to backup the encryption key/encryption setting information (Step 1004). For example, the administrator gives the backup instruction at any time point before a failure occurs in the storage apparatus 120 (for example, a time point at which the encryption key is generated or the encryption setting is changed). The storage apparatus 120, which has received the backup instruction, transmits the encryption key/encryption setting backup information 241 to the management computer 140. This process and the encryption key/encryption setting information backup information 241 will be described later in detail (with reference to FIGS. 11 and 8).

The management computer 140, upon receiving the encryption key/encryption setting information backup information 241 from the storage apparatus 120, stores the received information in the memory 142 of the management computer 140 or in a non-volatile recording medium such as a hard disk drive (HDD), which is not shown, of the management computer 140 (Step 1005).

(Backup Process in Storage Apparatus)

Figure 11:
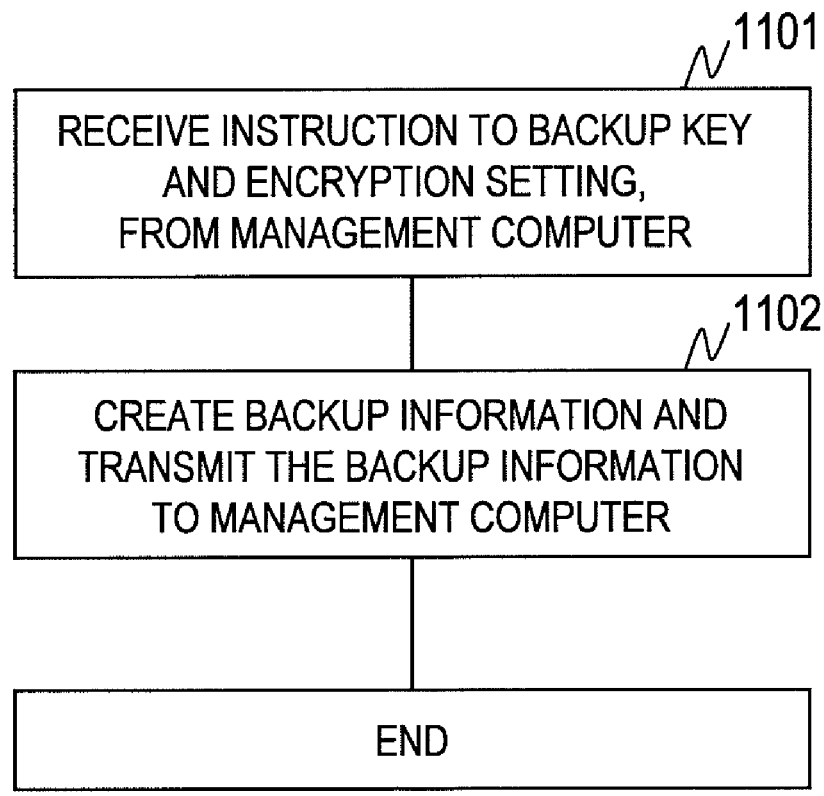
FIG. 11 is a flowchart illustrating an example of an encryption key/encryption setting information backup process performed by an encryption key/encryption setting information backup program of the storage apparatus according to the first embodiment of this invention.

FIG. 11 is a flowchart illustrating an example of an encryption key/encryption setting information backup process performed by the encryption key/encryption setting information backup program 207 of the storage apparatus 120 according to the first embodiment of this invention.

The encryption key/encryption setting information backup program 207 of the storage apparatus 120, upon receiving an encryption key/encryption setting information backup request from the management computer 140 (Step 1101), creates encryption key/encryption setting information backup information 241, and transmits the created information to the management computer 140 (Step 1102). The backup of the encryption key/encryption setting information may also be performed in a case where no instruction is given by the management computer 140. For example, the encryption key/encryption setting information backup program 207 may automatically back up the encryption key/encryption setting information to a predetermined location, when the encryption key or the encryption setting is changed in the storage apparatus 120.

FIG. 8 is an explanatory diagram illustrating an example of the encryption key/encryption setting information backup information 241 according to the first embodiment of this invention.

The encryption key/encryption setting information backup information 241 includes two kinds of information including data items 801 and 810.

The data item 801 includes duplicate information of the LU management information 201 and the virtual LU mapping information 202.

The data item 810 includes backup information of the encryption key management information 204, and includes eight data items including items 811 to 818.

The item 811 stores a model/production number of each backup source storage apparatus 120. In this case, the backup source storage apparatus 120 corresponds to a storage apparatus 120 which is a copy source of the data item 801 and the items 812 to 818 to be described later.

The items 812 to 818 each correspond to the items 601 to 607 of the encryption key management information 204, and therefore the description thereof will be omitted. The items 811 and 817 may store any other value than the apparatus model/production number, as long as the value is capable of uniquely identifying each backup source storage apparatus 120 or each virtual destination storage apparatus 130 in the computer system.

(Restoration Instruction Process Performed by Management Computer)

Figure 12A:
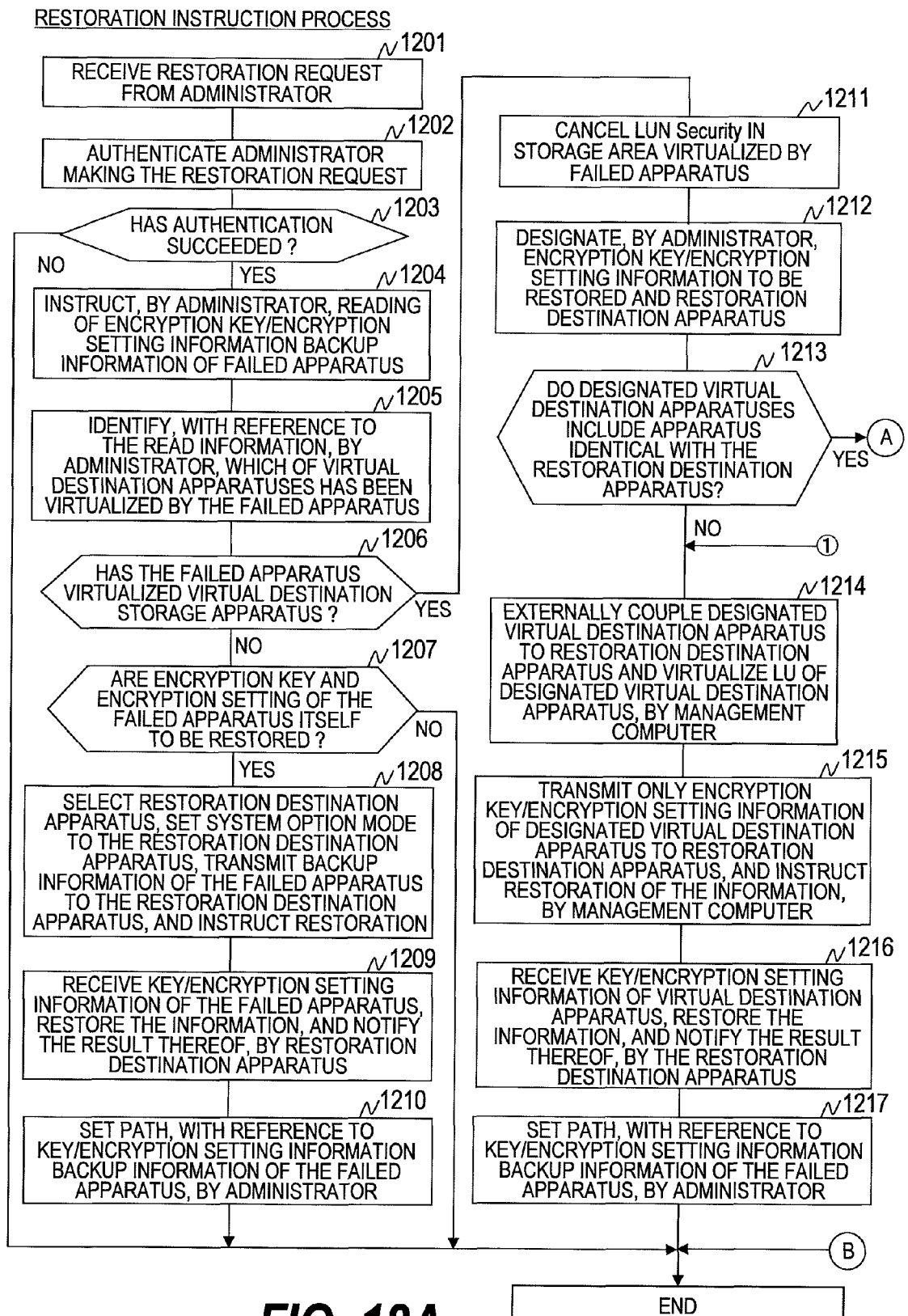
FIGS. 12A and 12B are flowcharts illustrating an example of a restoration instruction process to be performed by an encryption key/encryption setting information restoration instruction program of the management computer with respect to the storage apparatus or a virtual destination storage apparatus, according to the first embodiment of this invention.
Figure 12B:
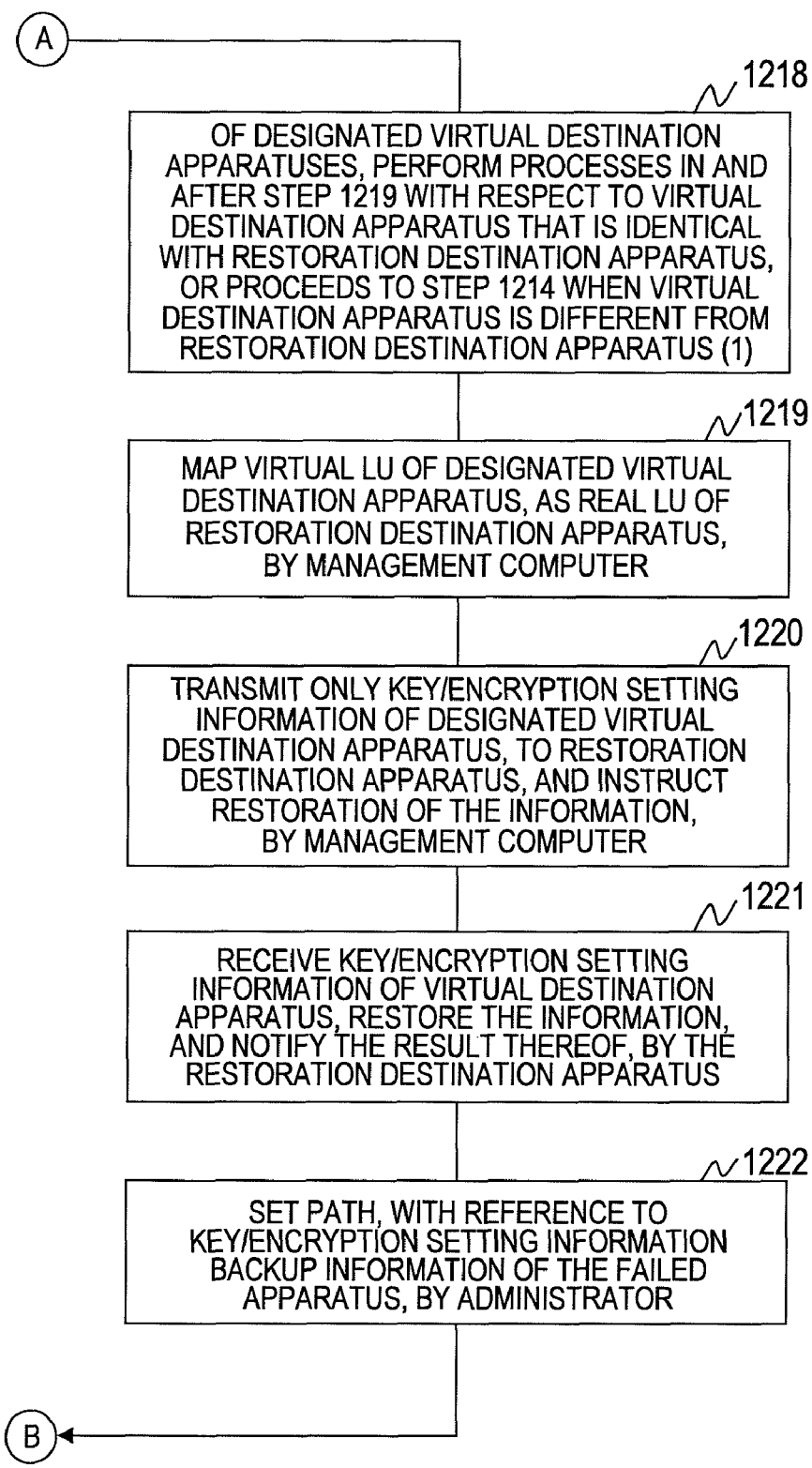

FIGS. 12A and 12B are flowcharts illustrating an example of a restoration instruction process to be performed by the encryption key/encryption setting information restoration instruction program 246 of the management computer 140 with respect to the storage apparatus 120 or the virtual destination storage apparatus 130, according to the first embodiment of this invention.

The procedure illustrated in FIGS. 12A and 12B are an example of a process to be performed, in a case where the encryption key/encryption setting information stored in the storage apparatus 120 has been lost due to a failure in the storage apparatus 120, the process being for restoring the encryption key/encryption setting information by using the encryption key/encryption setting information which has been backed up in the management computer 140.

Types of the restoration according to this embodiment will now be described.

Hereinbelow, with reference to FIG. 1, a description will be given of a case, by way of example, where the storage apparatus 120A virtualizes the virtual destination storage apparatus 130. The storage apparatus 120A includes a plurality of storage areas 125, and at least one of the storage areas 125 is a real storage area, and the rest of the storage areas 125 include virtual storage areas virtualizing the storage areas 135. In other words, data written into each virtual storage area is actually stored in the storage area 135 corresponding to the virtual storage area. In this case, the storage apparatus 120A stores an encryption key and encryption setting information (in this case, referred to as encryption key or the like) to be used for the real storage area of the storage apparatus 120A and an encryption key or the like for each virtual storage area of the storage apparatus 120A.

When the storage apparatus 120A fails, the encryption key or the like stored in the storage apparatus 120A is lost. Accordingly, it is necessary to restore the encryption key or the like which has been backed up in the management computer 140 to any of the storage apparatuses.

First, a description will be given of the restoration of the encryption key or the like to be used for each virtual storage area in a case where the storage apparatus 120A has not been recovered from the failure.

Even in the case where the storage apparatus 120A has not been recovered from the failure, data stored in a virtual storage area is actually stored in the storage area 135 corresponding thereto. Accordingly, when the virtual destination storage apparatus 130 is newly coupled externally to the storage apparatus 120B (in other words, when the storage apparatus 120B newly virtualizes the virtual destination storage apparatus 130), the computer 100 can access the data stored in the virtual storage area. Alternatively, the computer 100 may access the virtual destination storage apparatus 130 without through the storage apparatus 120B.

Accordingly, an administrator may designate, as a destination to which the encryption key or the like to be used for the virtual storage area is restored, the storage apparatus 120B or the virtual destination storage apparatus 130 itself.

In the case where the storage apparatus 120B is designated as the restoration destination, the encryption key or the like set to the virtual storage area is restored to the storage apparatus 120B. Then, in place of the storage apparatus 120A, the storage apparatus 120B virtualizes the virtual destination storage apparatus 130. The storage apparatus 120B can correctly decrypt data read from the storage area 135, by using the restored encryption key.

On the other hand, in the case where the virtual destination storage apparatus 130 itself is designated as the restoration destination, the encryption key or the like set to the virtual storage area is restored to the virtual destination storage apparatus 130. In this case, the virtual destination storage apparatus 130 is no longer virtualized by any other storage apparatuses 120. In other words, the virtual destination storage apparatus 130 receives a data read/write request with respect to the storage area 135 from the computer 100 without through the storage apparatus 120, and processes the request. In this case, the virtual destination storage apparatus 130 can correctly decrypt data read from the storage area 135, by using the restored encryption key, and return the decrypted data as a response to the computer 100.

However, in order to process, by the virtual destination storage apparatus 130, an access request transmitted without through the storage apparatus 120, it is necessary to provide the virtual destination storage apparatus 130 with a function of encrypting and decrypting data and a function of managing an encryption key. Specifically, the virtual destination storage apparatus 130 needs to be provided with at least such information and programs as to correspond to the encryption key management information 204, the encryption setting program 206, the encryption key/encryption setting information backup program 207, and the encryption key/encryption setting information restoration program 208. Further, the I/O processing program 223 needs to be provided with a function of executing encryption and decryption.

Next, a description will be given of the restoration of the encryption key or the like to be used for the real storage area in a case where the storage apparatus 120A has not been recovered from the failure.

Even when the storage apparatus 120A has failed, as long as data stored in a disk drive of the storage apparatus 120A has not been lost, it is possible to access the data stored in the disk drive (that is, data stored in a real storage area corresponding to the disk drive) by coupling the disk drive to the storage apparatus 120B or to the virtual destination storage apparatus 130. In this case, after the disk drive is coupled to the storage apparatus 120B or to the virtual destination storage apparatus 130, the restoration similar to the above-mentioned restoration of the encryption key or the like of the virtual storage area is executed, to thereby correctly decrypt data stored in the disk drive.

Next, a description will be given of the restoration of the encryption key or the like in the case where the storage apparatus 120A has already been recovered from the failure.

There is a case where the storage apparatus 120A has already been recovered from the failure at a point in time of restoring the encryption key or the like which has been lost from the storage apparatus 120A. For example, the case corresponds to a case where the encryption key has been lost due to a restart or a temporary failure of the storage apparatus 120A, or an operational error of a user. In this case, an administrator can designate the recovered storage apparatus 120A itself as the restoration destination, rather than designating the storage apparatus 120B or the virtual destination storage apparatus 130 as the restoration destination of the encryption key or the like as described above. As a result, the lost encryption key or the like is restored to the storage apparatus 120A that has originally stored the same encryption key (in other words, the storage apparatus 120A as a backup source).

The processes to be performed in each of the above-mentioned cases will be described below in detail.

It should be noted that, according to this embodiment, a restoration instruction procedure to be performed by the management computer 140 includes three different restoration instruction procedures. First, the restoration instruction procedure illustrated in FIGS. 12A and 12B will be described. Other restoration instruction procedures illustrated in FIGS. 15 and 16 will be described in the end of this embodiment, as modification examples.

The encryption key/encryption setting information restoration instruction program 246 of the management computer 140 receives a restoration request from an administrator (Step 1201).

Next, the encryption key/encryption setting information restoration instruction program 246 authenticates the administrator who has made the restoration request (Step 1202), and judges whether the authentication has succeeded or failed (Step 1203). The authentication and the judgment may be performed similarly to those in Step 1002 and Step 1003 of FIG. 10.

In the case where the authentication has failed, the process is ended. On the other hand, in the case where the authentication has succeeded, the administrator designates a failed storage apparatus (hereinafter, also referred to as failed apparatus), by using the management computer 140, and instructs the management computer 140 to read the encryption key/encryption setting information backup information 241 of the failed apparatus (Step 1204).

Next, the administrator identifies, based on the information read by the management computer 140, which one of the virtual destination storage apparatuses 130 has been virtualized by the failed apparatus (Step 1205), and judges whether the failed apparatus has virtualized or not any of the virtual destination storage apparatuses 130 (Step 1206). For example, the administrator refers to the data in the item 403 included in the encryption key/encryption setting information backup information 241, to thereby identify which one of the virtual destination storage apparatuses 130 has been virtualized by the failed apparatus.

In the case where the failed apparatus has not virtualized any of the virtual destination storage apparatuses 130, the administrator determines whether or not to restore the encryption key/encryption setting information of the failed apparatus itself, rather than the encryption key/encryption setting information of the virtual destination storage apparatus 130 (Step 1207).

In the case of restoring the encryption key/encryption setting information of the failed apparatus itself, the administrator designates the restoration destination storage apparatus (hereinafter, also referred to as restoration destination apparatus). The restoration destination corresponds to a copy destination to which the backed-up encryption key/encryption setting information is copied for restoration. For example, in a case where a failure has occurred in the storage apparatus 120A of FIG. 1, the storage apparatus 120B which has not failed may be designated as the restoration destination apparatus. Then, the administrator sets the system option mode to the restoration destination apparatus before transmitting the encryption key/encryption setting information backup information 241 of the failed apparatus, and instructs restoration of the information (Step 1208).

The system option mode will now be described.

When the system option mode is set to the storage apparatus 120, the encryption key/encryption setting information is allowed to be restored to the storage apparatus 120 even in the case where the backup source apparatus number included in the encryption key/encryption setting information backup information 241 is different from that of the own storage apparatus 120, or in the case where an encryption key has already been set to the storage apparatus 120.

In a case where the normal mode is set (that is, in a case where the system option mode is not set), of the encryption keys backed up from the storage apparatus 120, only an encryption key for the virtual destination storage apparatus 130 can be restored to the restoration destination apparatus. However, the storage apparatus 120 cannot restore an encryption key for the storage apparatus 120 unless the backup source apparatus and the restoration destination apparatus of the encryption key are the same. The reason for the above is to prevent a situation where the encryption key that has already been set to the restoration destination storage apparatus 120 is overwritten with another encryption key due to the restoration, with the result that it is made impossible to use data that has been stored in the storage area 125 by the storage apparatus 120 before the restoration.

However, there may be a case where, even when the storage apparatus 120 has failed, the disk drive storing data has not failed. In this case, the disk drive of the failed apparatus is transferred to the restoration destination apparatus, and the backed-up encryption key of the failed apparatus is restored to the restoration destination apparatus, to thereby make it possible to decrypt encrypted data in the disk drive.

Alternatively, in the case where an encryption key in the storage apparatus 120 has corrupted even when the storage apparatus 120 has not failed (for example, in the case where an encryption key is deleted by mistake), the corrupted encryption key is overwritten with another encryption key which has been backed up, to thereby make it possible to decrypt encrypted data in the storage system 120.

The system option mode is set to permit the overwriting of the encryption key for the purposes as described above. Accordingly, it is unnecessary, in general, to set the system option mode, except for the above-mentioned cases.

Next, the restoration destination apparatus receives the encryption key/encryption setting information backup information 241 of the failed apparatus, restores the information, and notifies the management computer 140 of the completion of the restoration (Step 1209). Specifically, when the restoration is executed, the LU management information 201, the LU mapping information 202, and the encryption key management information 204 of the restoration destination apparatus are overwritten with data included in the encryption key/encryption setting information backup information 241.

After the restoration in the restoration destination apparatus is completed, the administrator consults the encryption key/encryption setting information backup information 241 of the failed apparatus, and sets a path (that is, a route available for communication) between the storage area of the restoration destination apparatus and the computer 100, with reference to the path which has been set between the storage area of the failed apparatus and the computer 100 (Step 1210).

For example, in the case where the failed apparatus has set a path between an LU corresponding to the LU number "3" shown in the item 302 and the computer 100 identified by the WWN of "20:00:00:00:00:00:A1:7A" shown in the item 304, the administrator sets a path between the LU 125 of the restoration destination apparatus, which corresponds to the above-mentioned LU (that is, the LU 125 virtualizing the LU 135 of the virtual destination storage apparatus 130 which is the same as the LU 135 virtualized by the failed apparatus) and the computer 100 identified by the WWN of "20:00:00: 00:00:00:A1:7A".

Specifically, "20:00:00:00:00:00:A1:7A" is stored in the item 304 of each entry corresponding to the value "3" in the item 302 of the LU management information 201 of the restoration destination apparatus. When the setting is made as described above, it is indicated that the restoration destination apparatus allows the computer 100 identified by "20:00:00: 00:00:00:A1:7A" to access the LU "3".

Alternatively, it is also possible, after a failure or the like, to newly set a path different from the path that has been originally set. Further, the process in Step 1210 may be performed by the restoration destination apparatus itself, rather than by the administrator, with reference to the encryption key/encryption setting information backup information 241 of the failed apparatus received from the management computer 140.

In the case where the encryption key/encryption setting information of the failed apparatus itself is not to be restored in Step 1207, the process is ended.

In the case where, in Step 1206, the failed apparatus has virtualized the virtual destination storage apparatus 130, the administrator cancels the setting of "LUN Security" set in the storage area of the virtual destination storage apparatus 130 which has been virtualized by the failed apparatus (Step 1211). As a result, other storage apparatuses 120 are allowed to access the virtual destination storage apparatus 130. For example, the item 304 limits the computer 100 that can access each LU in the storage apparatus 120. The access restriction similar to the above is also considered to be set in the virtual destination storage apparatus 130. However, the process of Step 1211 is not necessarily performed. When the "LUN Security" has not originally been set in the storage area of the virtual destination storage apparatus 130, it is not necessary to perform Step 1211.

Next, the administrator selects, from the encryption key/encryption setting information backup information 241, the information backed up from the failed apparatus, designates the encryption key/encryption setting information of the virtual destination storage apparatus 130 to be restored (in other words, designates which one of the virtual destination storage apparatuses 130 is subjected to the restoration of the encryption key/encryption setting information), further designates the restoration destination apparatus to which the encryption key/encryption setting information is to be restored, and requests the restoration (Step 1212).

When the management computer 140 backs up the encryption key/encryption setting information of the storage apparatus 120 virtualizing a plurality of the virtual destination storage apparatuses 130, the management computer 140 may back up all the encryption key/encryption setting information of the storage apparatus 120 and the plurality of the virtual destination storage apparatuses 130 as a single file, or may back up the encryption key/encryption setting information for each virtual destination storage apparatus 130 as a single file. When the encryption key/encryption setting information is backed up for each virtual destination storage apparatus 130, the encryption key/encryption setting information is backed up as a plurality of items of information. In this case, in Step 1212, the information backed up from the failed apparatus is selected from the plurality of items of the encryption key/encryption setting information.

Also, in the case of the encryption key/encryption setting information backup information 241 of FIG. 8, when the administrator has designated, of the apparatuses registered in the item 817, only the apparatus having the number of "D600-100", the restoration of the encryption key and the encryption setting information of the virtual destination storage apparatus 130 indicated by the number (that is, information included in the items 813, 814, and 815 of the entries corresponding to the key IDs "2" to "4") is merely requested, while the restoration of the encryption key and the encryption setting information corresponding to the apparatus having the number "D700-110" is not requested. On the other hand, when the apparatuses having the numbers of "D600-100" and "D700-100" have been designated, the restoration of the encryption keys and the encryption setting information of the entries corresponding to the key IDs of "2" to "5" is requested.

Next, the management computer 140 judges whether or not at least one virtual destination storage apparatus 130 which has been designated by the administrator in Step 1212 includes an apparatus which is the same as the restoration destination apparatus (Step 1213). In other words, it is judged whether or not the encryption key and the encryption setting information of the virtual destination storage apparatus 130 which has been virtualized by the failed apparatus are restored to the same virtual destination storage apparatus 130 itself.

For example, in the case where it is designated in Step 1212 that the encryption keys and the encryption setting information of the virtual destination storage apparatuses having the numbers of "D600-100" and "D700-110" are to be restored to the virtual destination storage apparatus having the number of "D600-100", it is judged in Step 1213 that the encryption key and the encryption setting information of the virtual destination storage apparatus 130 that has been virtualized by the failed apparatus (that is, the virtual destination storage apparatus having the number of "D600-100") are to be restored to the same virtual destination storage apparatus 130 itself.

In the case where at least one virtual destination storage apparatus 130 which has been designated by the administrator does not include an apparatus which is the same as the restoration destination apparatus, the management computer 140 externally couples the designated virtual destination storage apparatuses 130 to the restoration destination apparatus, to thereby virtualize the LU 135 of each of the designated virtual destination storage apparatuses 130 (Step 1214). In other words, the storage area 135 of each of the designated virtual destination storage apparatuses 130 is virtualized by the restoration destination apparatus. For example, the management computer 140 makes each of the virtual destination storage apparatuses 130 be externally coupled based on the information included in the item 404.

Next, the management computer 140 transmits, of the encryption key/encryption setting information backup information 241 designated by the administrator, only the encryption key/encryption setting information of the virtual destination storage apparatus 130 designated by the administrator, to the restoration destination apparatus and instructs restoration of the information (Step 1215).

The restoration destination apparatus, upon receiving the encryption key/encryption setting information of the virtual destination storage apparatus 130 from the management computer 140, executes the restoration process (Step 1216). Specifically, the restoration destination apparatus judges whether it is possible or not to restore the received encryption key/encryption setting information. In the case where the restoration is possible, the restoration destination apparatus adds the received encryption key/encryption setting information to the LU management information 201, the virtual LU mapping information 202, and the encryption key management information 204 held by the restoration destination apparatus. Then, the restoration destination apparatus notifies the management computer 140 of the result of the restoration. The restoration process in the storage apparatus 130 will be described later in detail.

Next, the administrator consults the encryption key/encryption setting information backup information 241 of the failed apparatus, and, with respect to each of the restored virtual LUs of the virtual LUs (that is, virtualized LUs of the virtual destination storage apparatuses 130) of the failed apparatus and the computer 100, with reference to the path which has been set between the corresponding LU and the computer 100, sets a path between the virtual LU (LU virtualized in Step 1214) of the restoration destination apparatus and the computer 100 (Step 1217).

For example, in FIG. 1, in the case where a failure has occurred in the storage apparatus 120A which virtualizes the virtual destination storage apparatus 130 and the encryption key or the like which has been set to the storage area 125 of the storage apparatus 120A is restored to the storage apparatus 120B, the administrator sets a path between the virtual storage area, which is not shown, of the storage apparatus 120B which is the restoration destination and the computer 100. When the path is set as described above, it is indicated that the storage apparatus 120B allows the computer 100 to access the virtual storage area of the storage apparatus 120B. The path may be set in the same manner as in, for example, Step 1210.

In the case where it is determined in Step 1213 that at least one virtual destination storage apparatus 130 designated by the administrator includes an apparatus which is the same as the restoration destination apparatus, the process proceeds to Step 1218 to restore the encryption key/encryption setting information of the apparatus same as the restoration destination apparatus, and then proceeds to Step 1214 to restore the encryption key/encryption setting information of an apparatus different from the restoration destination apparatus (Step 1218).

The processes in Steps 1214 to 1217 have already been described, and therefore the processes to be performed in and after Step 1218 will be described below.

The management computer 140 maps the virtual LU of the virtual storage apparatus 130 (that is, the restoration destination apparatus) designated by the administrator, as the real LU of the restoration destination apparatus (Step 1219).

For example, an LU corresponding to the LU number "3" in the item 402 corresponds to a virtual LU having the LU number "1" in the virtual destination storage apparatus 130, which has been virtualized by the failed apparatus. A description will be given of a case where the encryption setting information of the LU having the LU number "3" (for example, information included in the items 306 and 307) is to be restored to the virtual storage apparatus 130 itself. In this case, the management computer 140 does not instruct the virtual destination storage apparatus 130 to virtualize the LU having the LU number "1" in the own apparatus. As a result, the virtual destination storage apparatus 130 recognizes the LU having the LU number "1" as a real LU which actually exists in the own apparatus. Specifically, in the LU management information 201 held by the failed apparatus, the LU having the LU number "3" has the item 305 set to "virtual". However, when the backup information shown in FIG. 8 of the LU management information 201 is restored to the virtual destination storage apparatus 130, the LU number "3" is changed to the LU number "1", and "real" is set to the item 305. Further, the virtual LU mapping information which has been registered in correspondence with the LU number "3" in the item 402 of the virtual LU mapping information 202 is deleted.

Next, the management computer 140 transmits, of the encryption key/encryption setting information backup information 241 selected by the administrator, only the encryption key/encryption setting information of the virtual destination storage apparatuses 130 designated by the administrator, and instructs restoration of the information (Step 1220).

The restoration destination apparatus, upon receiving the encryption key/encryption setting information of the virtual destination storage apparatus 130 from the management computer 140, restores the information (Step 1221). Specifically, the restoration destination apparatus adds the received encryption key/encryption setting information to the LU management information 201, the virtual LU mapping information 202, and the encryption key management information 204 held by the restoration destination apparatus. At this time, the restoration destination apparatus changes the values in the information as described in Step S1219. Then, the restoration destination apparatus notifies the management computer 140 of the result of the restoration.

Next, the administrator consults the encryption key/encryption setting information backup information of the failed apparatus, and sets a path between the real LU mapped in the restoration destination apparatus and the computer 100, with reference to the path which has been set between the virtual LU of the failed apparatus and the computer 100 (Step 1222).

For example, in FIG. 1, in the case where a failure has occurred in the storage apparatus 120A which virtualizes the virtual destination storage apparatus 130 and the encryption key or the like which has been set to the storage area 125 of the storage apparatus 120A is restored to the virtual destination storage apparatus 130, the administrator sets a path between the storage area 135 of the virtual destination storage apparatus 130 and the computer 100. When the path is set as described above, it is indicated that the virtual destination storage apparatus 130 allows the computer 100 to access the storage area 135. The path is set in the same manner as in, for example, Step 1210.

Described above is the process flow of giving a restoration instruction from the management computer 140 to the restoration destination storage apparatus.

It should be noted that, in Step 1219, the management computer 140 may directly instruct the restoration destination apparatus to change the encryption settings in the encryption key/encryption setting information of the virtualized restoration destination apparatus itself, apart from the restoration instruction which is also to be given by the management computer 140 by sending the encryption key/encryption setting information backup information 241.

Also, in Step 1219, the management computer 140 may create, as regards the encryption key/encryption setting information of the restoration destination apparatus itself, new encryption key/encryption setting information backup information 241 based on the encryption key/encryption setting information backup information 241, and transmit the new encryption key/encryption setting information backup information 241, to thereby instruct restoration of the information. In this case, the apparatus model/production number of the restoration destination apparatus is set as the backup source apparatus model/production number (item 811) in the encryption key/encryption setting information backup information 241, and the LU number in the item 302 in the restoration destination apparatus is replaced by the LU number in the item 405, and the item 305 of the corresponding LU is changed from "virtual" to "real", to thereby create the new encryption key/encryption setting information backup information 241.

After the restoration has succeeded, in order to prevent the LU of the virtual destination storage apparatus 130 from being accessed by any other storage apparatuses 120 than the restoration destination apparatus, the LUN security may be set to restrict the access.

(Restoration Process Executed by Storage Apparatus)

Figure 13A:
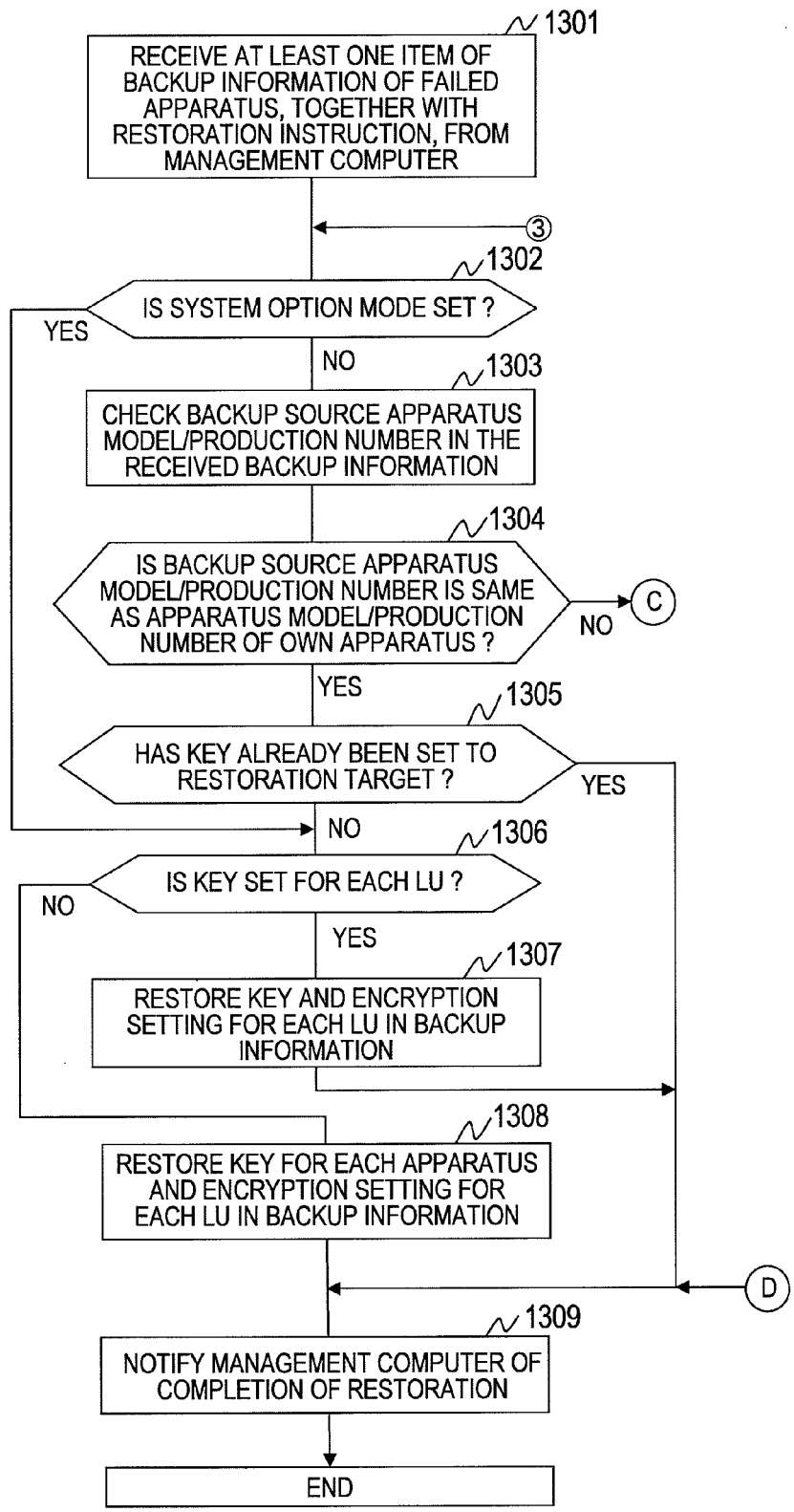
FIGS. 13A and 13B are flowcharts illustrating an example of a restoration process executed by a storage apparatus which has received a restoration instruction from the management computer according to the first embodiment of this invention.
Figure 13B:
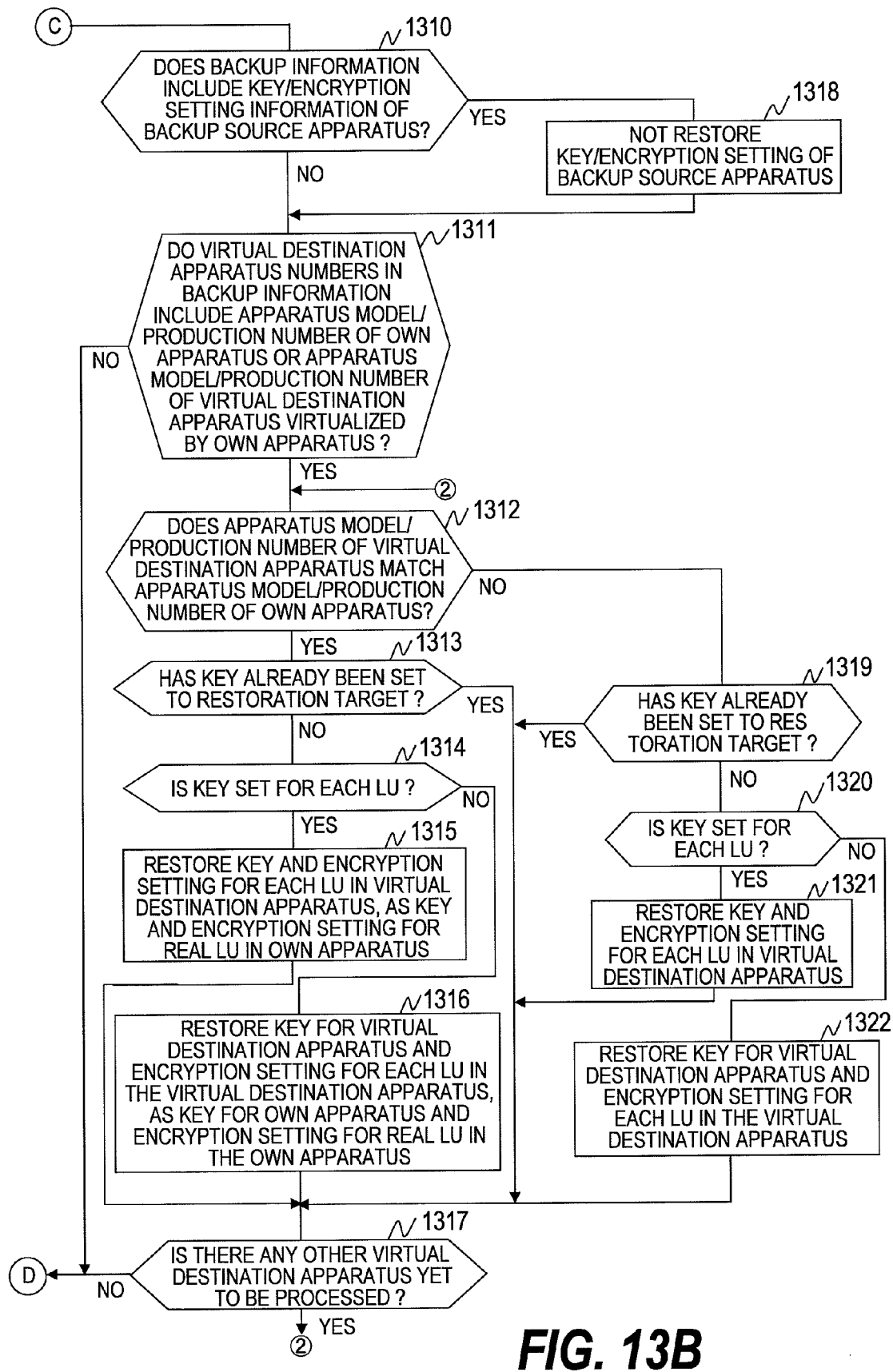

FIGS. 13A and 13B are flowcharts illustrating an example of a restoration process executed by a storage apparatus which has received a restoration instruction from the management computer 140 according to the first embodiment of this invention.

As has already been described, the storage apparatus 120 or the virtual destination storage apparatus 130 is designated as the restoration destination apparatus. The process illustrated in FIGS. 13A and 13B is executed by the storage apparatus 120 or the virtual destination storage apparatus 130 which has received the restoration instruction. The "storage apparatus" which executes each of the steps of FIGS. 13A and 13B is the storage apparatus 120 or the virtual destination storage apparatus 130 which has received the restoration instruction. The same applies to the modification examples shown in FIGS. 14 and 17.

The storage apparatus receives, together with the restoration instruction, at least one item of the encryption key/encryption setting information backup information 241 of the failed apparatus, from the management computer 140 (Step 1301). In this case, the received restoration instruction and the received encryption key/encryption setting information backup information 241 are those transmitted in one of Steps 1208, 1215, and 1220 of FIGS. 12A and 12B.

Next, the storage apparatus judges whether or not the system option mode is set to the own apparatus (Step 1302). The judgment is, for example, made based on the information in the item 503 of the storage apparatus model/production number management information 203.

In the case where the system option mode is not set, the storage apparatus refers to the backup source apparatus model/production number (item 811) in the encryption key/encryption setting information backup information 241 received from the management computer 140 (Step 1303).

Next, the storage apparatus judges whether the backup source apparatus model/production number referred to in Step 1303 matches the apparatus model/production number (item 501) of the own storage apparatus (Step 1304).

In the case where the backup source apparatus model/production number matches the apparatus model/production number of the own storage apparatus, it has been instructed to restore the encryption key or the like backed up from the storage apparatus 120 to the same storage apparatus 120 itself. In this case, the storage apparatus 120 judges whether or not the restoration target has already had an encryption key set thereto (Step 1305). The judgment is made based on the information in the item 307 of the LU management information 201.

It should be noted that in the case where an encryption key is set for each storage area (LU) 125, the restoration target corresponds to a storage area 125 to which the encryption key or the like to be restored is to be set. In the case where an encryption key is set for each storage apparatus, the restoration target corresponds to the storage apparatus 120 or the virtual destination storage apparatus 130, to which the encryption key or the like to be restored is to be set.

In the case where the encryption key has already been set, the storage apparatus ends the process, and notifies the management computer 140 of the ending of the restoration (Step 1309).

In the case where no encryption key is set, the storage apparatus judges whether or not the encryption key included in the received encryption key/encryption setting information backup information 241 (that is, the encryption key/encryption setting information backup information backed up from the storage apparatus 120 which has been designated as the restoration destination) is set for each LU (Step 1306). For example, when the item 818 stores an LU number, the encryption key is set for each LU. On the other hand, when the item 818 stores "apparatus", the encryption key is set for each apparatus.

In the case where the encryption key is not set for each LU, the storage apparatus restores the encryption key corresponding to each apparatus and the encryption setting information corresponding to the LU of each apparatus (Step 1308). For example, in the case where the encryption key is set for each apparatus and no encryption key is set to the restoration destination apparatus, the storage apparatus sets, to the restoration destination apparatus (that is, to the own storage apparatus), the encryption key (item 813) included, as the encryption key of the corresponding restoration destination apparatus, in the encryption key/encryption setting information backup information 241, and the encryption setting information of the corresponding restoration destination apparatus. The encryption setting information of the corresponding restoration destination apparatus includes at least On/Off information (item 306) of each LU of the corresponding restoration destination apparatus.

In the case where it has been judged in Step 1306 that the encryption key is set for each LU, the encryption key and the encryption setting information of each LU in each apparatus are restored to the own storage apparatus (Step 1307).

In the case where it has been judged in Step 1304 that the backup source apparatus model/production number is different from the apparatus model/production number of the own storage apparatus, it has been instructed to restore the encryption key or the like backed up from the storage apparatus 120 to any other storage apparatus than the storage apparatus 120 (that is, the backup source apparatus). In this case, the storage apparatus judges whether the encryption key/encryption setting information backup information 241 received from the management computer 140 includes the encryption key/encryption setting information of the real LU in the backup source apparatus (Step 1310). In the case of FIG. 8, for example, a value "real" is set to the item 305 of each entry corresponding to the key ID "1" in the data item 801 (that is, the item 305 of the backed-up LU management information 201). In this case, the encryption key identified by the key ID "1" in the item 812 is an encryption key of a real LU in the backup source apparatus, and the encryption On/Off and the key ID identified by the LU number "1" correspond to the encryption setting information of the real LU in the backup source apparatus.

In the case where the received information includes the encryption key/encryption setting information of the real LU in the backup source apparatus, the storage apparatus does not restore the encryption key/encryption setting information of the backup source apparatus, and proceeds to Step 1311 (Step 1318). In other words, in this case, in the processes after Step 1311, the storage apparatus does not restore the encryption key/encryption setting information of the real LU in the backup source apparatus.

As a result of Steps 1310 and 1318, the encryption key/encryption setting information set to a real LU is prevented from being restored to any other apparatus than the storage apparatus 120 that is a backup source of the information.

In the case where it has been judged in Step 1310 that the received information does not include the encryption key/encryption setting information of the real LU in the backup source apparatus, the storage apparatus judges whether or not the virtual destination apparatus model/production numbers in the encryption key/encryption setting information backup information 241 include the apparatus model/production number of the own storage apparatus or the apparatus model/production number (item 504) of the virtual destination storage apparatus 130 that is virtualized by the own storage apparatus (Step 1311).

In the case where the virtual destination apparatus model/production numbers do not include the apparatus model/production number of the own storage apparatus or the apparatus model/production number of the virtual destination storage apparatus 130 that is virtualized by the own storage apparatus, the process proceeds to Step 1309.

On the other hand, in the case where the virtual destination apparatus model/production numbers include the apparatus model/production number of the own storage apparatus or the apparatus model/production number of the virtual destination storage apparatus 130 that is virtualized by the own storage apparatus, the storage apparatus judges whether the apparatus model/production number which has been judged as being "included" in Step 1311 matches the apparatus model/production number of the own storage apparatus (Step 1312). In other words, the storage apparatus judges, with respect to the virtual destination storage apparatus 130 having the apparatus model/production number which is the same as the apparatus model/production number of the own storage apparatus, or with respect to the virtual storage apparatus 130 having the apparatus model/production number which is the same as the apparatus model/production number of the virtual destination storage apparatus 130 that is virtualized by the own storage apparatus, whether the apparatus model/production number of any of those virtual destination storage apparatuses 130 matches the apparatus model/production number of the own storage apparatus.

In the case where it has been judged that the apparatus model/production numbers match each other, the storage apparatus judges whether an encryption key has already been set to the restoration target (Step 1313).

In the case where the encryption key has already been set, the process proceeds to Step 1317.

On the other hand, in the case where no encryption key is set, the storage apparatus judges whether or not the encryption key of the received encryption key/encryption setting information backup information is set for each LU (Step 1314).

In the case where the encryption key is set for each LU, the storage apparatus restores the encryption key of each LU and the encryption setting information of each LU in the virtual destination storage apparatus 130, as the encryption key and the encryption setting information of the real LU in the own storage apparatus, and proceeds to Step 1317 (Step 1315). In other words, the encryption key and the encryption setting information allocated to each virtual LU by the storage apparatus as the backup source are allocated, in the virtual destination storage apparatus 130 that is a restoration destination, as the encryption key and the encryption setting information of each real LU in the own apparatus.

In the case where it has been judged in Step 1314 that the encryption key is not set for each LU, the storage apparatus restores the encryption key of the virtual destination storage apparatus 130 and the encryption setting information of each LU, as the encryption key of the own apparatus and the encryption setting information of each real LU of the own apparatus (Step 1316).

Next, the storage apparatus judges whether the received encryption key/encryption setting information backup information still includes, as the virtual destination apparatus model/production number, the apparatus model/production number that matches the apparatus model/production number of the own storage apparatus or the apparatus model/production number of the virtual destination storage apparatus 130 that is virtualized by the own storage apparatus, which is yet to be subjected to the processes in and after Step 1312 (Step 1317).

In the case where there still remains the apparatus model/production number satisfying the condition of Step 1317, the process returns to Step 1312. Otherwise, the process proceeds to Step 1309.

In the case where it has been judged in Step 1312 that the apparatus model/production number of the corresponding virtual destination storage apparatus 130 does not match the apparatus model/production number of the own storage apparatus, the storage apparatus judges whether an encryption key has already been set to the restoration target (Step 1319).

In the case where the encryption key has already been set, the process proceeds to Step 1317. In the case where the encryption key is yet to be set, the storage apparatus judges whether or not the encryption key in the received encryption key/encryption setting information backup information 241 is set for each LU (Step 1320).

In the case where the encryption key is set for each LU, the storage apparatus restores the encryption key of each LU of the virtual destination storage apparatus 130 and the encryption setting information of each LU of the virtual destination storage apparatus 130, as the encryption key and the encryption setting information for each virtual LU of the own apparatus, and proceeds to Step 1317 (Step 1321).

In the case where it has been judged in Step 1320 that the encryption key is not set for each LU, the storage apparatus restores the encryption key of the virtual destination storage apparatus 130 and the encryption setting information for each LU of the virtual destination storage apparatus 130, as the encryption key of the own apparatus and the encryption setting information for each virtual LU of the own apparatus, and proceeds to Step 1317 (Step 1322). Steps 1321 and 1322 are executed similarly to Steps 1315 and 1316.

Described above is the process flow to be performed by the storage apparatus for restoring the encryption key/encryption setting information backup information 241.

It should be noted that, the above-mentioned process of FIGS. 13A and 13B is based on the premise that a process of virtualizing and mapping, by the storage apparatus 120 as a restoration destination, each LU in the virtual destination storage apparatus 130 has already been executed before the restoration process of FIGS. 13A and 13B is executed. In other words, the restoration destination storage apparatus 120 first virtualizes and maps each LU in the virtual destination storage apparatus 130, and then receives the encryption key/encryption setting information backup information 241. However, the restoration may not necessarily be executed in this order. For example, the encryption key/encryption setting information may be restored after the encryption key/encryption setting information backup information 241 is transmitted by the management computer 140 to the restoration destination storage apparatus 120 and the virtual destination storage apparatus 130 is virtualized and mapped by the restoration destination storage apparatus. Hereinbelow, the latter process flow will be described with reference to FIGS. 14A and 14B, as a modification example of the flow of the restoration process executed by the storage apparatus which has been described with reference to FIGS. 13A and 13B.

Modification Example 1 of Restoration Process Executed by Storage Apparatus

Figure 14A:
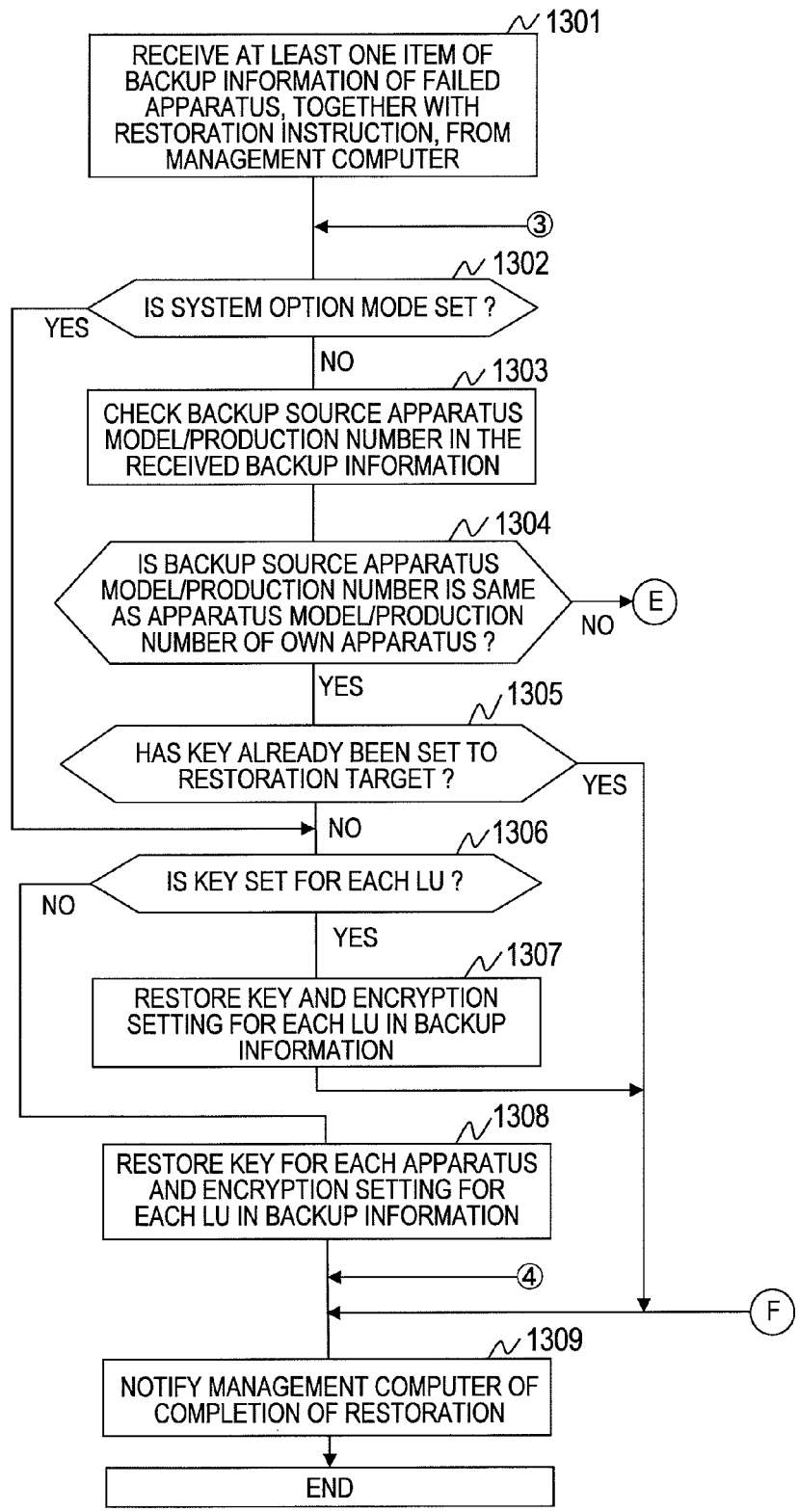
FIGS. 14A and 14B are flowcharts illustrating a first modification example of the restoration process executed by the storage apparatus which has received the restoration instruction from the management computer according to the first embodiment of this invention.
Figure 14B:
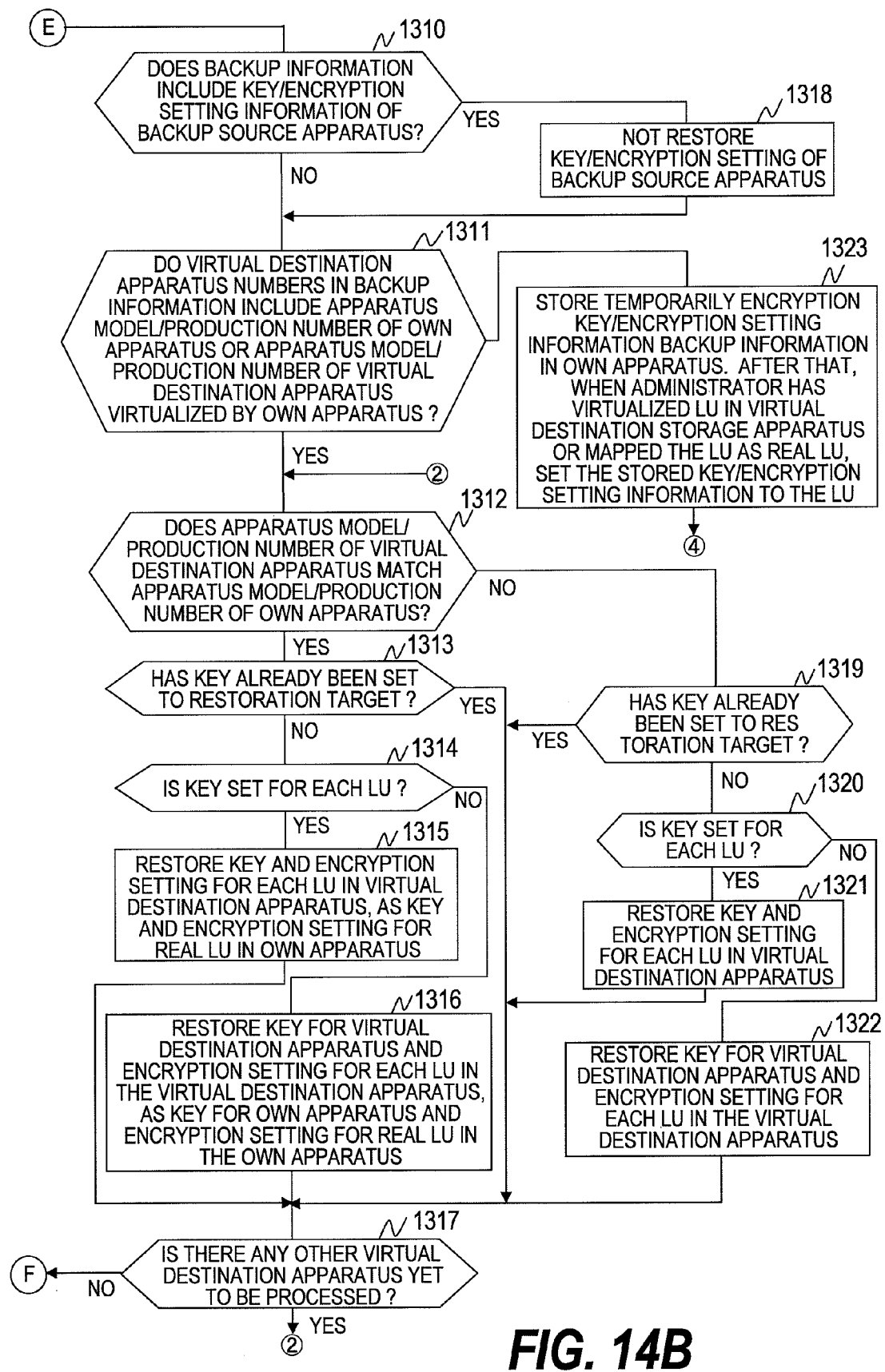

FIGS. 14A and 14B are flowcharts illustrating a first modification example of the restoration process executed by the storage apparatus which has received a restoration instruction from the management computer 140 according to the first embodiment of this invention.

Of the processes illustrated in FIGS. 14A and 14B, Steps 1301 to 1310 and 1312 to 1322 are similar to those illustrated in FIGS. 13A and 13B, and therefore the description thereof will be omitted. In Step 1311 of FIG. 14B, the judgment similar to that in Step 1311 of FIG. 13B is made. However, the process to be executed when the result of the judgment made in Step 1311 of FIG. 14B is "No" is different from the process in FIG. 13B.

In the case where it has been judged in Step 1311 that the virtual destination storage apparatus model/production numbers in the encryption key/encryption setting information backup information 241 do not include the apparatus model/production number of the own storage apparatus or the apparatus model/production number of the virtual destination storage apparatus 130 that is virtualized by the own storage apparatus, the storage apparatus temporarily stores the encryption key/encryption setting information backup information 241 received from the management computer 140, in the control memory 124 or the HDD, which is not shown, of the own apparatus. After that, when the administrator has virtualized the LU in the virtual destination storage apparatus 130 or the administrator has mapped the LU in the virtual destination storage apparatus 130 as a real LU, the storage apparatus sets the stored encryption key/encryption setting information to the LU which has been virtualized or mapped (Step 1323).

Described above is the first modification example of the restoration process in the storage apparatus.

Next, a modification example 2, which is another modification example of the restoration process, will be described with reference to FIG. 17. This modification example is different from the above-mentioned restoration process, in that the storage apparatus 120 which has received the encryption key/encryption setting information backup information 241 automatically virtualizes the virtual destination storage apparatus 130 and restores the encryption key/encryption setting information, based on the received backup information 241.

Modification Example 2 of Restoration Process Executed by Storage Apparatus

Figure 17:
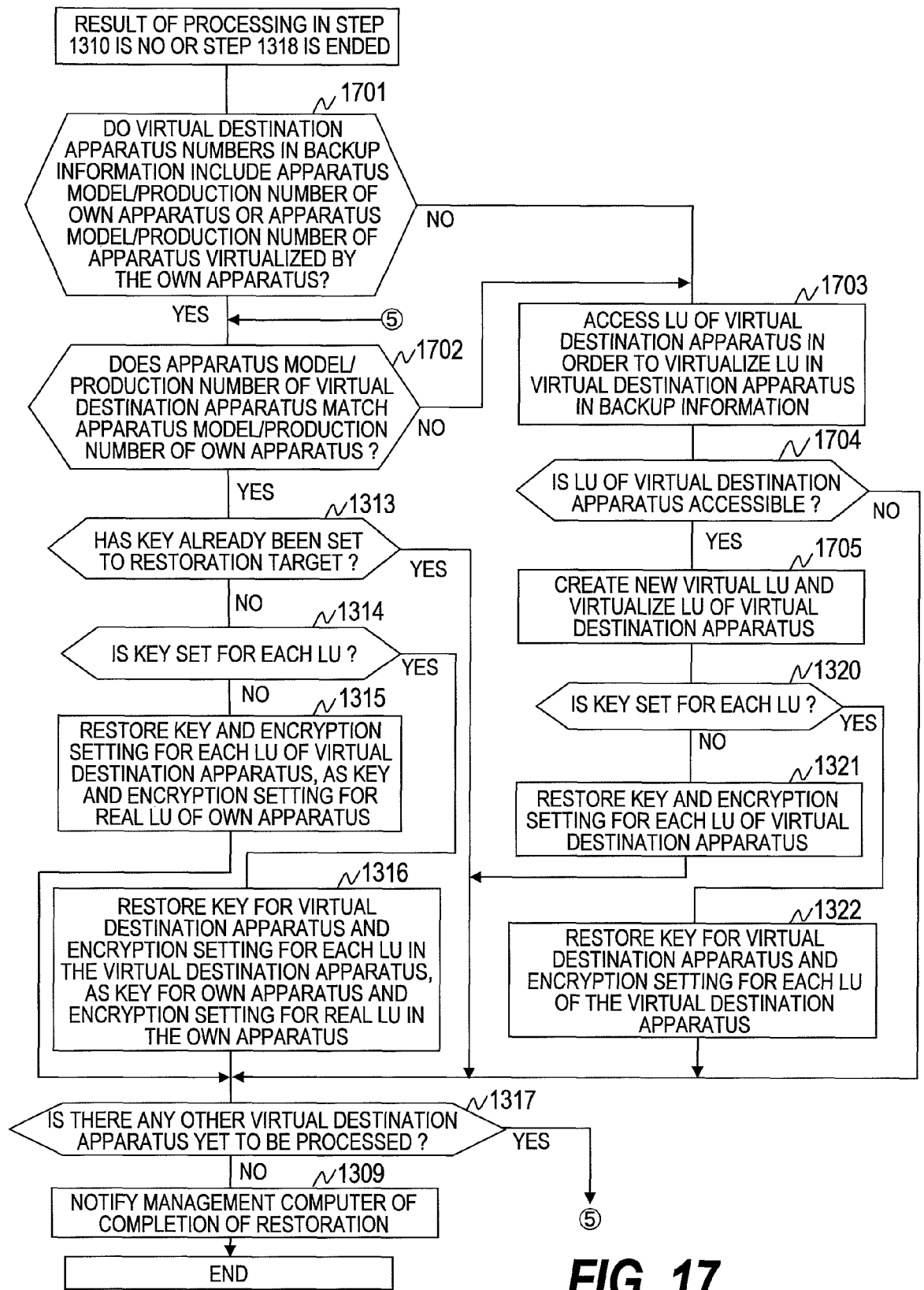
FIG. 17 is a flowchart illustrating the second modification example of the restoration process executed by the storage apparatus which has received the restoration instruction from the management computer according to the first embodiment of this invention.

FIG. 17 is a flowchart illustrating the second modification example of the restoration process executed by the storage apparatus which has received a restoration instruction from the management computer 140 according to the first embodiment of this invention.

According to the second modification example, the processes of Steps 1301 to 1308, 1310, and 1318 of FIGS. 13A and 13B are executed. Those Steps has already been described with reference to FIGS. 13A and 13B, and therefore are omitted in FIG. 17.

Of the processes illustrated in FIG. 17, Steps 1309, 1313 to 1317, and 1320 to 1322 are similar to those illustrated in FIGS. 13A and 13B, and therefore the description thereof will be omitted.

In the case where the result of the judgment made in Step 1310 is "No", and in the case where Step 1318 has been executed, the storage apparatus makes the judgment in Step 1701.

The judgments to be made in Steps 1701 and 1702 of FIG. 17 each are similar those in Steps 1311 and 1312 of FIG. 13B, respectively. However, the process to be executed in the case where the result of the judgment made in each of those Steps is "No" is different from the process in FIG. 13B.

In Step 1701, the storage apparatus judges whether the virtual destination apparatus numbers included in the encryption key/encryption setting information backup information 241 received from the management computer 140 include the apparatus model/production number of the own apparatus or the apparatus model/production number of the apparatus which is virtualized by the own apparatus. In the case where the result of the judgment is "No", the process proceeds to Step 1703. On the other hand, in the case where the result of the judgment is "Yes", the storage apparatus judges whether the apparatus model/production number matches the apparatus model/production number of the own storage apparatus (Step 1702).

In the case where the result of the judgment in Step 1702 is "Yes", the process proceeds to Step 1313. On the other hand, in the case where the result of the judgment is "No", the process proceeds to Step 1703.

In the case where the result of the judgment in Step 1701 or Step 1702 is "No", the storage apparatus 120 tries to access, in Step 1703, the LU 135 of the virtual destination storage apparatus 130 corresponding to the virtual destination apparatus model/production number included in the encryption key/encryption setting information backup information 241 received from the management computer 140, in order to virtualize the LU 135 of the virtual destination storage apparatus 130 (Step 1703), and judges whether it is possible or not to access the corresponding LU 135 (Step 1704).

For example, in the case where the setting in the item 304 has not been canceled in advance of the execution of the restoration process by the storage apparatus 120, the storage apparatus 120 cannot access the corresponding LU 135. In the case where the storage apparatus 120 cannot access the corresponding LU 135, the process proceeds to Step 1317.

On the other hand, in the case where the storage apparatus 120 can access the corresponding LU 135, the storage apparatus 120 creates a new virtual LU 125 in the own storage apparatus, and virtualizes the corresponding LU 135 (Step 1705).

For example, the storage apparatus 120 may consult the administrator, or map a free port in the own storage apparatus to an arbitrary LU, to thereby virtualize the LU 135.

Next, the process proceeds to Step 1320. Described above is the second modification example of the restoration process executed by the storage apparatus 120.

Modification Example 1 of Restoration Instruction Process executed by Management Computer Next, a first modification example of the flow of the restoration instruction process executed by the management computer 140 will be described.

Figure 15A:
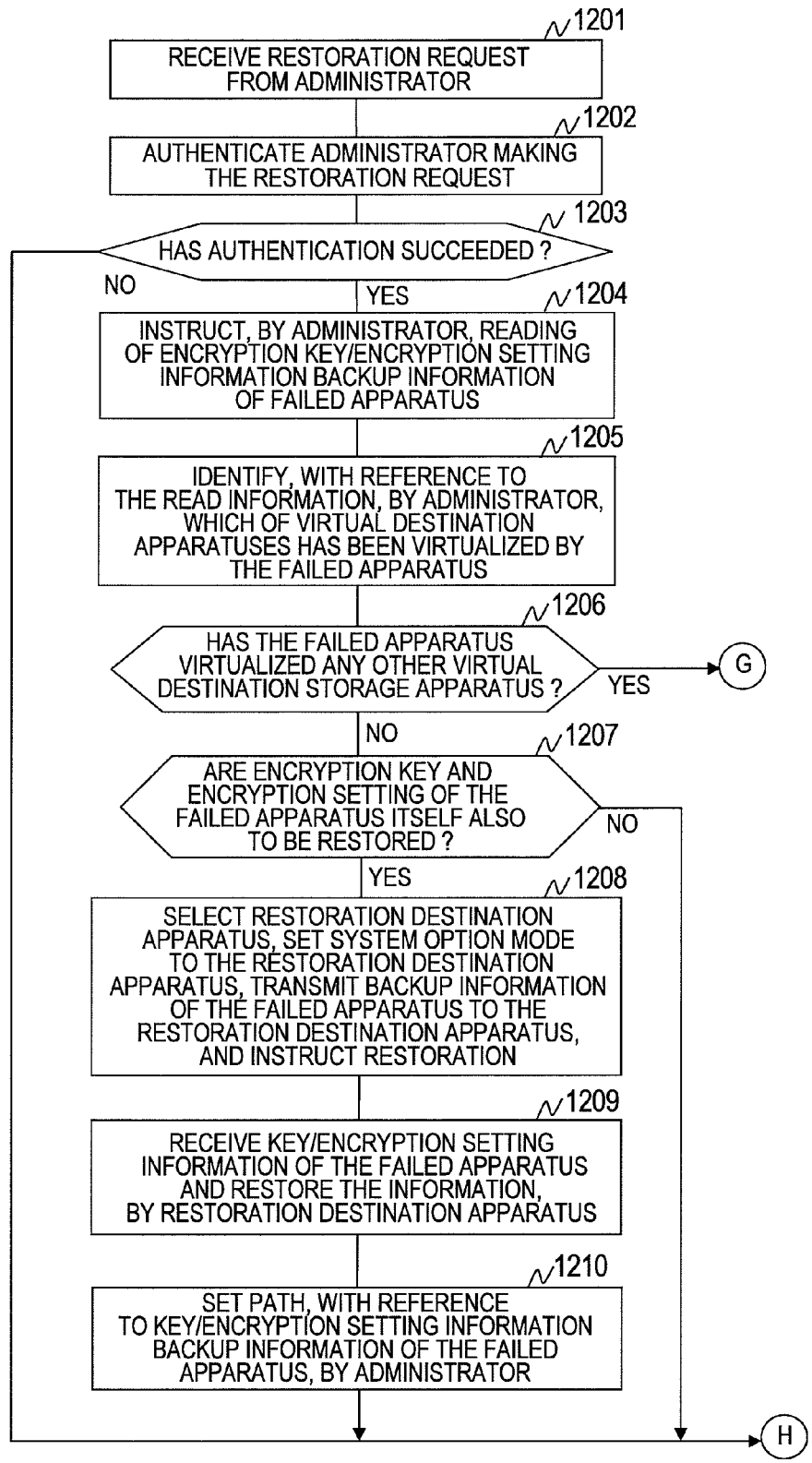
FIGS. 15A to 15C are flowcharts illustrating a first modification example of the restoration instruction process executed by the encryption key/encryption setting information restoration instruction program of the management computer according to the first embodiment of this invention, with respect to the storage apparatus or the virtual destination storage apparatus.
Figure 15B:
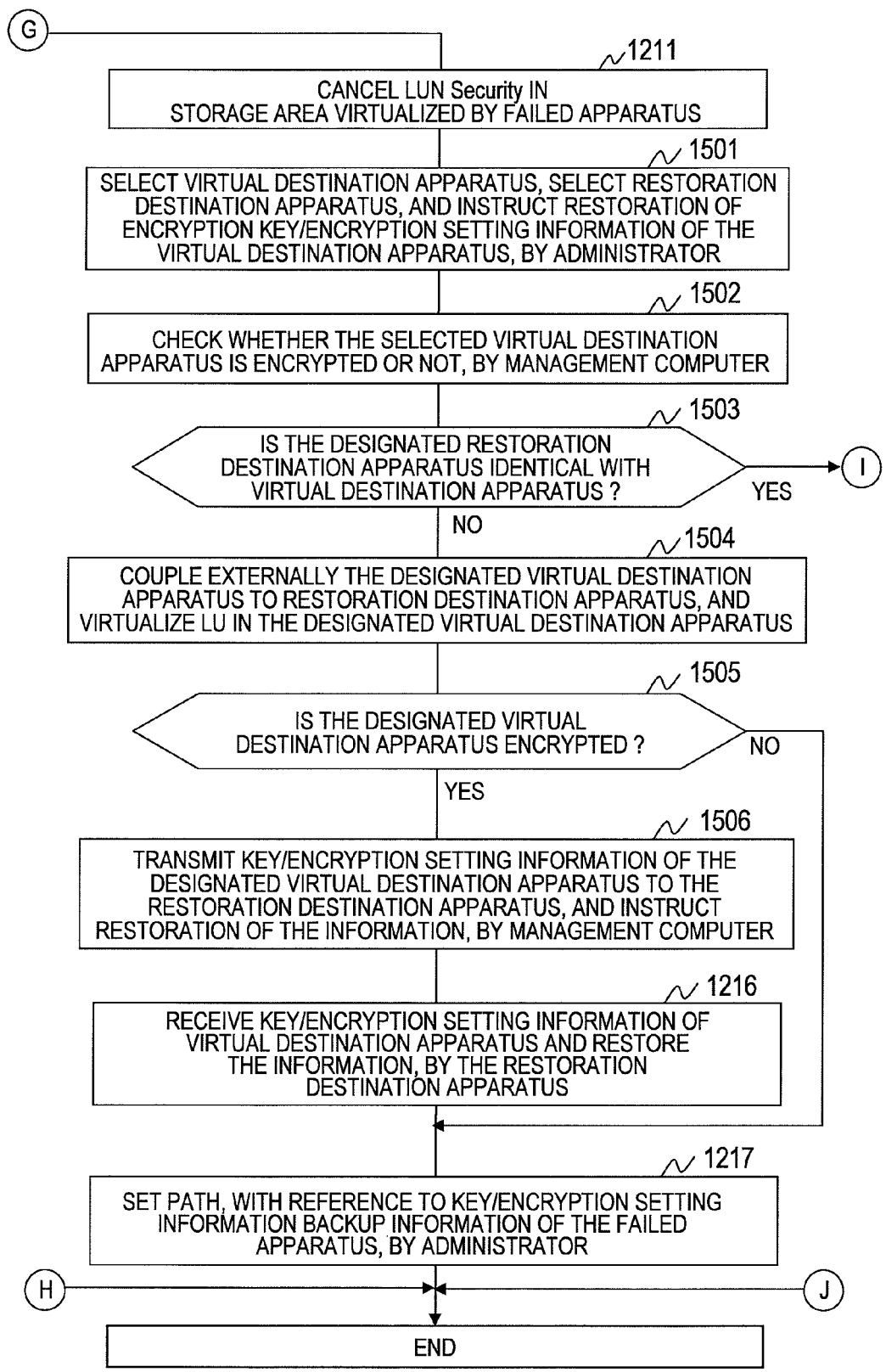
Figure 15C:
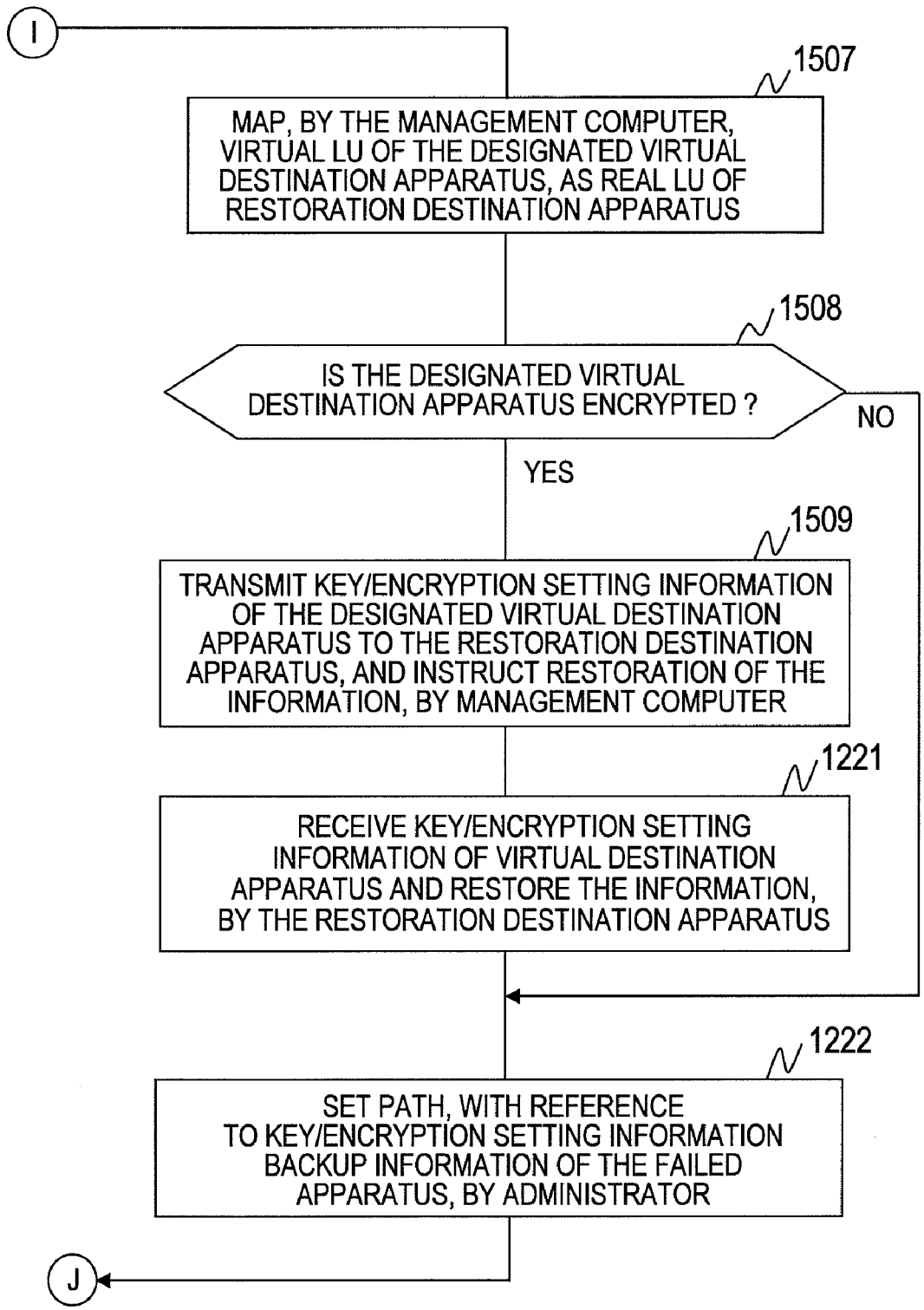

FIGS. 15A to 15C are flowcharts illustrating the first modification example of the restoration instruction process executed by the encryption key/encryption setting information restoration instruction program 246 of the management computer 140 according to the first embodiment of this invention, with respect to the storage apparatus 120 or the virtual destination storage apparatus 130.

Of the processes of FIGS. 15A to 15C, Steps 1201 to 1211, 1216, 1217, 1221, and 1222 are similar to those illustrated in FIGS. 12A and 12B, and therefore the description of those Steps will be omitted.

After the process of Step 1211 has been completed, the administrator selects the virtual destination storage apparatus 130 that has been virtualized by the failed apparatus and the restoration destination apparatus, and instructs the management computer 140 to restore the encryption key/encryption setting information of the corresponding virtual destination storage apparatus 130 (Step 1501).

The management computer 140 checks whether the designated virtual destination storage apparatus 130 is encrypted or not (Step 1502).

Next, the management computer 140 judges whether the restoration destination apparatus designated by the administrator is identical with the virtual destination storage apparatus 130 (Step 1503).

In the case where the restoration destination apparatus designated by the administrator is different from the virtual destination storage apparatus 130, the management computer 140 externally couples the virtual destination storage apparatus 130 designated by the administrator to the restoration destination apparatus, and virtualizes the LU 135 of the designated virtual destination storage apparatus 130 (Step 1504). For example, the administrator may designate which one of the LUs 125 of the restoration destination apparatus is to virtualize the LU 135 of the virtual destination storage apparatus 130, or the management computer 140 may automatically create an arbitrary LU in a free port of the restoration destination apparatus so as to associate the created LU 125 with the LU 135.

Next, the management computer 140 judges, based on the encryption key/encryption setting information backup information 241 in the management computer 140, whether the virtual destination storage apparatus 130 designated by the administrator is encrypted or not (Step 1505).

In the case where the virtual destination storage apparatus 130 designated by the administrator is encrypted, the management computer 140 obtains, from the encryption key/encryption setting information backup information 241 in the management computer 140, the encryption key/encryption setting information of the virtual destination storage apparatus 130 designated by the administrator, and transmits the obtained information to the restoration destination apparatus, to thereby instruct restoration of the information (Step 1506).

For example, in the case where the item 817 does not include information corresponding to the virtual destination storage apparatus 130 designated by the administrator, it can be identified that the corresponding virtual destination storage apparatus 130 is not encrypted.

On the other hand, in the example of FIG. 8, for example, in the case where the entry having "D700-110" in the Item 817 corresponds to the virtual destination storage apparatus 130 designated by the administrator, an encryption key having the ID number "5" in the item 812 is obtained as the encryption key for the virtual destination storage apparatus 130.

In the case where it has been judged in Step 1505 that the virtual destination storage apparatus 130 designated by the administrator is not encrypted, the management computer 140 does not transmit the encryption key/encryption setting information to the restoration destination apparatus, and the process proceeds to Step 1217.

In the case where it has been judged in Step 1503 that the restoration destination apparatus designated by the administrator is identical with the virtual destination storage apparatus 130, the management computer 140 maps the LU 135 of the virtual destination storage apparatus 130 designated by the administrator as the real LU of the restoration destination apparatus (Step 1507).

Next, the management computer 140 judges, in a manner similar to that in the process of Step 1505, whether the virtual destination storage apparatus 130 designated by the administrator is encrypted or not (Step 1508).

In the case where the virtual destination storage apparatus 130 designated by the administrator is encrypted, the management computer 140 obtains, from the encryption key/encryption setting information backup information 241 in the management computer 140, the encryption key/encryption setting information of the virtual destination storage apparatus 130 designated by the administrator, and transmits the obtained information to the restoration destination apparatus, to thereby instruct restoration of the information (Step 1509).

In the case where it has been judged in Step 1508 that the virtual destination storage apparatus 130 designated by the administrator is not encrypted, the management computer 140 does not transmit the encryption key/encryption setting information to the restoration destination apparatus, and the process proceeds to Step 1222.

Described above is the first modification example of the restoration instruction process executed by the management computer 140.

Next, a second modification example, which is another modification example of the restoration instruction process, will further be described. According to the above-mentioned restoration instruction process, the management computer 140 is provided with sophisticated functions, such as a function of extracting in part the encryption key/encryption setting information backup information 241 of the storage apparatus 120. However, in the second modification example described below, the above-mentioned function is not provided to the management computer 140, and the administrator simply restores, directly to the storage apparatus 120, the encryption key/encryption setting information backup information 241 backed up from the storage apparatus 120.

Modification Example 2 of Restoration Instruction Process Executed by Management Computer The second modification example of the flow of the restoration instruction process executed by the management computer 140 will be described.

Figure 16A:
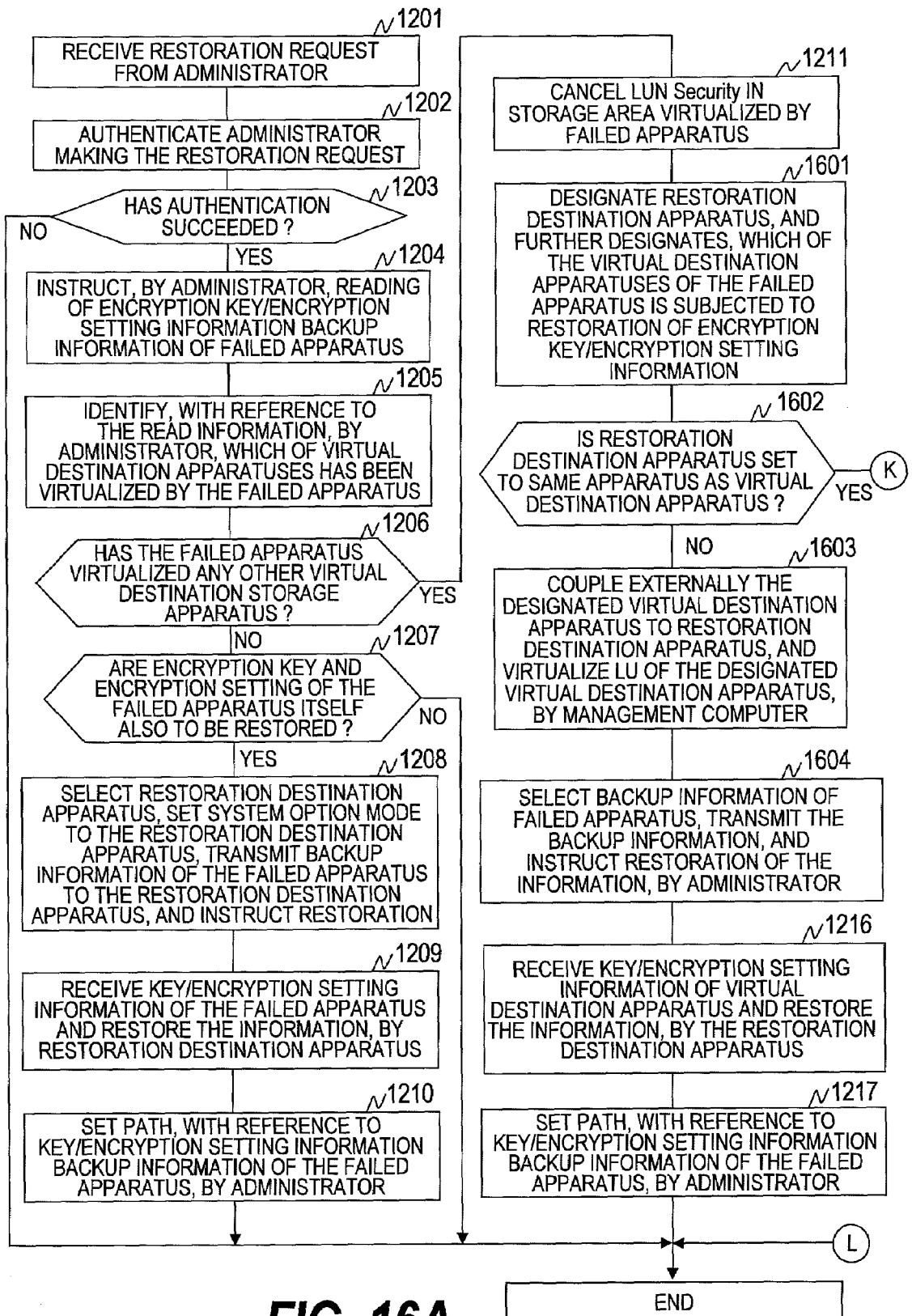
FIGS. 16A and 16B are flowcharts illustrating a second modification example of the restoration instruction process executed by the encryption key/encryption setting information restoration instruction program of the management computer according to the first embodiment of this invention, with respect to the storage apparatus or the virtual destination storage apparatus.
Figure 16B:
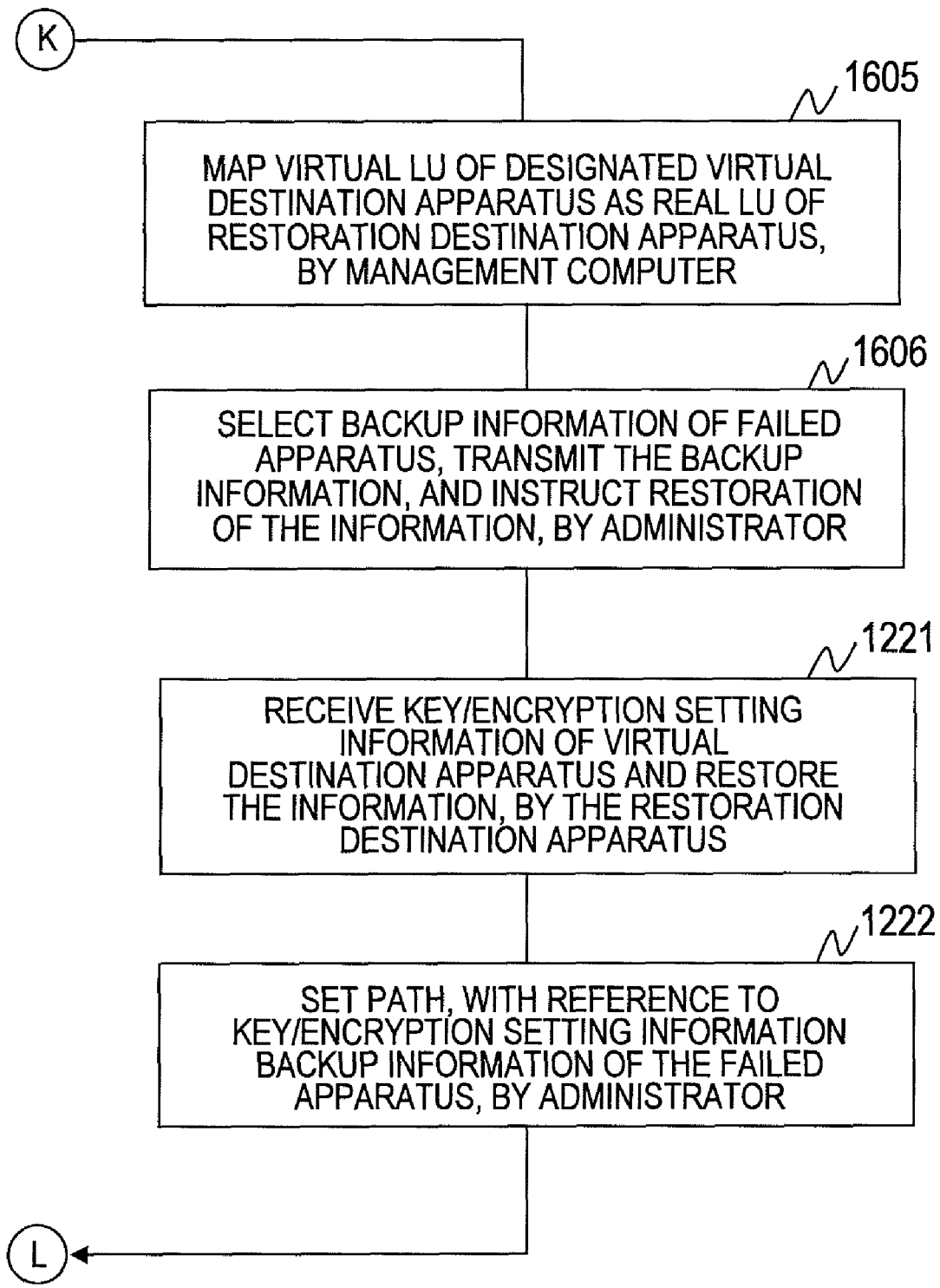

FIGS. 16A and 16B are flowcharts illustrating the second modification example of the restoration instruction process executed by the encryption key/encryption setting information restoration instruction program 246 of the management computer 140 according to the first embodiment of this invention, with respect to the storage apparatus 120 or the virtual destination storage apparatus 130.

Of the processes of FIGS. 16A and 16B, Steps 1201 to 1211, 1216, 1217, 1221, and 1222 are similar to those illustrated in FIGS. 12A and 12B, and therefore the description of those Steps will be omitted.

After the process of Step 1211 has been completed, the administrator determines the restoration destination apparatus, and further determines which one of the virtual destination storage apparatuses 130 of the failed apparatus is subjected to the restoration of the encryption key/encryption setting information (Step 1601).

The administrator judges whether the determined restoration destination apparatus is the same storage apparatus as the virtual destination storage apparatus 130 (Step 1602).

In the case where the restoration destination apparatus is different from the virtual destination storage apparatus 130, the administrator externally couples the determined virtual destination storage apparatus 130 to the restoration destination apparatus by using the management computer 140, and virtualizes the LU 135 of the virtual destination storage apparatus 130 (Step 1603).

Next, the administrator selects the encryption key/encryption setting information backup information 241 of the failed apparatus, directly transmits the selected information to the restoration destination apparatus, and instructs restoration of the information (Step 1604).

On the other hand, in the case where it has been judged in Step 1602 that the restoration destination apparatus is identical with the virtual destination storage apparatus 130, the administrator maps the virtual LU of the virtual destination storage apparatus 130 determined as described above, as the real LU of the restoration destination apparatus (Step 1605). It should be noted that, when the administrator maps the virtual LU in this case, the administrator merely regards that the corresponding virtual LU and the entity of the real LU are identical with each other, rather than performing any special operation.

Next, similarly in Step 1604, the administrator selects the encryption key/encryption setting information backup information 241 of the failed apparatus, transmits the selected information as it is to the restoration destination apparatus, and instructs restoration of the information (Step 1606).

Described above is the second modification example of the restoration instruction process executed by the management computer 140.

Next, a second embodiment of this invention will be described.

The system configuration of the second embodiment of this invention is similar to that of the first embodiment shown in FIG. 1. Therefore, the description of the system configuration will be omitted.

According to the first embodiment of this invention, the encryption key/encryption setting information of the failed apparatus itself or of the virtual destination storage apparatus 130 that has been virtualized by the failed apparatus is restored. In contrast to this, according to the second embodiment of this invention, the management computer 140 executes the restoration of the encryption key/encryption setting information in an integrated manner, with consideration given to the possibilities that the encryption key/encryption setting information backup information 241 of the storage apparatus 120 that has not necessarily failed is transmitted by mistake, and that, in a case where the encryption key or the like has been lost due to, for example, a failure in the memory of the storage apparatus 120, the encryption key/encryption setting information backup information 241 is transmitted to the backup source storage apparatus 120 itself.

The following description of this embodiment will be given based on the premise that the encryption key/encryption setting information of the storage apparatus 120 shown in FIG. 3, 4, or 6 has already been set by using the encryption setting instruction program 244 and the backup shown in FIG. 8 of the information has already been obtained. Further, the description of the processes similar to those in the first embodiment of this invention will be omitted. Hereinbelow, the second embodiment of this invention will be described with reference to FIGS. 18 and 19.

In this embodiment, the management computer 140 executes two processes described below. In the first process, the management computer 140 monitors the storage apparatus 120 shown in FIG. 18. In the second process, upon receiving a restoration request from the administrator after the administrator has recognized the failure in the storage apparatus 120, the management computer 140 transmits, to the restoration destination apparatus designated by the administrator, the encryption key/encryption setting information backup information designated by the administrator, and instructs restoration of the information shown in FIGS. 19A and 19B.

(Monitoring Process Executed by Management Computer to Monitor Storage Apparatus)

Figure 18:
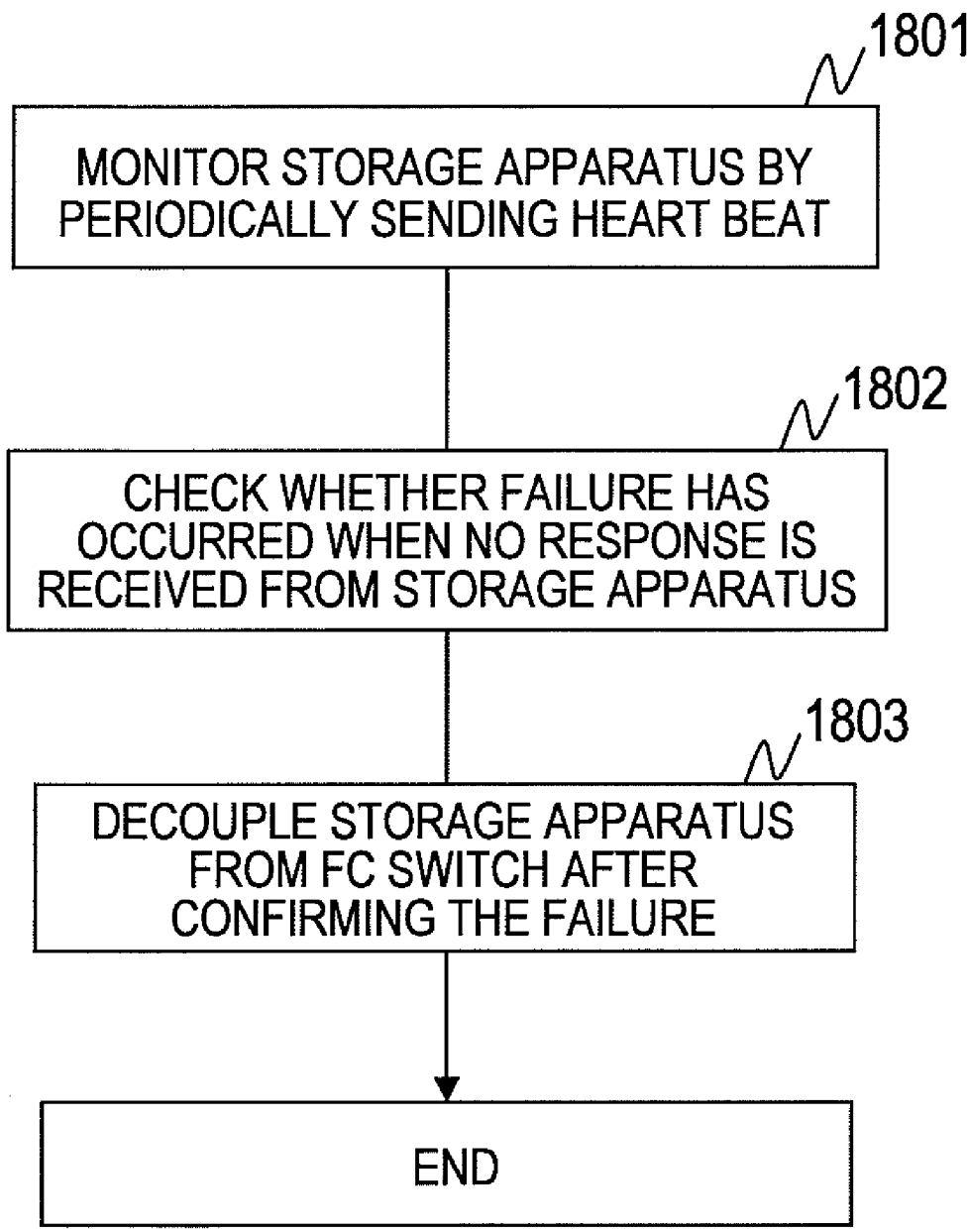
FIG. 18 is a flowchart illustrating an example of a monitoring process executed by a storage management instruction program of a management computer according to a second embodiment of this invention to monitor the storage apparatus.

FIG. 18 is a flowchart illustrating an example of the monitoring process executed by the storage management instruction program 247 of the management computer 140 according to the second embodiment of this invention to monitor the storage apparatus 120.

The management computer 140 periodically transmits a predetermined signal (so called heart beat) to the storage apparatus 120, and monitors whether there is a response to the signal or not (Step 1801).

In the case where the response as described above cannot be received from the storage apparatus 120, the management computer 140 notifies the administrator of the fact that no response has been received. For example, the management computer 140 transmits a heart beat to the storage apparatus 120 and waits for a predetermined period. In the case where no response has been received with respect to the heart beat after a lapse of the predetermined period, the management computer 140 may alert the administrator to the fact that no response with respect to the heart beat has been received.

The administrator checks whether a failure has occurred or not in the storage apparatus 120 (Step 1802). The administrator may perform this checking operation by executing, for example, a maintenance operation for checking the status of the storage apparatus 120 through the management computer 140 or the management terminal, which is not shown, of the storage apparatus 120.

In the case where a failure has occurred in the storage apparatus 120, the administrator decouples the storage apparatus 120 from the FC switch 110 (Step 1803).

(Restoration Instruction Process Executed by Management Computer)

Figure 19A:
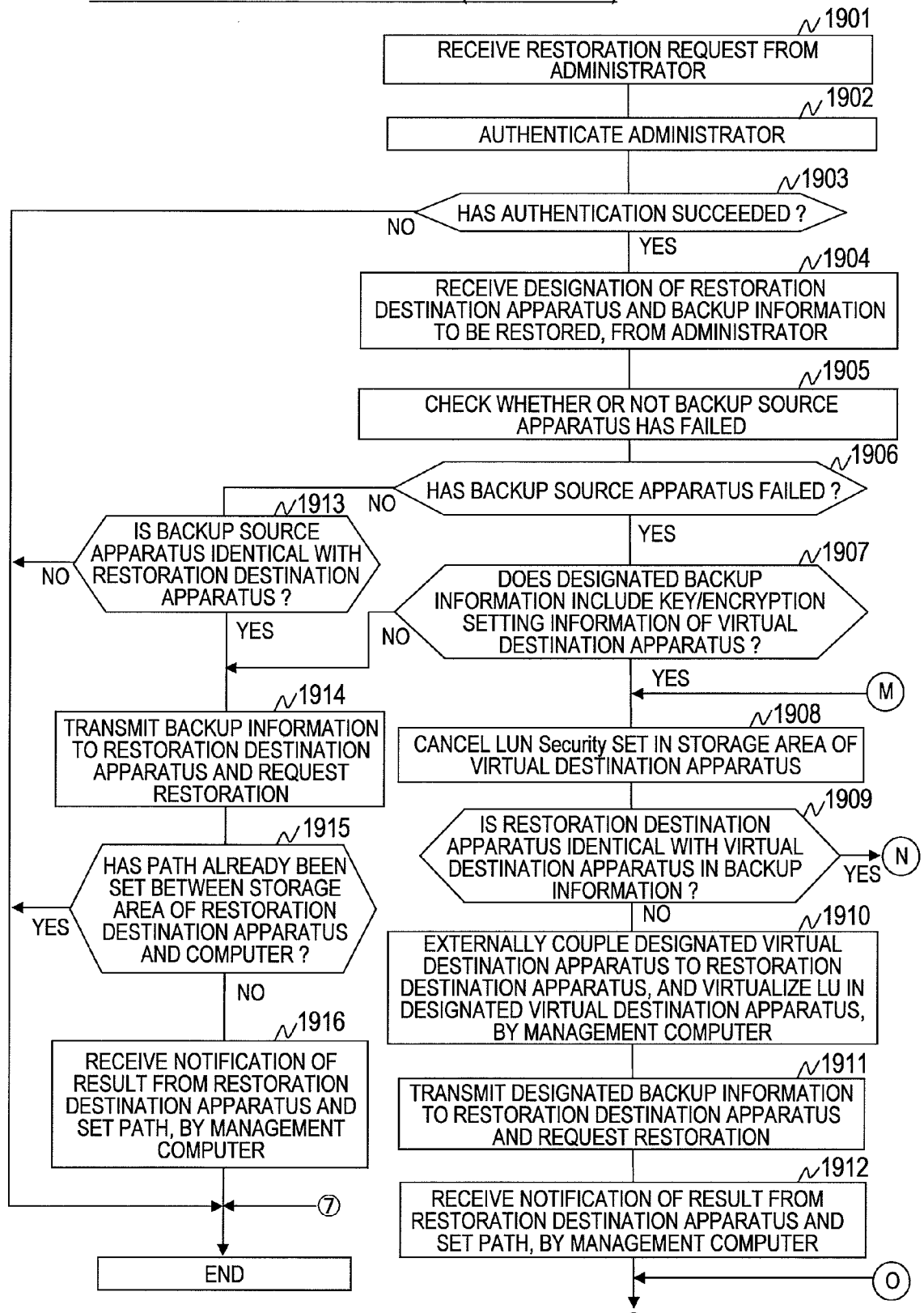
FIGS. 19A and 19B are flowcharts illustrating an example of a restoration instruction process executed by an encryption key/encryption setting information restoration instruction program of the management computer, with respect to the storage apparatus, according to the second embodiment of this invention.
Figure 19B:
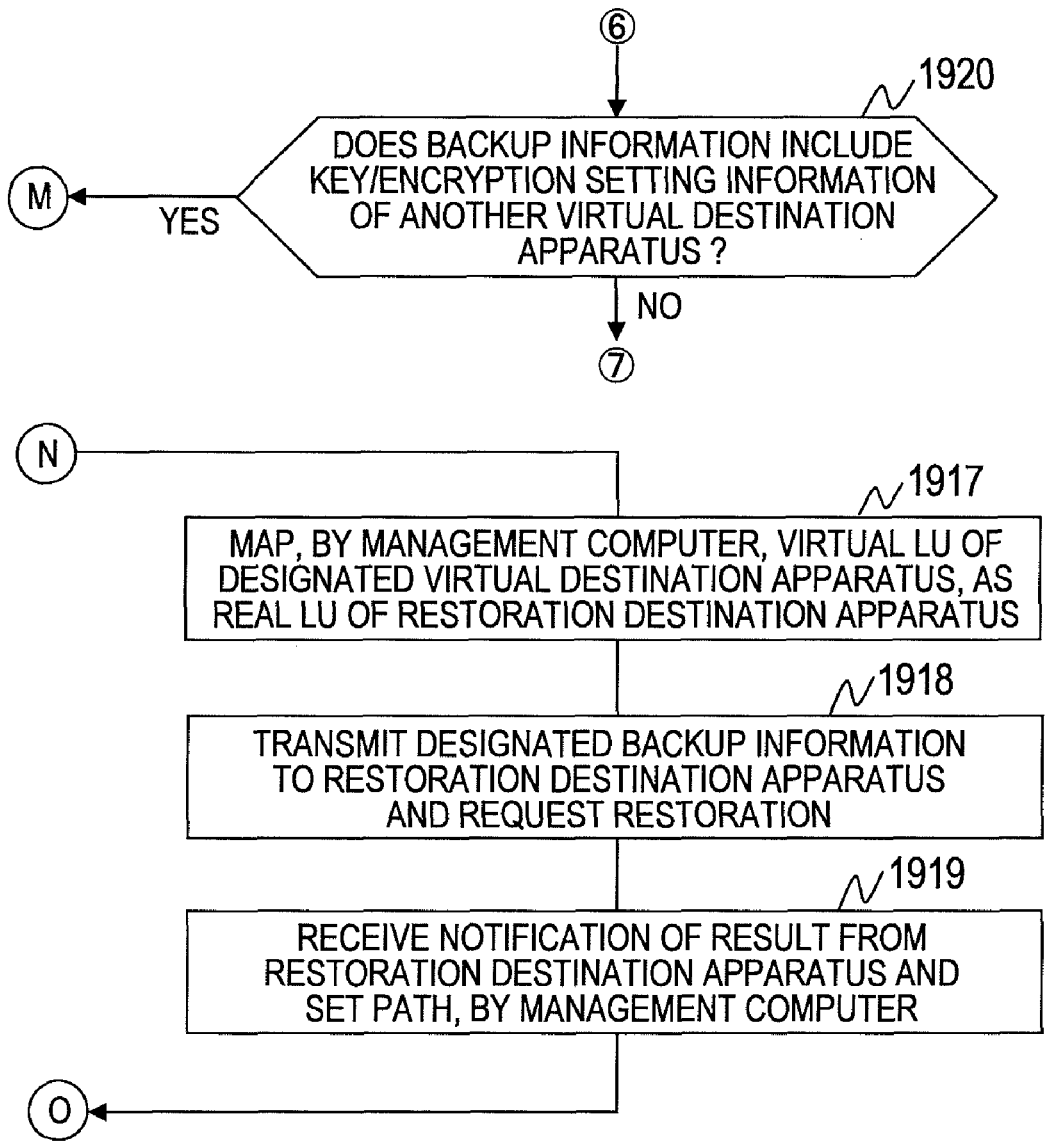

FIGS. 19A and 19B are flowcharts illustrating an example of the restoration instruction process executed by the encryption key/encryption setting information restoration instruction program 246 of the management computer 140, with respect to the storage apparatus 120, according to the second embodiment of this invention.

The processes of FIGS. 19A and 19B may be executed when it has been determined by the process of FIG. 18 that a failure has occurred in the storage apparatus 120, or may be executed in any other cases than the above.

The management computer 140 receives a restoration request for restoring the encryption key/encryption setting information, from the administrator (Step 1901), and authenticates the administrator (Steps 1902 and 1903). The authentication is performed in a manner similar to that in Steps 1202 and 1203.

In the case where the authentication has failed, the process is ended.

In the case where the authentication has succeeded, the management computer 140 accepts the designation of the restoration destination apparatus and the encryption key/encryption setting information backup information 241 to be restored, from the administrator (Step 1904).

Next, the management computer 140 judges whether or not a failure has occurred in the backup source apparatus indicated by the designated encryption key/encryption setting information backup information 241 (Step 1905). For example, the management computer 140 transmits a heart beat to the IP address of the backup source apparatus indicated by the designated encryption key/encryption setting information backup information 241, and judges whether a response with respect to the heart beat is received or not. Alternatively, the management computer 140 may execute discovery. Still alternatively, the management computer 140 may check whether the management information 140 includes or not the configuration information of the backup source apparatus.

The IP address of the backup source apparatus can be obtained, for example, based on the information in the item 502 or from the storage management information 242. In the case where the backup source apparatus is decoupled from the FC switch 110 due to a failure occurring in the apparatus, the configuration information of the backup source apparatus (that is, the failed apparatus) is deleted from the management computer 140, and therefore the management computer 140 may not be able to obtain the IP address of the corresponding backup source apparatus. However, in the case where the configuration information of the backup source apparatus is not found, the management computer 140 can determine that the failed apparatus does not exist in the computer system (that is, the failed apparatus has been decoupled due to a failure or the like).

The management computer 140 judges, through the process illustrated, for example, in Step 1905 described above, whether or not the backup source apparatus has failed (Step 1906).

In the case where it has been judged that the backup source apparatus has not failed, the management computer 140 judges whether the backup source apparatus is identical with the restoration destination apparatus (Step 1913).

In the case where the backup source apparatus is different from the restoration destination apparatus, it is requested to restore, to another apparatus, the encryption key or the like backed up from the backup source apparatus, in spite of the fact that the backup source apparatus has not failed. The restoration in the above-mentioned case is not permitted in this embodiment, and therefore the process is ended.

On the other hand, in the case where the backup source apparatus is identical with the restoration destination apparatus, it is requested to restore the encryption key or the like backed up from the backup source apparatus, to the same backup source apparatus. The request as described above may be made in the case where the backup source apparatus has lost the encryption key or the like due to a temporary failure or the like. In this case, the management computer 140 transmits the encryption key/encryption setting information backup information 241 to the restoration destination apparatus, and instructs restoration of the information (Step 1914).

Next, the management computer 140 judges whether or not a path between the storage area of the restoration destination apparatus and the computer 100 has already been set (Step 1915).

In the case where the path has already been set, the process is ended.

In the case where the path is yet to be set, the management computer 140 waits until a notification that the restoration has been completed is received from the restoration destination apparatus. When the notification is received, the management computer 140 sets a path between the LU of the restoration destination apparatus and the computer 100 (Step 1916). For example, in the case of setting a path which is the same as that before the restoration, the management computer 140 sets the path according to the setting in the item 304.

In the case where it has been judged in Step 1906 that the backup source apparatus has failed, the management computer 140 judges whether or not the encryption key/encryption setting information backup information 241 designated by the administrator includes the encryption key/encryption setting information of the virtual destination storage apparatus 130 (Step 1907).

In the case where the encryption key/encryption setting information backup information 241 designated by the administrator does not include the encryption key/encryption setting information of the virtual destination storage apparatus 130, the process proceeds to Step 1914.

In the case where the encryption key/encryption setting information backup information 241 designated by the administrator includes the encryption key/encryption setting information of the virtual destination storage apparatus 130, the management computer 140 cancels the LUN Security set in the storage area of the virtual destination storage apparatus 130 (Step 1908). As a result, other storage apparatuses 120 are allowed to access the virtual destination storage apparatus 130. However, the process in Step 1908 is not necessarily performed. In the case where the LUN Security has not been originally set in the storage area of the virtual destination storage apparatus 130, it is not necessary to perform Step 1908.

Next, the management computer 140 judges whether or not the restoration destination apparatus is identical with the virtual destination storage apparatus 130 included in the encryption key/encryption setting information backup information 241 (Step 1909).

In the case where the restoration destination apparatus is different from the virtual destination storage apparatus 130 included in the encryption key/encryption setting information backup information 241, the management computer 140 externally couples the virtual destination storage apparatus 130 included in the encryption key/encryption setting information backup information 241 designated by the administrator to the restoration destination apparatus, and virtualizes the LU 135 of the virtual destination storage apparatus 130 (Step 1910).

Next, the management computer 140 transmits the encryption key/encryption setting information backup information 241 to the restoration destination apparatus, and instructs restoration (Step 1911).

Upon receiving the notification that the restoration has been completed, from the restoration destination apparatus, the management computer 140 sets a path between the computer 100, which has been communicably coupled to the virtual LU of the backup source apparatus through a path, and the virtual LU of the restoration destination apparatus (Step 1912). For example, in the case where the restoration destination apparatus newly virtualizes and restores the LU 135 identified by the LU number "1" in the virtual storage apparatus 130 that has been virtualized by the LU 125 identified by the LU number "3" in the item 402 of FIG. 4, a path is set between the computer in the item 304 set to the LU identified by the LU number "3" in FIG. 3 and a new virtualized LU of the restoration destination apparatus. Alternatively, it is also possible, after a failure or the like, to newly set a path different from the path that has been originally set.

Next, the management computer 140 judges whether or not the encryption key/encryption setting information backup information 241 designated by the administrator includes the encryption key/encryption setting information of another virtual destination storage apparatus 130 (Step 1920).

In the case where the encryption key/encryption setting information of the other virtual destination storage apparatus 130 is included, the process proceeds to Step 1908.

On the other hand, in the case where the encryption key/encryption setting information of the other virtual destination storage apparatus 130 is not included, the process is ended.

In the case where it has been judged in Step 1909 that the restoration destination apparatus is identical with the virtual destination storage apparatus 130 included in the encryption key/encryption setting information backup information 241, the management computer 140 maps a virtual LU virtualizing the LU 135 of the virtual destination apparatus 130 included in the encryption key/encryption setting information backup information 241 designated by the administrator, as the real LU of the restoration destination apparatus (Step 1917).

Next, the management computer 140 transmits the encryption key/encryption setting information backup information 241 designated by the administrator, to the restoration destination apparatus, and instructs restoration of the information (Step 1918).

Upon receiving the notification of the result of the restoration from the restoration destination apparatus, the management computer 140 sets a path between the computer 100, which has been communicably coupled to the virtual LU of the backup source apparatus through the path, and the real LU of the restoration destination apparatus (Step 1919). After that, the process proceeds to Step 1920.

Next, a third embodiment of this invention will be described.

Figure 20:
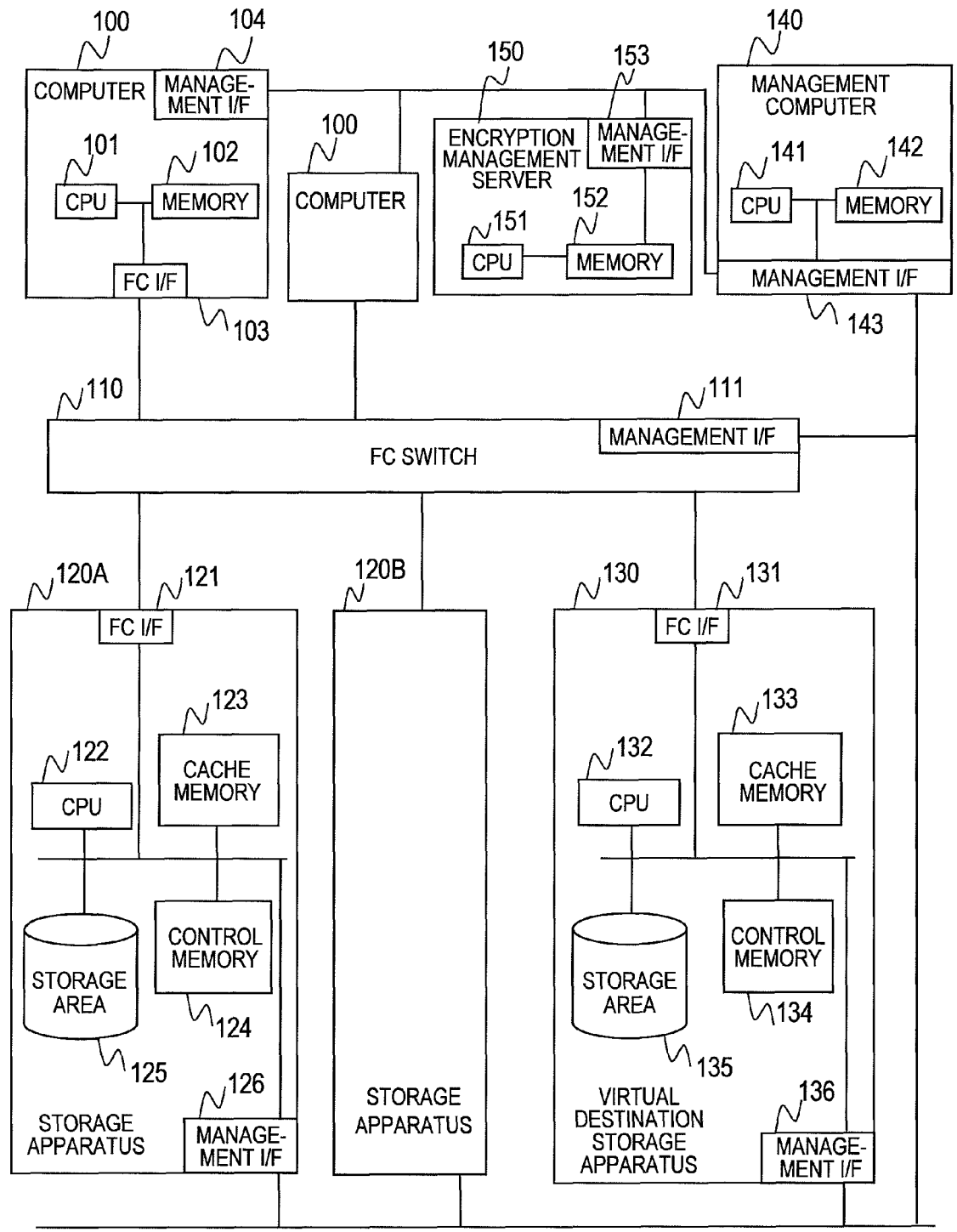
FIG. 20 is a block diagram illustrating a hardware configuration of a computer system according to a third embodiment of this invention.

FIG. 20 is a block diagram illustrating a hardware configuration of a computer system according to the third embodiment of this invention.

According to the third embodiment, an encryption management server 150, which integrally manages the encryption key/encryption setting information of the storage apparatuses 120, is additionally provided to the computer system configuration of the first and second embodiments.

An outline of the process according to this embodiment will be described.

In the case of backing up the encryption key/encryption setting information, an administrator instructs the storage apparatus 120 to backup the information to the encryption management server 150. The storage apparatus 120, which has received the instruction, backs up the encryption key/encryption setting information to the encryption management server 150. On the other hand, in the case of restoring the encryption key/encryption setting information, the administrator instructs the encryption management server 150 to transmit the encryption key/encryption setting information in the encryption management server 150 to the storage apparatus 120. The encryption management server 150, which has received the instruction, transmits the encryption key/encryption setting information to the storage apparatus 120. The storage apparatus 120, which has received the encryption key/encryption setting information, restores the information.

The encryption management server 150 will be described.

The encryption management server 150 includes a CPU 151, a memory 152, and a management I/F 153. The management I/F 153 is coupled to the computer 100 and the management computer 140 via the IP network. The management computer 140 is capable of managing the encryption management server 150 through the management I/F 153. The encryption management server 150 may also be coupled to the storage apparatus 120 and to the virtual destination storage apparatus 130 via the FC network.

The encryption management server 150 loads, for example, when activated, programs and the like for managing the encryption key/encryption setting information backup information 241 of the storage apparatus 120, into the memory 152. The programs and the like are recorded in a non-volatile recording medium such as a hard disk drive, which is not shown, of the encryption management server 150. The CPU 151 executes the programs and the like thus loaded, to thereby, for example, transmit or receive the encryption key/encryption setting information backup information 241 to and from the storage apparatus 120.

Next, software configurations of the storage apparatus 120 and the encryption management server 150 according to the this embodiment will be described.

Figure 21:
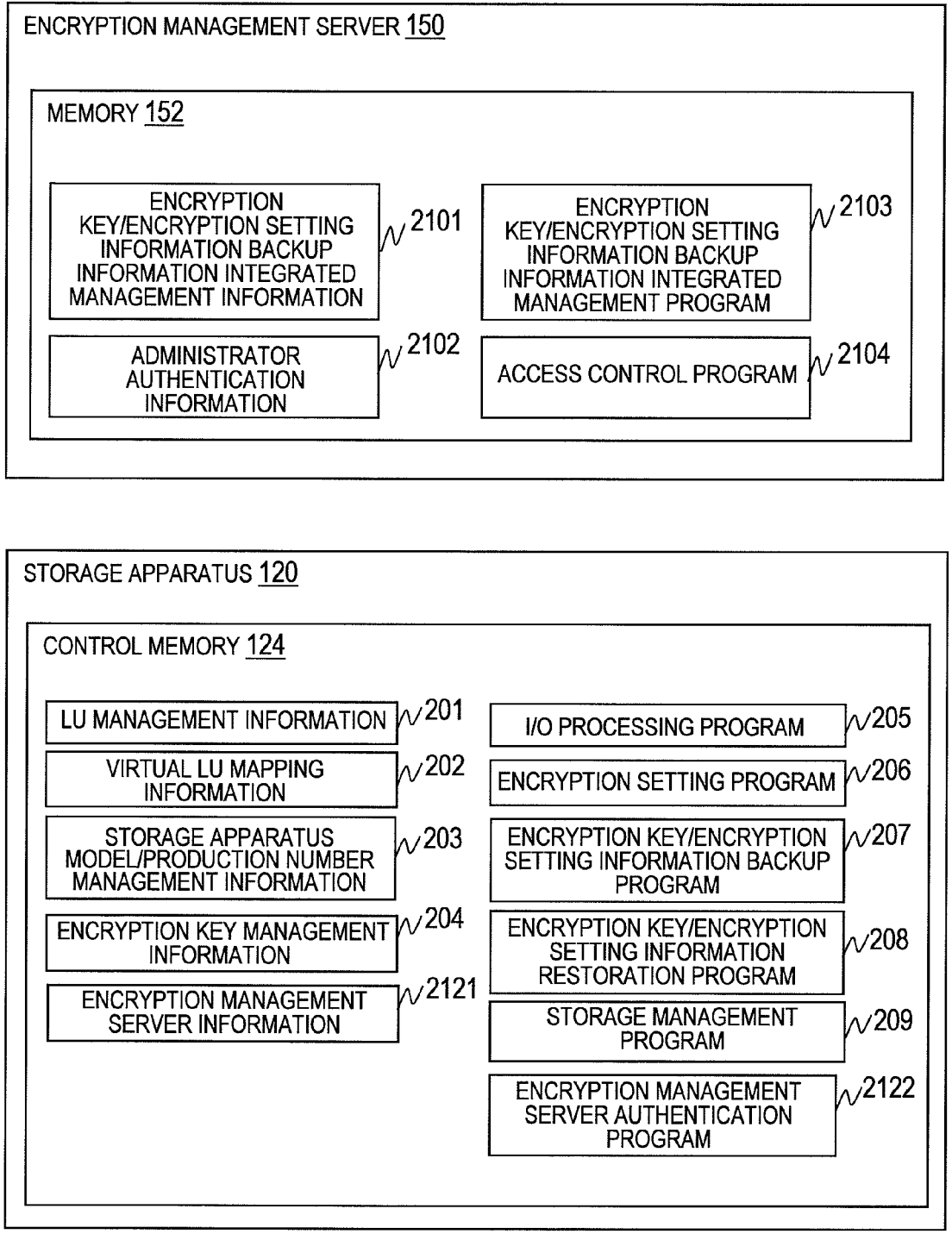
FIG. 21 is an explanatory diagram illustrating an example of a software configuration of the computer system according to the third embodiment of this invention.

FIG. 21 is an explanatory diagram illustrating an example of the software configuration of the computer system according to the third embodiment of this invention.

The memory 152 of the encryption management server 150 stores encryption key/encryption setting information backup information integrated management information 2101, administrator authentication information 2102, an encryption key/encryption setting information backup information integrated management program 2103, and an access control program 2104.

FIG. 22 is an explanatory diagram illustrating an example of the encryption key/encryption setting information backup information integrated management information 2101 according to the third embodiment of this invention.

The encryption key/encryption setting information backup information integrated management information 2101 includes three data items including items 2201 to 2203.

The item 2201 stores an IP address or a host name of each storage apparatus 120 or each virtual destination storage apparatus 130 that transmits the encryption key setting information backup information to the encryption management server 150. However, the value for this item is not limited thereto, and another value such as a port name (WWN) or the like of, for example, each storage apparatus 120 or the like may also be stored as long as the value is capable of uniquely identifying each storage apparatus 120 or the like.

The item 2202 stores an identifier of the encryption key/encryption setting information backup information 241 which has been backed up from the storage apparatus 120 or the like identified by the information in the item 2201.

The item 2203 stores information for identifying an administrator who is allowed to access data identified by the information in the item 2202. For example, the administrator can request the encryption management server 150 to transmit, of the data items identified by the information in the item 2202, only the data item accessible to the administrator, to the storage apparatus 120 or the like.

FIG. 23 is an explanatory diagram illustrating an example of the administrator authentication information 2102 according to the third embodiment of this invention.

The administrator authentication information 2102 includes three data items including items 2301 to 2303.

The item 2301 stores a user ID for uniquely identifying each administrator using the encryption management server 150.

The item 2302 stores a password of each administrator to be used to login the encryption management server 150.

The item 2303 stores role information for controlling an operation to be executed on the encryption management server 150 by each administrator. For example, in the case where the role information corresponding to a user ID of "ABC" stores "an instruction to transmit the encryption key/encryption setting information backup information", an administrator identified by the user ID of "ABC" can instruct the encryption management server 150 to transmit data identified by the information in the item 2202, to the storage apparatus 120 or the like.

Next, with reference again to FIG. 21, the program information of the encryption management server 150 will be described. The memory 152 stores the encryption key/encryption setting information backup information integrated management program 2103 and the access control program 2104.

The encryption key/encryption setting information backup information integrated management program 2103 transmits, in response to an instruction from an administrator, data in the item 2202 to the storage apparatus 120 or the like. Further, encryption key/encryption setting information backup information integrated management program 2103 manages the encryption key/encryption setting information backup information 241 received from the storage apparatus 120 or the like, in the form as illustrated in FIG. 22, so as to associate each item of the information with each storage apparatus 120 or the like.

The access control program 2104 performs authentication and access control of an administrator making an access request to the encryption management server 150. Further, the access control program 2104 performs authentication and access control of a storage apparatus 120 making an access request to the encryption management server 150. Described above is the software configuration of the encryption management server 150.

Next, the software configuration of the storage apparatus 120 according to this embodiment will be described. Of the information and programs illustrated in FIG. 21, the LU management information 201, the virtual LU mapping information 202, the storage apparatus model/production number management information 203, the encryption key management information 204, the I/O processing program 205, the encryption setting program 206, and the storage management program 209 are similar to those illustrated in FIG. 2. Therefore, the description thereof will be omitted.

The control memory 124 of the storage apparatus 120 stores, in addition to the above-mentioned information, encryption management server information 2121.

FIG. 24 is an explanatory diagram illustrating an example of the encryption management server information 2121 according to the third embodiment of this invention.

The encryption management server information 2121 includes an item 2401. The item 2401 stores an IP address or a host name of each encryption management server 150 which is a transmission destination of the encryption key/encryption setting information backup information 241 transmitted by the storage apparatus 120. Alternatively, the item 2401 may store any other information than the IP address or the host name, which is capable of uniquely identifying each encryption management server 150.

In FIG. 20, only one encryption management server 150 is illustrated. However, the computer system according to this embodiment may actually be provided with a plurality of the encryption management servers 150. In the case where the storage apparatus 120 transmits the encryption key/encryption setting information backup information 241 to the plurality of encryption management servers 150, the item 2401 stores identification information for identifying each of the plurality of encryption management servers 150.

Next, the program information of the storage apparatus 120 will be described. The control memory 124 stores, in addition to the above-mentioned programs, an encryption key/encryption setting information backup program 207, an encryption key/encryption setting information restoration program 208, and an encryption management server authentication program 2122.

According to this embodiment, the encryption key/encryption setting information backup program 207 backs up the encryption key/encryption setting information backup information 241 to the encryption management server 150. The encryption key/encryption setting information restoration program 208 receives the encryption key/encryption setting information backup information 241 from the encryption management server 150 and executes restoration of the information.

The encryption management server authentication program 2122 authenticates, when the storage apparatus 120 is to receive the encryption key/encryption setting information backup information 241 from the encryption management server 150, the encryption management server 150.

Described above is the software configuration of the storage apparatus 120 according to this embodiment. Next, a backup/restoration process for the encryption key/encryption setting information according to this embodiment will be described. In this case, the information items illustrated in FIGS. 22 to 24, such as account information of each administrator, information on the encryption management server 150, and information on the transmission source storage apparatus, have already been registered.

(Backup Process Using Encryption Management Server)

Figure 25:
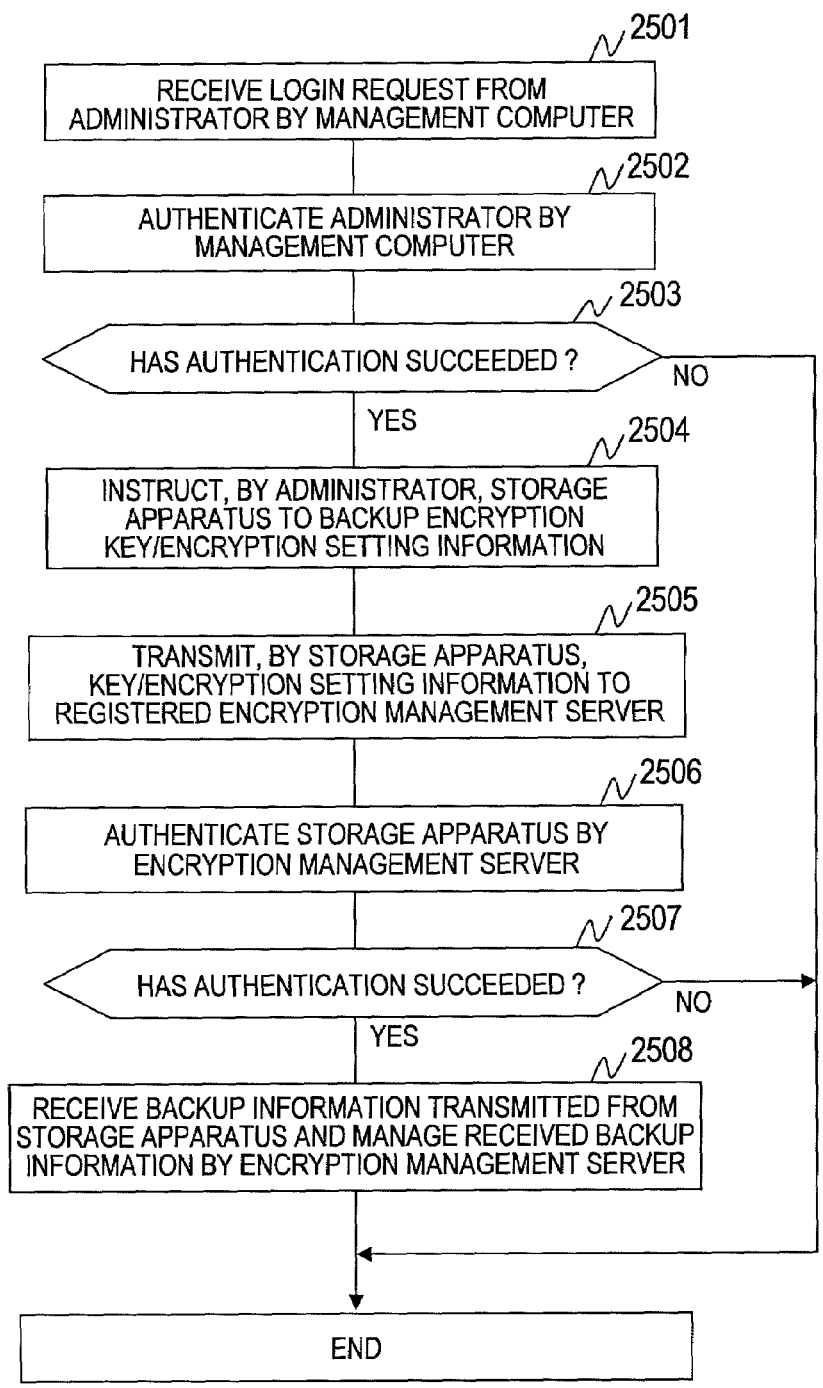
FIG. 25 is a flowchart illustrating an example of a process of backing up encryption key/encryption setting information to an encryption management server from a storage apparatus according to the third embodiment of this invention.

FIG. 25 is a flowchart illustrating an example of a process of backing up the encryption key/encryption setting information to the encryption management server 150 from the storage apparatus 120 according to the third embodiment of this invention.

The management computer 140 receives a login request from an administrator (Step 2501), authenticates the administrator (Step 2502), and judges whether the authentication of the administrator has succeeded or not (Step 2503).

In the case where the authentication has failed, the process is ended.

In the case where the authentication has succeeded, the administrator instructs the storage apparatus 120 to back up the encryption key/encryption setting information (Step 2504).

The storage apparatus 120, which has received the instruction, backs up the encryption key/encryption setting information backup information 241 to the encryption management server 150 (that is, transmits the encryption key/encryption setting information backup information 241 to the encryption management server 150) (Step 2505). For example, the encryption key/encryption setting information backup information 241 is transmitted to the address of the encryption management server 150 stored in the item 2401.

The encryption management server 150, which has received the encryption key/encryption setting information backup information 241, authenticates the storage apparatus 120 of the transmission source (Step 2506), and judges whether the authentication has succeeded or not (Step 2507).

In the case where the authentication has failed, the process is ended.

In the case where the authentication has succeeded, the encryption management server 150 integrally manages the encryption key/encryption setting information backup information 241 received from the storage apparatus 120 (Step 2508).

(Restoration Process Using Encryption Management Server)

Figure 26:
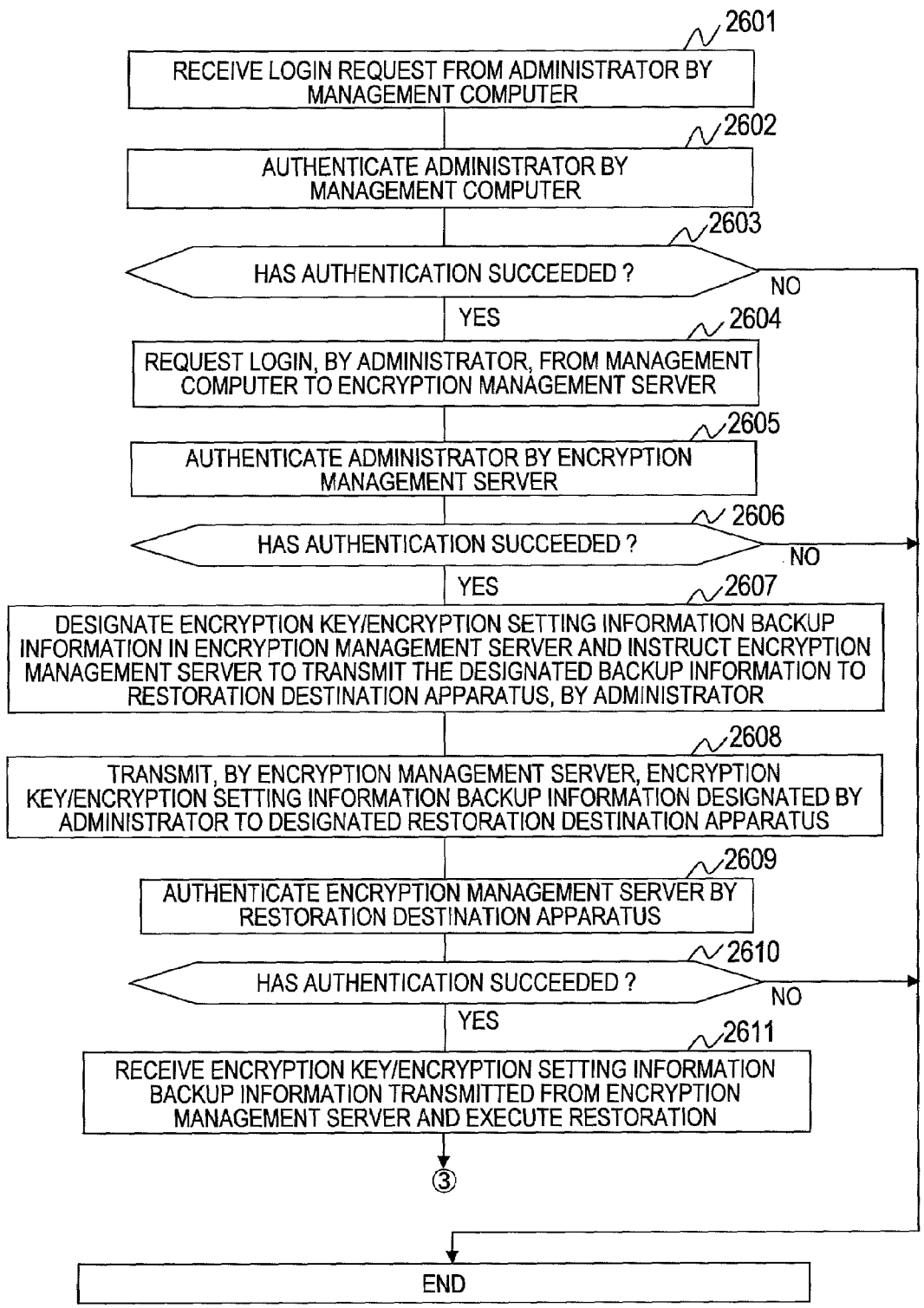
FIG. 26 is a flowchart illustrating an example of a process of transmitting the encryption key/encryption setting information to the storage apparatus from the encryption management server according to the third embodiment of this invention, and restoring the encryption key/encryption setting information.

FIG. 26 is a flowchart illustrating an example of a process of transmitting the encryption key/encryption setting information to the storage apparatus 120 from the encryption management server 150 according to the third embodiment of this invention, and restoring the encryption key/encryption setting information.

The management computer 140 receives a login request from an administrator (Step 2601), authenticates the administrator (Step 2602), and judges whether the authentication has succeeded or not (Step 2603).

In the case where the authentication has failed, the process is ended.

In the case where the authentication has succeeded, the administrator makes a login request from the management computer 140 to the encryption management server 150 (Step 2604).

The encryption management server 150 authenticates the administrator who has made the login request (Step 2605), and judges whether the authentication has succeeded or not (Step 2606).

In the case where the authentication has failed, the process is ended.

In the case where the authentication has succeeded, the administrator designates the encryption key/encryption setting information backup information 241 in the encryption management server 150, and instructs the encryption management server 150 to transmit the designated information to the restoration destination apparatus designated by the administrator (Step 2607). For example, in the example of FIG. 22, the administrator designates a data item from among the data items included in the item 2202, while designating the restoration destination apparatus, and instructs the encryption management server 150 to transmit the designed data item in the item 2202 to the restoration destination apparatus.

The encryption management server 150 transmits the encryption key/encryption setting information backup information designated by the administrator, to the designated restoration destination apparatus (Step 2608).

The restoration destination apparatus, which has received the information, authenticates the encryption management server 150 of the transmission source (Step 2609), and judges whether the authentication has succeeded or not (Step 2610).

In the case where the authentication has failed, the process is ended.

In the case where the authentication has succeeded, the restoration destination apparatus receives the encryption key/encryption setting information backup information 241 transmitted from the encryption management server 150, and executes, by using the received information, the restoration processes in and after Step 1302 of FIGS. 13A and 13B (Step 2611).

Described above is the process of backing up and restoring the encryption key/encryption setting information according to this embodiment.

Next, a first modification example of this embodiment will be described. According to this modification example, in restoring the encryption key/encryption setting information, rather than the administrator making a request with respect to the encryption management server 150 to transmit the encryption key/encryption setting information, the storage apparatus 120 directly transmits, to the encryption management server 150, an acquisition request for acquiring the encryption key/encryption setting information. In the following, a description will be given only of the restoration process of restoring the encryption key/encryption setting information that is different from the process described above. In other words, the backup process of backing up the encryption key/encryption setting information is similar to that illustrated in FIG. 25, and therefore the description thereof will be omitted.

Modification Example 1 of Restoration Process Using Encryption Management Server FIG. 27 is an explanatory diagram illustrating a first modification example of the encryption key/encryption setting information backup information integrated management information 2101 according to the third embodiment of this invention.

The encryption key/encryption setting information backup information integrated management information 2101 illustrated in FIG. 27 includes three data items including items 2201, 2202, and 2701.

The items 2201 and 2202 are similar to those illustrated in FIG. 22, and therefore the description thereof will be omitted.

The item 2701 stores an IP address or a host name of a storage apparatus 120 or a virtual destination storage apparatus 130 that is allowed to access data identified by the information in the item 2202. The data in the item 2701 is used for authenticating each storage apparatus. Accordingly, the item 2701 stores may store any other information than the IP address or the host name, as long as the information is capable of uniquely identifying each storage apparatus.

FIG. 28 is an explanatory diagram illustrating a first modification example of the administrator authentication information 2102 according to the third embodiment of this invention.

The administrator authentication information 2101 includes three data items including items 2301 to 2303. Those items are similar to those illustrated in FIG. 23, and therefore the description thereof will be omitted.

However, according to this modification example, there may be a case where "registration of a storage apparatus that is capable of accessing a management server" may be stored as the role information. For example, in the case where the "registration of a storage apparatus that is capable of accessing a management server" is stored as the role information corresponding to the user ID of "ABC", an administrator identified by the user ID "ABC" is allowed to newly store, in the item 2701, information for identifying a storage apparatus that is allowed to access data identified by the information included in the item 2202.

Figure 29:
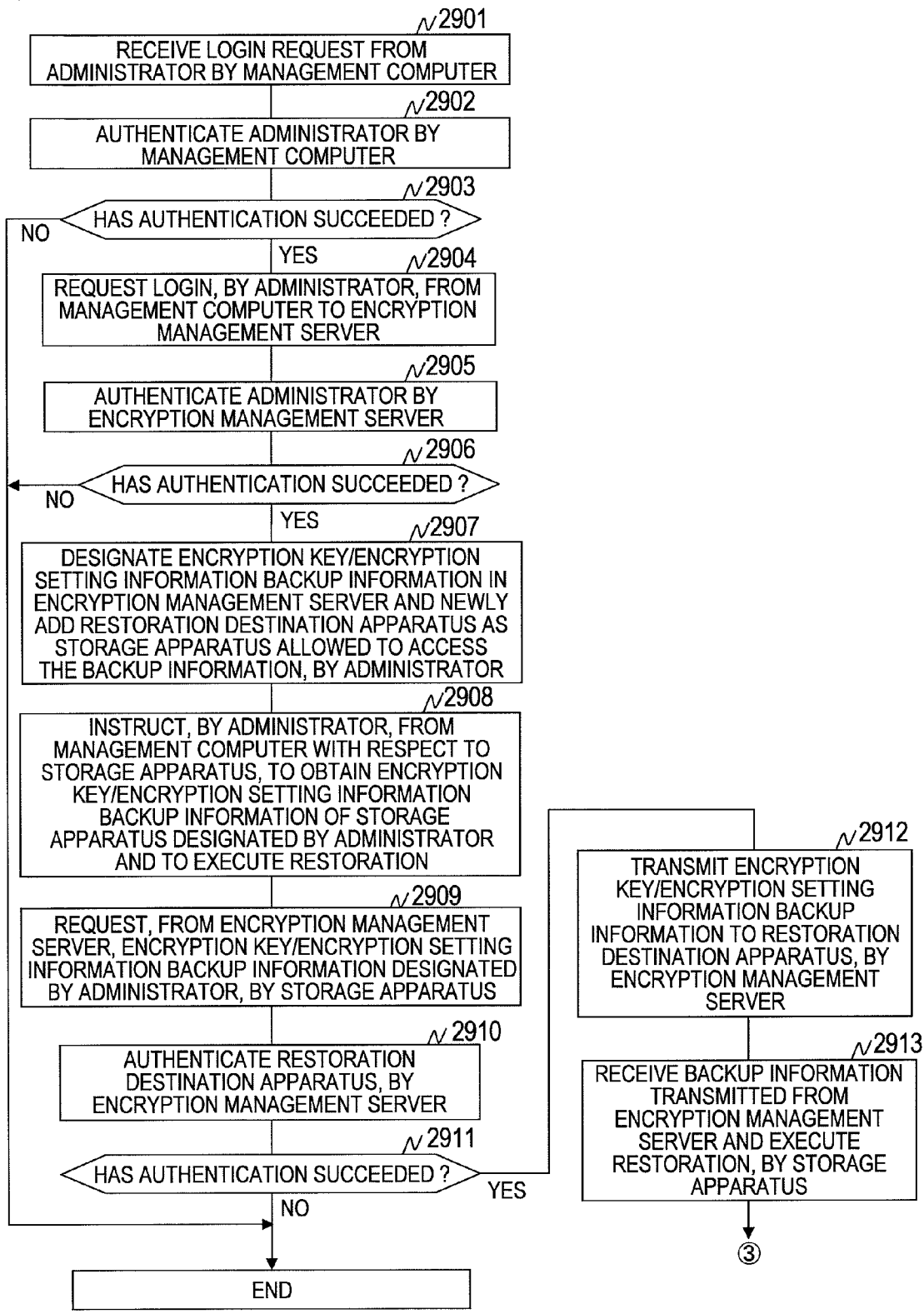
FIG. 29 is a flowchart illustrating a first modification of the process of transmitting and restoring the encryption key/encryption setting information by the encryption management server to the storage apparatus according to the third embodiment of this invention.

FIG. 29 is a flowchart illustrating a first modification of the process of transmitting and restoring the encryption key/encryption setting information by the encryption management server 150 to the storage apparatus 120 according to the third embodiment of this invention.

The management computer 140 receives a login request from an administrator (Step 2901), authenticates the administrator (Step 2902), and judges whether the authentication has succeeded or not (Step 2903).

In the case where the authentication has failed, the process is ended.

In the case where the authentication has succeeded, the administrator makes a login request from the management computer 140 to the encryption management server 150 (Step 2904).

The encryption management server authenticates the administrator who has made the login request (Step 2905), and judges whether the authentication has succeeded or not (Step 2906).

In the case where the authentication has failed, the process is ended.

In the case where the authentication has succeeded, the administrator designates the encryption key/encryption setting information backup information 241 in the encryption management server 150, and newly adds a restoration destination apparatus, as the storage apparatus 120 that is allowed to access the designated information (Step 2907).

For example, in the example of FIG. 22, in the case where a failure has occurred in the storage apparatus 120 identified by "10.1.1.1" stored in the item 2201 of a first entry and an administrator desires to restore the information backed up from the failed apparatus to the restoration destination apparatus identified by the address "A1", the administrator adds, to the item 2701 of the first entry, the address "A1" of the restoration destination apparatus to be newly added. As a result, two addresses of "10.1.1.1" and "A1" are stored in the item 2701 of the first entry.

Next, the administrator instructs the storage apparatus 120, from the management server 140, to obtain the encryption key/encryption setting information backup information 241 of the storage apparatus 120 designated by the administrator, from the encryption management server 150, and to restore the information (Step 2908).

The storage apparatus 120 requests the encryption management server 150 to obtain the encryption key/encryption setting information backup information 241 of the storage apparatus 120 designated by the administrator (Step 2909).

The encryption management server 150 authenticates the storage apparatus 120 that has made the request to obtain the encryption key/encryption setting information backup information 241 (that is, the restoration destination apparatus) (Step 2910, Step 2911), and judges whether the authentication has succeeded or not.

In the case where the authentication has failed, the process is ended.

In the case where the authentication has succeeded, the encryption management server 150 transmits the encryption key/encryption setting information backup information 241 to the restoration destination apparatus (Step 2912). The storage apparatus 120 receives the encryption key/encryption setting information backup information 241 transmitted from the encryption management server 150, and executes the restoration processes in and after Step 1302 of FIGS. 13A and 13B by using the received information (Step 2913).

According to the above-mentioned embodiment of this invention, for example, in a computer system including a computer, a management computer, first and second storage apparatuses each having a virtualizing function and an encryption function (hereinafter, also referred to as virtualization control storage apparatuses), and at least one third storage apparatus (hereinafter, also referred to as virtual destination storage apparatuses) which is virtualized by the virtualization control storage apparatus, the storage area of the third storage apparatus is virtualized and encrypted by the first storage apparatus. An encryption key for the first storage apparatus is backed up in a manner that the encryption key for the first storage apparatus and the encryption key for the virtual destination storage apparatus can be discriminated from each other.

When the first storage apparatus fails, the third storage apparatus is newly coupled to the second storage apparatus, and an encryption key backed up from the first storage apparatus is restored to the second storage apparatus. In this case, the second storage apparatus performs the following process.

It is judged whether the encryption keys which have been requested to be restored include an encryption key backed up from the second storage apparatus or not. In the case where the encryption keys include an encryption key backed up from the second storage apparatus and no encryption key is set to the second storage apparatus, the second storage apparatus restores the encryption key.

In the case where the encryption keys which have been requested to be restored do not include an encryption key backed up from the second storage apparatus, the second storage apparatus judges whether the encryption keys which have been requested to be restored include or not an encryption key for the own apparatus of the backup source storage apparatus (first storage apparatus). In the case where it has been judged the encryption key for the own apparatus is included, the restoration of the encryption key for the own apparatus of the first storage apparatus is not executed.

Of the encryption keys which have been requested to be restored, it is judged whether the rest of the encryption keys include an encryption key to be used in the case where the second storage apparatus itself has been virtualized, or an encryption key for the third storage apparatus virtualized by the second storage apparatus. In the case where it has been judged that any of the above-mentioned encryption keys is included, the encryption key is restored to the second storage apparatus.

According to the above-mentioned embodiment of this invention, in a computer system including a storage apparatus having a function of encrypting/decrypting data, a function of backing up/restoring the encryption key/encryption setting information, and a function of virtualizing the encryption key/encryption setting information, even when the storage apparatus fails, the encryption key of the failed storage apparatus can be correctly restored to another storage apparatus. Accordingly, it is possible to decrypt data in an encrypted storage area without damaging the data.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising a plurality of computers; a plurality of storage systems; and a network coupled to at least one of the plurality of computers and the plurality of storage systems, wherein:
the plurality of computers include a first computer and a second computer;
the plurality of computers each comprise a first interface coupled to the network, a first processor coupled to the first interface, and a first memory coupled to the first processor;
the plurality of storage systems include a first storage system and a second storage system;
the plurality of storage systems each comprise a second interface coupled to the network, a second processor coupled to the second interface, and a second memory coupled to the second processor;
the first storage system comprises a first storage area for storing data written by the second computer;
the second storage system comprises a second storage area for storing data written by the second computer;
the first storage system is configured to:
  encrypt, when a request to write first data in the first storage area is received from the second computer, the first data by using a first encryption key held by the first storage system, and write the encrypted first data in the first storage area; and
  encrypt, when a request to write second data in a third storage area is received from the second computer, the second data by using a second encryption key held by the first storage system, and transmit, to the second storage system, a request to write the encrypted second data in the second storage area;
the computer system holds backup information including encryption keys and identifiers of the plurality of storage systems associated with the encryption keys; and
the backup information includes at least the first encryption key, an identifier of the first storage system associated with the first encryption key, the second encryption key, and an identifier of the second storage system associated with the second encryption key, wherein:
the first computer is configured to transmit at least one of the encryption keys included in the backup information and at least one of the identifiers of the plurality of storage systems, which is associated with the at least one of the encryption keys; and
the first storage system is configured to:
  hold, in a case where an identifier of one of the plurality of storage systems received from the first computer comprises the identifier of the first storage system, the encryption key received from the first computer, as the first encryption key, the encryption key being associated with the identifier of the first storage system;
  hold, in a case where an identifier of one of the plurality of storage systems received from the first computer comprises the identifier of the second storage system, the encryption key received from the first computer, as the second encryption key, the encryption key being associated with the identifier of the second storage system; and
  prohibit, in a case where an identifier of one of the plurality of storage systems received from the first computer does not comprise the identifier of the first storage system, the first storage system from holding the encryption key received from the first computer, as the first encryption key, the encryption key being associated with the identifier of one of the plurality of storage systems.

2. The computer system according to claim 1, wherein the first storage system is configured to:

be set to one of a first mode in which overwriting of the first encryption key is prohibited and a second mode in which the overwriting of the first encryption key is permitted;

judge, in a case where an identifier of one of the plurality of storage systems received from the first computer comprises the identifier of the first storage system, whether the first storage system is set to the second mode; and hold the encryption key received from the first computer, as the first encryption key, only in a case where the first storage system is set to the second mode.

3. A computer system comprising a plurality of computers; a plurality of storage systems; and a network coupled to at least one of the plurality of computers and the plurality of storage systems, wherein:

the plurality of computers include a first computer and a second computer;

the plurality of computers each comprise a first interface coupled to the network, a first processor coupled to the first interface, and a first memory coupled to the first processor;

the plurality of storage systems include a first storage system and a second storage system;

the plurality of storage systems each comprise a second interface coupled to the network, a second processor coupled to the second interface, and a second memory coupled to the second processor;

the first storage system comprises a first storage area for storing data written by the second computer;

the second storage system comprises a second storage area for storing data written by the second computer;

the first storage system is configured to:

encrypt, when a request to write first data in the first storage area is received from the second computer, the first data by using a first encryption key held by the first storage system, and write the encrypted first data in the first storage area; and encrypt, when a request to write second data in a third storage area is received from the second computer, the second data by using a second encryption key held by the first storage system, and transmit, to the second storage system, a request to write the encrypted second data in the second storage area;

the computer system holds backup information including encryption keys and identifiers of the plurality of storage systems associated with the encryption keys; and the backup information includes at least the first encryption key, an identifier of the first storage system associated with the first encryption key, the second encryption key, and an identifier of the second storage system associated with the second encryption key, wherein:

the first computer is configured to transmit at least one of the encryption keys included in the backup information and at least one of the identifiers of the plurality of storage systems which is associated with the at least one of the encryption keys; and the second storage system is configured to:

hold, in a case where an identifier of one of the plurality of storage systems received from the first computer comprises the identifier of the second storage system, the encryption key received from the first computer, as the second encryption key, the encryption key being associated with the identifier of the second storage system; and read, upon receiving a request, from the second computer, to read the second data from the second storage area, the encrypted second data from the second storage area, and decrypt the encrypted second data thus read by using the second encryption key.

4. The computer system according to claim 3, wherein the second storage system, after holding, as the second encryption key, the encryption key associated with the identifier of the second storage system received from the first computer, is further configured to permit the second computer to access the second storage area, in response to an instruction from the first computer.

5. The computer system according to claim 3, wherein the first computer is configured to:

judge whether data stored in the second storage area is encrypted or not; and transmit the second encryption key included in the backup information and the identifier of the second storage system associated with the second encryption key, only in a case where the data stored in the second storage area is encrypted.

6. A computer system comprising:

a plurality of computers;

a plurality of storage systems; and a network coupled to at least one of the plurality of computers and the plurality of storage systems, wherein:

the plurality of computers include a first computer and a second computer;

the plurality of computers each comprise a first interface coupled to the network, a first processor coupled to the first interface, and a first memory coupled to the first processor;

the plurality of storage systems include a first storage system and a second storage system;

the plurality of storage systems each comprise a second interface coupled to the network, a second processor coupled to the second interface, and a second memory coupled to the second processor;

the first storage system comprises a first storage area for storing data written by the second computer;

the second storage system comprises a second storage area for storing data written by the second computer;

the first storage system is configured to:

encrypt, when a request to write first data in the first storage area is received from the second computer, the first data by using a first encryption key held by the first storage system, and write the encrypted first data in the first storage area; and encrypt, when a request to write second data in a third storage area is received from the second computer, the second data by using a second encryption key held by the first storage system, and transmit, to the second storage system, a request to write the encrypted second data in the second storage area;

the computer system holds backup information including encryption keys and identifiers of the plurality of storage systems associated with the encryption keys; and the backup information includes at least the first encryption key, an identifier of the first storage system associated with the first encryption key, the second encryption key, and an identifier of the second storage system associated with the second encryption key, wherein:

the plurality of storage systems further include a third storage system;

the first computer is configured to transmit at least one of the encryption keys included in the backup information and at least one of the identifiers of the plurality of storage systems, which is associated with the at least one of the encryption keys; and the third storage system is configured to:

hold, in a case where an identifier of the storage system received from the first computer comprises the identifier of the second storage system, the encryption key received from the first computer, as the second encryption key, the encryption key being associated with the identifier of the second storage system;

transmit, upon receiving a request, from the second computer, to read the second data from the third storage area, a request, to the second storage system, to read the second data; and decrypt, upon receiving the encrypted second data from the second storage system, the encrypted second data by using the second encryption key.

7. The computer system according to claim 6, wherein the third storage system, after holding, as the second encryption key, the encryption key associated with the identifier of the second storage system received from the first computer, is further configured to permit the second computer to access the third storage area, in response to an instruction from the first computer.

8. The computer system according to claim 6, wherein the first computer is configured to:

judge whether data stored in the second storage area is encrypted or not; and transmit the second encryption key included in the backup information and the identifier of the second storage system associated with the second encryption key, only in a case where the data stored in the second storage area is encrypted.

9. The computer system according to claim 6, wherein:

the first computer is configured to transmit an access right setting instruction to the second storage system; and the second storage system is configured to allow the third storage system to access the second storage area, based on the access right setting instruction.

10. The computer system according to claim 1, wherein the first computer holds the backup information.

11. The computer system according to claim 1, wherein:

the plurality of computers further include a third computer;

the third computer holds the backup information; and when the first computer transmits at least one of the encryption keys included in the backup information and at least one of the identifiers of the plurality of storage systems, which is associated with the at least one of the encryption keys, the first computer transmits, to the third computer, an instruction to transmit the backup information, and causes the third computer to transmit the at least one of the encryption keys included in the backup information and the at least one of the identifiers of the plurality of storage systems, which is associated with the at least one of the encryption keys.

12. A storage system comprising:

a plurality of computers;

a plurality of storage systems; and a network coupled to at least one of the plurality of computers and the plurality of storage systems, wherein:

the plurality of computers include a first computer and a second computer;

the plurality of computers each comprise a first interface coupled to the network, a first processor coupled to the first interface, and a first memory coupled to the first processor;

the plurality of storage systems include a first storage system and a second storage system;

the plurality of storage systems each comprise a second interface coupled to the network, a second processor coupled to the second interface, and a second memory coupled to the second processor;

the first storage system comprises a first storage area for storing data written by the second computer;

the second storage system comprises a second storage area for storing data written by the second computer;

the first storage system is configured to:

encrypt, when a request to write first data in the first storage area is received from the second computer, the first data by using a first encryption key held by the first storage system, and write the encrypted first data in the first storage area; and encrypt, when a request to write second data in a third storage area is received from the second computer, the second data by using a second encryption key held by the first storage system, and transmit, to the second storage system, a request to write the encrypted second data in the second storage area;

the computer system holds backup information including encryption keys and identifiers of the plurality of storage systems associated with the encryption keys; and the backup information includes at least the first encryption key, an identifier of the first storage system associated with the first encryption key, the second encryption key, and an identifier of the second storage system associated with the second encryption key, wherein the storage system is configured to:

receive the backup information including at least one encryption key and at least one identifier of a storage system associated with the at least one encryption key;

hold, in a case where the received identifier of the storage system comprises an identifier of its own storage system, the encryption key associated with the identifier of its own storage system, as the first encryption key;

hold, in a case where the received identifier of the storage system comprises an identifier of the another storage system coupled to its own storage system, the encryption key associated with the identifier of the another storage system, as the second encryption key; and prohibit, in a case where the received identifier of the storage system does not comprise the identifier of its own storage system, its own storage system from holding the encryption key associated with the received identifier of the storage system, as the first encryption key.

13. The storage system according to claim 12, wherein the second storage area is made accessible to the storage system when the another storage system allows, based on an access right setting instruction received from the first computer, the storage system to access the second storage area.

14. The storage system according to claim 12, wherein the storage system is configured to:

judge, in a case where the received identifier of the storage system does not comprise any one of the identifier of its own storage system and the identifier of the another storage system coupled to the own storage system, whether the second storage area of the another storage system having the received identifier of the storage system is accessible or not; and hold, in a case where the second storage area is accessible, the encryption key associated with the received identifier of the storage system, as the second encryption key.

15. The storage system according to claim 12, wherein the storage system is configured to:

be set to one of a first mode in which overwriting of the first encryption key is prohibited and a second mode in which the overwriting of the first encryption key is permitted;

judge, in a case where the identifier of the storage system received from the first computer comprises the identifier of its own storage system, whether its own storage system is set to the second mode; and hold the encryption key received from the first computer, as the first encryption key, only in a case where its own storage system is set to the second mode.

16. A management computer coupled to a plurality of computers and a plurality of storage systems and to a network coupled to at least one of the plurality of computers and the plurality of storage systems, wherein:

the plurality of computers include a first computer and a second computer;

the plurality of computers each comprise a first interface coupled to the network, a first processor coupled to the first interface, and a first memory coupled to the first processor;

the plurality of storage systems include a first storage system and a second storage system;

the plurality of storage systems each comprise a second interface coupled to the network, a second processor coupled to the second interface, and a second memory coupled to the second processor;

the first storage system comprises a first storage area for storing data written by the second computer;

the second storage system comprises a second storage area for storing data written by the second computer;

the first storage system is configured to:

encrypt, when a request to write first data in the first storage area is received from the second computer, the first data by using a first encryption key held by the first storage system, and write the encrypted first data in the first storage area; and encrypt, when a request to write second data in a third storage area is received from the second computer, the second data by using a second encryption key held by the first storage system, and transmit, to the second storage system, a request to write the encrypted second data in the second storage area;

the computer system holds backup information including encryption keys and identifiers of the plurality of storage systems associated with the encryption keys; and the backup information includes at least the first encryption key, an identifier of the first storage system associated with the first encryption key, the second encryption key, and an identifier of the second storage system associated with the second encryption key, wherein the first storage system is configured to:

receive the backup information including at least one encryption key and at least one identifier of one of the storage systems associated with the at least one encryption key;

hold, in a case where the received identifier of the one storage system comprises an identifier of its own storage system, the encryption key associated with the identifier of its own storage system, as the first encryption key;

hold, in a case where the received identifier of the one storage system comprises an identifier of the another storage system coupled to its own storage system, the encryption key associated with the identifier of the another storage system, as the second encryption key; and prohibit, in a case where the received identifier of the one storage system does not comprise the identifier of its own storage system, its own storage system from holding the encryption key associated with the received identifier of the storage system, as the first encryption key, the management computer comprising:

at least one first interface coupled to the computer and the one or more storage systems;

a first processor coupled to the at least one first interface; and a first memory coupled to the first processor, wherein:

the storage systems each comprise a storage area for storing data written by the computer; and the management computer is further configured to:

hold an encryption key to be used for encrypting data stored in the storage area and an identifier of the storage systems each comprising the storage area, the identifier being associated with the encryption key; and transmit, to at least one of the storage systems, the encryption key and the identifier of the at least one storage system which is associated with the encryption key.

17. The management computer according to claim 16, wherein the management computer is further configured to:

Judge weather data stored in the storage area is encrypted or not; and transmit, only in a case where the data stored in the storage area is encrypted, the encryption key and the identifier of at least one storage system which is associated with the encryption key, to at least one storage system.

* * * * *